(12) United States Patent
Sorenson, III et al.

(10) Patent No.: US 10,069,903 B2
(45) Date of Patent: Sep. 4, 2018

(54) DISTRIBUTED LOAD BALANCER

(71) Applicant: Amazon Technologies, Inc., Reno, NV (US)

(72) Inventors: James Christopher Sorenson, III, Seattle, WA (US); Douglas Stewart Laurence, Mercer Island, WA (US); Venkatraghavan Srinivasan, Seattle, WA (US); Akshay Suhas Vaidya, Bothell, WA (US); Fan Zhang, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 305 days.

(21) Appl. No.: 13/864,167

(22) Filed: Apr. 16, 2013

(65) Prior Publication Data

US 2014/0310418 A1  Oct. 16, 2014

(51) Int. Cl.
*H04L 29/08* (2006.01)
*H04L 29/06* (2006.01)
*H04L 12/721* (2013.01)

(52) U.S. Cl.
CPC ...... *H04L 67/1002* (2013.01); *H04L 67/1038* (2013.01); *H04L 67/288* (2013.01);
(Continued)

(58) Field of Classification Search
CPC ....... H04L 29/06; H04L 61/103; H04L 47/32; H04L 12/462–12/4633;
(Continued)

(56) References Cited

U.S. PATENT DOCUMENTS 7,567,504 B2   7/2009  Darling
2003/0009559 A1  1/2003  Ikeda
(Continued)

FOREIGN PATENT DOCUMENTS

CN   1607781   4/2005
JP   2000029831   1/2000
(Continued)

OTHER PUBLICATIONS

International Search Report and Written Opinion from PCT/US2014/034428, dated Sep. 22, 2014, pp. 1-9.
(Continued)

*Primary Examiner* — Wing F Chan
*Assistant Examiner* — Raji Krishnan
(74) *Attorney, Agent, or Firm* — Robert C. Kowert; Meyertons, Hood, Kivlin, Kowert & Goetzel, P.C.

(57) ABSTRACT

A distributed load balancer in which a router receives packets from at least one client and routes packet flows to multiple load balancer (LB) nodes according to a per-flow hashed multipath routing technique. For a given packet flow, the LB nodes randomly select a server node as a target for the packet flow from among multiple server nodes and send a connection request to the server node. A load balancer module on the server node makes the decision on whether to accept or reject the connection based on one or more metrics indicating a respective server's current load. If the module accepts the connection request, a connection is established between the server and the client. Otherwise, the load balancer nodes may select another server node and try again. The connections established between clients and servers pass through the load balancer nodes, but are not terminated at the load balancer nodes.

20 Claims, 39 Drawing Sheets

(52) U.S. Cl.
CPC ............. *H04L 29/06* (2013.01); *H04L 45/72* (2013.01); *H04L 67/1008* (2013.01)

(58) Field of Classification Search
CPC ........ H04L 29/12028–29/12783; H04L 45/00; H04L 45/125; H04L 45/20–45/24; H04L 45/306; H04L 45/44; H04L 45/54; H04L 45/66; H04L 47/10–47/125; H04L 67/1002–67/1034; H04L 45/36–45/38; G06F 9/5023; G06F 17/30194–17/30197; G06F 9/505–9/5083
USPC ............... 709/223, 226, 232, 238; 718/105; 370/259
See application file for complete search history.

(56) References Cited

U.S. PATENT DOCUMENTS

| | | |
|---|---|---|
| 2003/0026287 A1 | 2/2003 | Mullendore et al. |
| 2003/0101275 A1* | 5/2003 | Maciel .................... H04L 29/06 709/235 |
| 2003/0108052 A1 | 6/2003 | Inoue et al. |
| 2003/0204619 A1* | 10/2003 | Bays .................... H04L 12/2697 709/238 |
| 2004/0003099 A1* | 1/2004 | House ................. H04L 67/1006 709/229 |
| 2004/0205250 A1* | 10/2004 | Bain .................... H04L 67/1008 709/249 |
| 2004/0246895 A1 | 12/2004 | Feyerabend |
| 2004/0268358 A1 | 12/2004 | Darling et al. |
| 2005/0027862 A1 | 2/2005 | Nguyen |
| 2005/0050187 A1* | 3/2005 | Freimuth ............ H04L 12/5695 709/223 |
| 2005/0055435 A1 | 3/2005 | Gbadegesin et al. |
| 2005/0071469 A1* | 3/2005 | McCollom .......... H04L 67/1002 709/225 |
| 2006/0112170 A1* | 5/2006 | Sirkin ............... H04L 29/12066 709/217 |
| 2006/0173982 A1* | 8/2006 | Bournas ................ H04L 47/805 709/223 |
| 2006/0233155 A1* | 10/2006 | Srivastava .............. H04L 45/00 370/351 |
| 2008/0080548 A1 | 4/2008 | Mullendore et al. |
| 2009/0144444 A1* | 6/2009 | Chauffour et al. ........... 709/238 |
| 2009/0240705 A1 | 9/2009 | Miloushev et al. |
| 2010/0036903 A1 | 2/2010 | Ahmad et al. |
| 2010/0302940 A1 | 12/2010 | Patel et al. |
| 2011/0026403 A1 | 2/2011 | Shao et al. |
| 2011/0161980 A1* | 6/2011 | English ................. G06F 9/5083 718/105 |
| 2011/0283013 A1* | 11/2011 | Grosser ................ H04L 61/103 709/232 |
| 2012/0079065 A1 | 3/2012 | Miyamoto |
| 2012/0155266 A1 | 6/2012 | Patel et al. |
| 2012/0170575 A1 | 7/2012 | Mehra |
| 2012/0246637 A1 | 9/2012 | Kreeger et al. |
| 2013/0080517 A1 | 3/2013 | T'Syen et al. |
| 2013/0185586 A1* | 7/2013 | Vachharajani et al. ........... 714/2 |
| 2014/0258496 A1* | 9/2014 | Wu .................... H04L 67/1002 709/223 |

FOREIGN PATENT DOCUMENTS

| | | |
|---|---|---|
| JP | 2003131961 | 5/2003 |
| JP | 2003-174473 | 6/2003 |
| JP | 2005025756 | 1/2005 |
| JP | 201045617 | 2/2010 |
| JP | 2010531020 | 9/2010 |
| JP | 2012044623 | 3/2012 |
| JP | 2012074928 | 4/2012 |
| JP | 2013-528336 | 7/2013 |
| WO | 2011136807 | 11/2011 |
| WO | 2012056404 | 5/2012 |

OTHER PUBLICATIONS

Elif Uysal-Biyikoglu; et al., "Energy-Efficient Packet Transmission Over a Wireless Link", IEEE/ACM Transactions on Networking, Vol. 10, No. 4, Aug. 2002, pp. 487-499.
Sourabh Bharti, et al., "Dynamic Distributed Flow Scheduling with Load Balancing for Data Center Networks", Procedia Computer Science 19, 2013, pp. 124-130.
"Advanced Load Balancing: 8 Must-Have Features for Today's Network Demands" Citrix Systems, Inc. NetScaler white paper, Sep. 2009, pp. 1-9.
"Citrix Netscaler Load Balancing Algorithms" University of Wisconsin KnowledgeBase, Downloaded from kb.wisc.edu/ns/page.php?id=13201 on Apr. 14, 2013, pp. 1-5.
"Is your load balancer cloud ready? How NetScaler helps enterprises achieve cloud computing benefits" Citrix Systems, Inc. NetScaler white paper, Apr. 2010, pp. 1-9.
"Intel® Data Plane Development Kit (Intel® DPDK) Getting Started Guide", Nov. 2012, pp. 1-18.
"Intel® Data Plane Development Kit (Intel® DPDK) Programmer's Guide", Nov. 2012, pp. 1-90.
"Intel® Data Plane Development Kit (Intel® DPDK) Sample Application User's Guide" Nov. 2012, pp. 1-75.
U.S. Appl. No. 13/167,555, filed Jun. 23, 2011, James Sorenson III et al.
U.S. Appl. No. 13/167,557, filed Jun. 23, 2011, James Sorenson III et al.
U.S. Appl. No. 13/864,162, filed Apr. 16, 2013, James Christopher Sorenson, III et al.
U.S. Appl. No. 13/864,157, filed Apr. 16, 2013, James Christopher Sorenson, III et al.
U.S. Appl. No. 13/864,152, filed Apr. 16, 2013, James Christopher Sorenson, III et al.
U.S. Appl. No. 13/864,148, filed Apr. 16, 2013, James Christopher Sorenson, III et al.
U.S. Appl. No. 13/864,145, filed Apr. 16, 2013, James Christopher Sorenson, III et al.
U.S. Appl. No. 13/864,138, filed Apr. 16, 2013, James Christopher Sorenson, III et al.
Patent Examination Report No. 1 from Australian Application No. 2014253953, dated Feb. 17, 2016, Amazon Technologies, Inc., pp. 1-3.
Extended European Search Report from Application No. 14785685.0, dated Oct. 20, 2016, Amazon Technologies, Inc., pp. 1-8.
Office Action from Japanese Patent Application No. 2016-509084, dated Sep. 20, 2016 (English Translation and Japanese Version), pp. 1-7.
Office Action from Korean Application No. 10-2015-7032262, dated Oct. 19, 2016 (English Translation and Korean Version), pp. 1-11.
Singapore Search Report and Written Opinion form Application No. 11201508556R, dated Oct. 5, 2016, Amazon Technologies, Inc., Pages.
Sonesh Surana, et al., "Load balancing in dynamic structured peer-to-peer systems", Performance Evaluation, vol. 63, No. 3, Mar. 2, 2006, pp. 218-240.

* cited by examiner

DISTRIBUTED LOAD BALANCER

BACKGROUND

Conventional load balancers are typically single, dedicated boxes that include multiple network interface controllers (NICs), for example eight NICs, with some of the NICs handling inbound traffic from/outbound traffic to clients and the other NICs handling outbound traffic from/inbound traffic to the host devices (e.g., servers such as web servers) that are being load balanced. Bandwidth or throughput on these conventional load balancers is typically in the range of 40 Gigabits per second (Gbps) on the client side and 40 Gbps on the server side. As the scale and scope of network-based applications and network-based services such as cloud computing services have increased, data centers may house hundreds or even thousands of host devices (e.g., web servers) that need to be load balanced. Conventional load balancers may not scale well in such environments.

Further, conventional load balancers typically use techniques such as max connections (or max conns), round robin, and/or least connections (least conns) applied to data collected from the host devices to select which host device will handle a connection. In addition, conventional load balancers typically serve as proxies to the host devices that they front and thus terminate connections (e.g., Transmission Control Protocol (TCP) connections) from the clients and send the client traffic to the host devices on TCP connections established between the host devices and the load balancer. Thus, a host device and a client do not communicate over a direct TCP connection when using these conventional load balancers.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 33A:
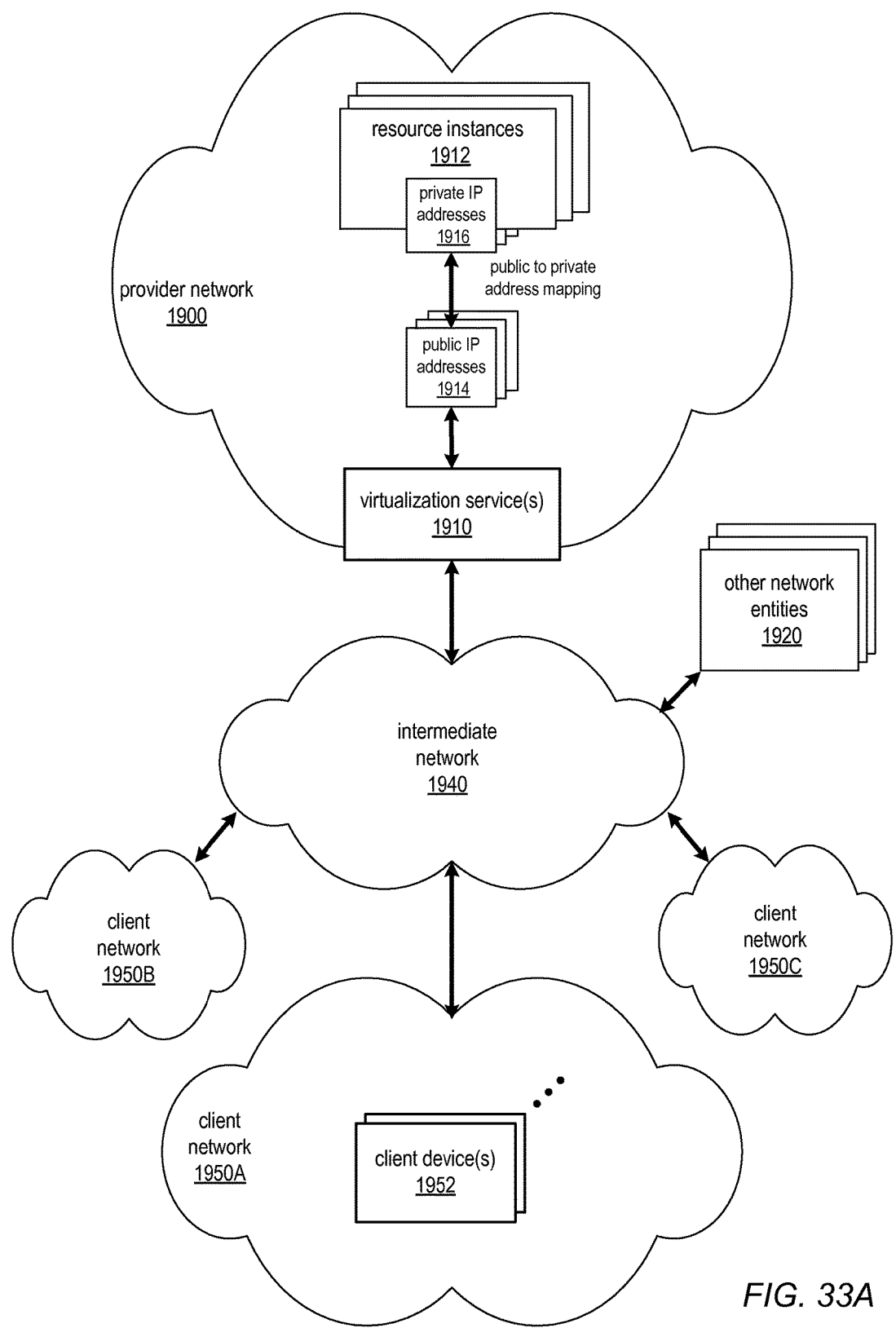
FIG. 33A illustrates an example provider network environment, according to at least some embodiments.
Figure 33B:
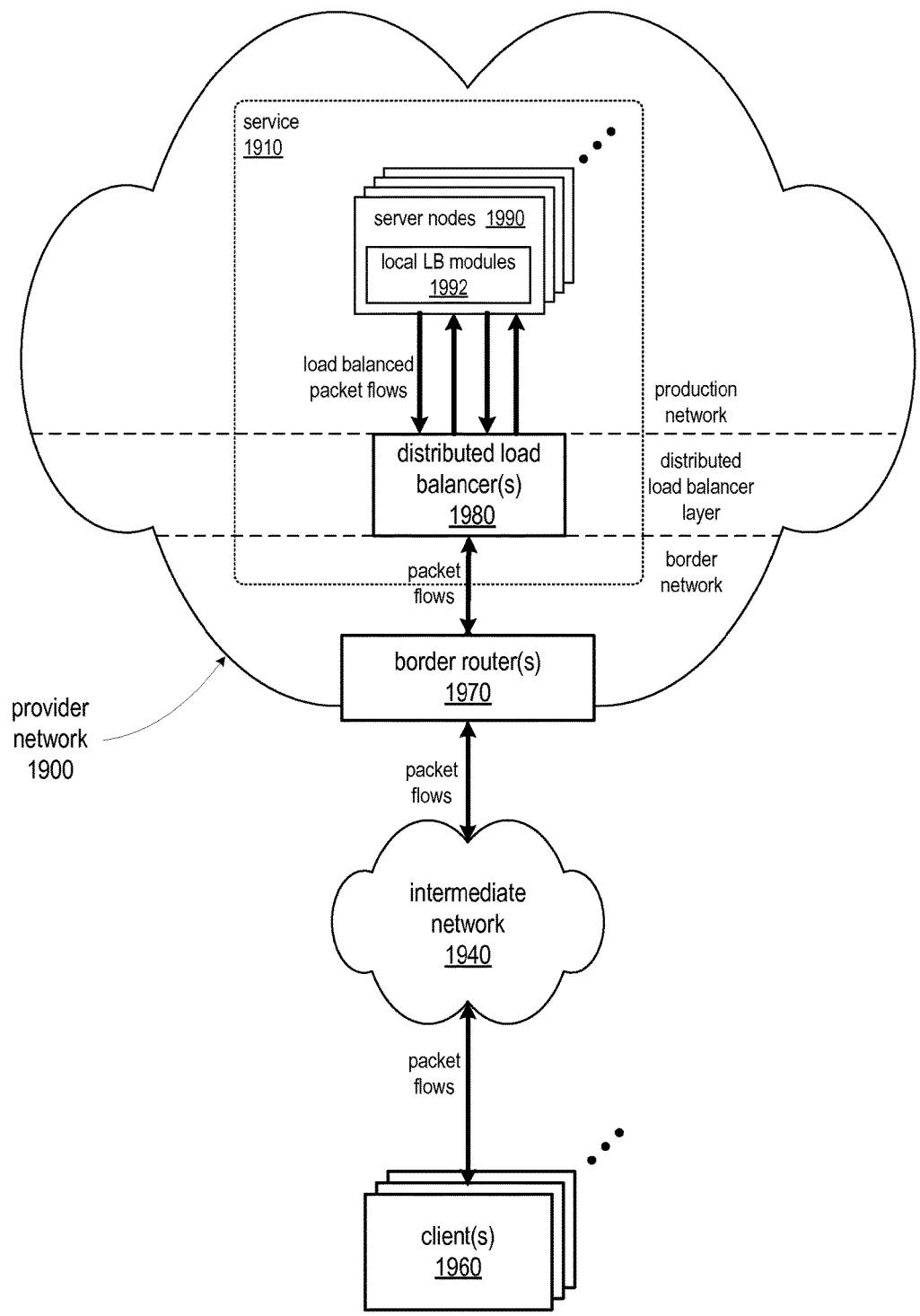
FIG. 33B illustrates a distributed load balancer implementation in an example provider network environment as shown in FIG. 33A, according to at least some embodiments.

Various embodiments of methods and systems for distributed load balancing in network environments are described. Embodiments of a distributed load balancing method and system are described that may be implemented according to embodiments of a distributed load balancer in various network environments. Embodiments of the distributed load balancer may, for example, be used to facilitate and maintain packet flows, for example Transmission Control Protocol (TCP) technology packet flows, between clients on an external network such as the Internet and destinations, typically servers (e.g., web servers, application servers, data servers, etc.) on a local network, such as a provider network 1900 as illustrated in FIGS. 33A and 33B. While embodiments are primarily described herein in relation to processing TCP packet flows, note that embodiments may be applied to other data communications protocols than TCP, and to other applications than processing packet flows.

The distributed load balancer may act to facilitate and maintain TCP packet flows between particular clients and selected servers (e.g., web servers). However, the distributed load balancer does not terminate the TCP flows from the clients and does not act as a proxy to the servers as is done in conventional load balancers. Instead, the load balancer nodes of the distributed load balancer route TCP packets received from the clients to target servers, and the servers use their TCP stacks to manage the TCP connections to the clients. In other words, the servers terminate the TCP packet flows from the clients.

In addition, instead of the load balancer node(s) making decisions as to which server will service a connection request based on a load balancing technique or algorithm applied to information collected from the servers as is done in conventional load balancer technology, the load balancer nodes may randomly select a server to receive a new connection request, and a component of the distributed load balancer that resides on the server node makes the decision locally as to whether the selected server will accept or reject the new connection request based on one or more metrics of the current status of the respective server. Thus, the decisions as to which servers are to accept connection requests is moved from the load balancer node(s) to the server nodes that will be handling the connections. In other words, the decision is moved closer to where and when the connection request will be serviced.

To facilitate and maintain the packet flows between the clients and the servers, embodiments of the distributed load balancer may employ various techniques or technologies including but not limited to multipath routing technology, consistent hashing technology, distributed hash table (DHT) technology, Border Gateway Protocol (BGP) technology, membership tracking, health checking, connection publishing, and packet encapsulation and decapsulation. These as well as other aspects of the distributed load balancing system are described below in relation to the Figures.

Distributed Load Balancing System

Figure 1:
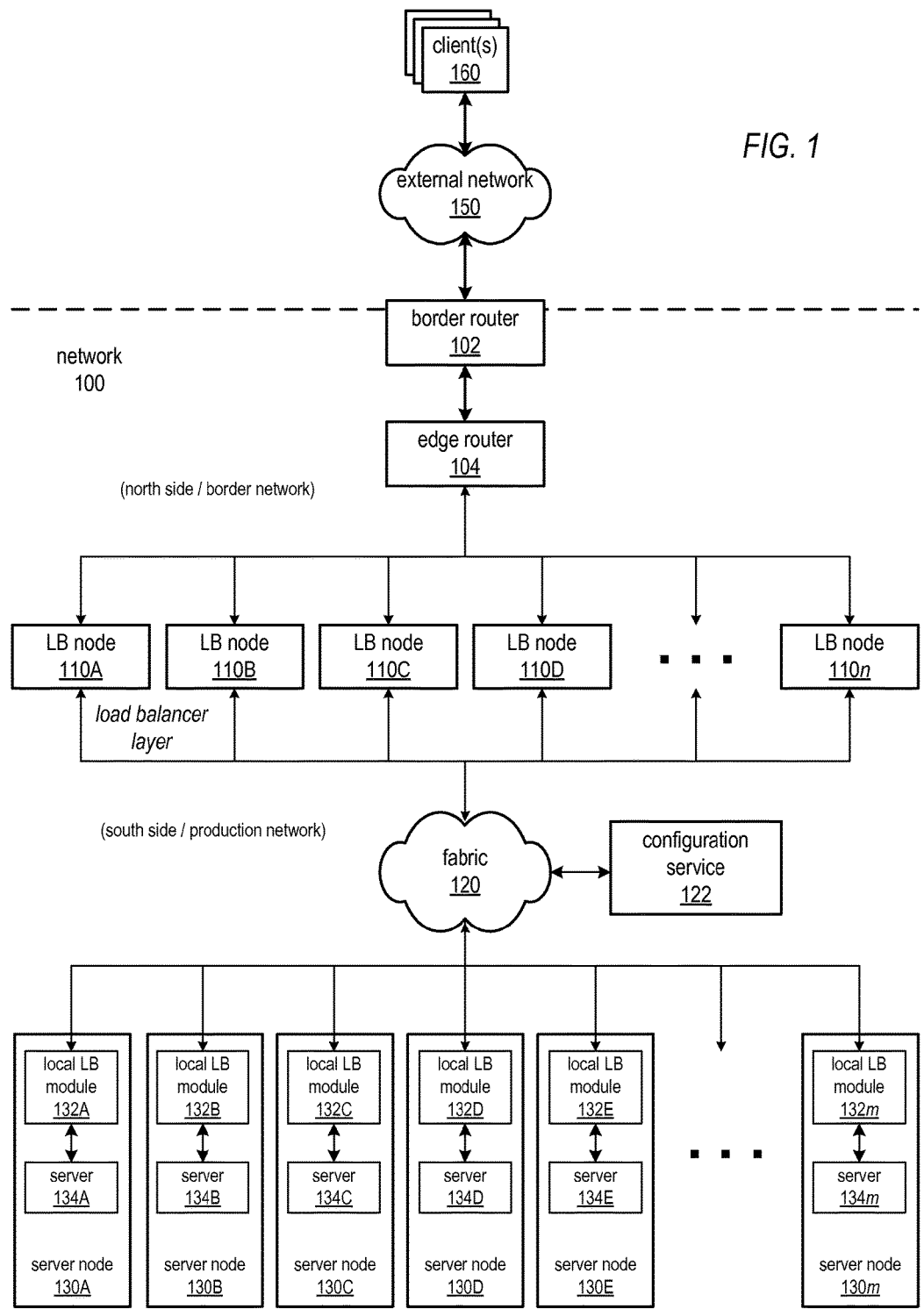
FIG. 1 is a block diagram of an example distributed load balancing system, according to at least some embodiments.

FIG. 1 is a block diagram of an example distributed load balancing system, according to at least some embodiments. Embodiments of the distributed load balancer may be implemented in a network 100, for example a provider network 1900 of a service provider as illustrated in FIGS. 33A and 33B. As a high-level overview of client packet handling in the distributed load balancer system, one or more clients 160 of the network 100 may connect to a border router 102 of the network 100, for example via an external network 150 such as the Internet. The border router 102 may route incoming packets (e.g., TCP packets) from clients 160 to an edge router 104 component of the distributed load balancer that routes the incoming packets to the load balancer (LB) nodes 110 in a load balancer node layer of the distributed load balancer system. In at least some embodiments, the edge router 104 may make the routing decisions according to a per-flow hashed multipath routing technique, for example an equal-cost multipath (ECMP) hashing technique. The load balancer nodes 110 in turn encapsulate the packets (e.g., according to User Datagram Protocol (UDP)) and route the encapsulated packets to the local load balancer modules 132 on the server nodes 130 via a network fabric 120 (e.g., an L3 network) on network 100. The fabric 120 may include one or more networking devices or components including but not limited to switches, routers, and cables. On the server nodes 130, the local load balancer modules 132 decapsulate the packets and send the client TCP packets to the TCP stacks of the servers 134. The servers 134 on the server nodes 130 then use their TCP stacks to manage the connections to the clients 160.

Figure 2:
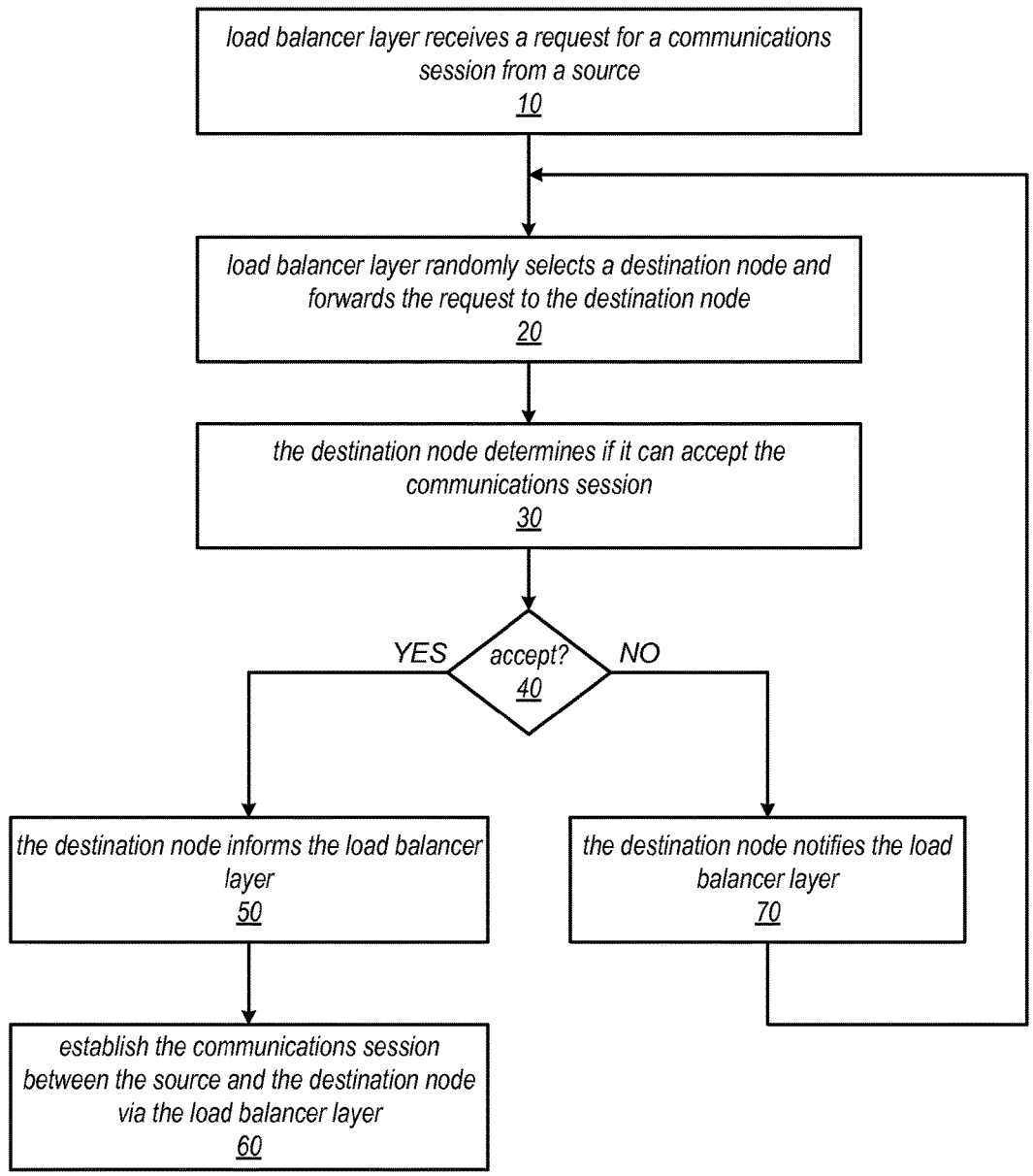
FIG. 2 is a high-level flowchart of a load balancing method that may be implemented by the distributed load balancer system of FIG. 1, according to at least some embodiments.

FIG. 2 is a high-level flowchart of a load balancing method that may be implemented by the distributed load balancer system of FIG. 1, according to at least some embodiments. Embodiments of the distributed load balancer system may not solve the hard problem of assigning load among multiple destinations (e.g., web servers) as is done in conventional load balancers. For example, conventional load balancers typically use techniques or algorithms such as max connections, round robin, and/or least connections techniques to select which server should handle a connection. However, these techniques have drawbacks, and in particular are difficult to perform successfully in a distributed system where the data used to make load balancing decisions is often almost immediately stale. In at least some embodiments of the distributed load balancer system, instead of attempting to select a server node 130 to satisfy a connection request using one or more of the load balancing techniques as is done in conventional load balancers, a load balancer node 110 in the load balancer node layer may randomly determine a server node 130 to receive a request for a client connection. If that server node 130 considers itself overloaded, the server node 130 may send the connection request back to the load balancer node 110 thus informing the load balancer node 110 that the server node 130 cannot currently handle the connection. The load balancer node layer may then randomly determine another server node 130 to receive the connection request, or alternatively may return an error message to the requesting client 160 to inform the client 160 that the connection cannot currently be established.

As indicated at 10 of FIG. 2, the load balancer node layer of the distributed load balancer system receives a request for a communication session (e.g., a TCP connection) from a source. The source may, for example, be a client 160 on an external network 150 to the network 100 that implements the distributed load balancer system. In at least some embodiments, the request may be received from the client 160 at a border router 102 of the network 100, and routed to an edge router 104 that routes the incoming packets to the load balancer (LB) nodes 110 in a load balancer node layer, for example using a per-flow equal-cost multipath (ECMP) hashing technique to pseudorandomly select a load balancer node 110 to which a particular connection request from a client 160 is to be routed.

As indicated at 20, the load balancer node layer randomly selects a destination node and forwards the connection request to the selected destination node. The destination node may, for example, be one of a plurality of server nodes 130 fronted by the load balancer. In at least some embodiments, a load balancer node 110 in the load balancer layer may randomly select a server node 130 to receive a connection request from among all known server nodes 130. However, other methods than purely random selection from among all known server nodes 130 may be used in some embodiments to select server nodes 130 to receive the connection requests. For example, in some embodiments, information about the server nodes 130 may be used by the load balancer nodes 110 to weight the random selection of server nodes 130. As an example, if the load balancer nodes 110 know that different server nodes 130 are different types of devices or are configured with different CPUs and thus have different capabilities or capacities, the information may be used to bias the random selection towards (or away from) particular type(s) or configuration(s) of server node 130.

As indicated at 30, the destination node determines if it can accept the communications session. In at least some embodiments, a local load balancer (LB) module 132 on the server node 130 determines if the respective server 134 on the server node 130 can accept the new connection based on one or more metrics of the current status of the respective server 134.

At 40, if the connection request is accepted, then as indicated at 50 the destination node informs the load balancer node layer that the destination node can handle the connection. As indicated at 60, a communications session is then established between the source (e.g., a client 160) and the destination node (e.g., a server 134 on a server node 130) via the load balancer node layer. In at least some embodiments, the server 134 on the server node 130 uses a TCP stack to manage the connection to the client 160.

At 40, if the connection request is not accepted, then as indicated at 70 the destination node notifies the load balancer node layer, and the method may return to element 20. The load balancer node layer may then randomly select another destination node at 20, or alternatively may inform the requesting client 160 that the connection cannot currently be established. Note that the client 160 may, but does not necessarily, resubmit the connection request to begin the method again at element 10.

Referring again to FIG. 1, at least some embodiments of the distributed load balancer system may use commodity hardware to route client traffic received at an edge router 104 on network 100 to server nodes 130 on the network 100. At least some embodiments of the distributed load balancer may include a load balancer node layer that includes multiple load balancer nodes 110. In at least some embodiments, each load balancer node 110 may serve in one or more of multiple roles in the load balancer node layer. These roles of the load balancer nodes 110 may include the roles of an ingress node, and egress node, and a flow tracker node (as a primary flow tracker or a secondary flow tracker for a given packet flow). In at least some embodiments, each load balancer node 110 may be implemented in the load balancer node layer as or on a separate computing device, such as a commodity rack-mounted computing device. In at least some embodiments, each load balancer node 110 may serve in each of the three roles of ingress node, egress node, and flow tracker node (as a primary or secondary flow tracker for a packet flow), with the load balancer node 110 generally serving in only one (but possibly in two or three) of the roles for particular packet flows. Note, however, that in at least some embodiments, a load balancer node 110 is not allowed to serve as both the primary flow tracker and the secondary flow tracker for a particular packet flow. Alternatively, in some embodiments, each load balancer node 110 may serve in only one of the three roles. In this embodiment, separate sets of computing devices may be implemented in the load balancer node layer specifically as ingress nodes, egress nodes, and flow tracker nodes.

In at least some embodiments, consistent hashing and consistent hash ring technology may be applied to determine the primary and secondary flow trackers for the packet flows. Each packet flow from a client may be uniquely identified, for example by a 4-tuple consisting of: the client IP address, client port, server (public) IP address, and server port. This identifier may be abbreviated as CP or CcPp indicating the client and public endpoint pair. Packets associated with any given TCP flow (or CP pair) can appear on any load balancer node 110 operating as an ingress server 112 due to the hashed multipath (e.g., ECMP) flow distribution from the edge router 104. Consistent hashing is used so that when a packet arrives at a load balancer node 110 serving as an ingress node, the ingress node can determine which load balancer node 110 is responsible for maintaining the state for the packet flow (i.e., the primary flow tracker node). The CP pair may be hashed by the ingress node into a consistent hash ring to determine which load balancer node 110 is responsible for maintaining state information for the packet flow. The node 110 determined according to the consistent hash of the CP pair for the packet flow in the consistent hash ring is the node 110 that serves as the primary flow tracker for the packet flow. In at least some embodiments, the successor node in the consistent hash ring serves as the secondary flow tracker for the packet flow.

Figure 3:
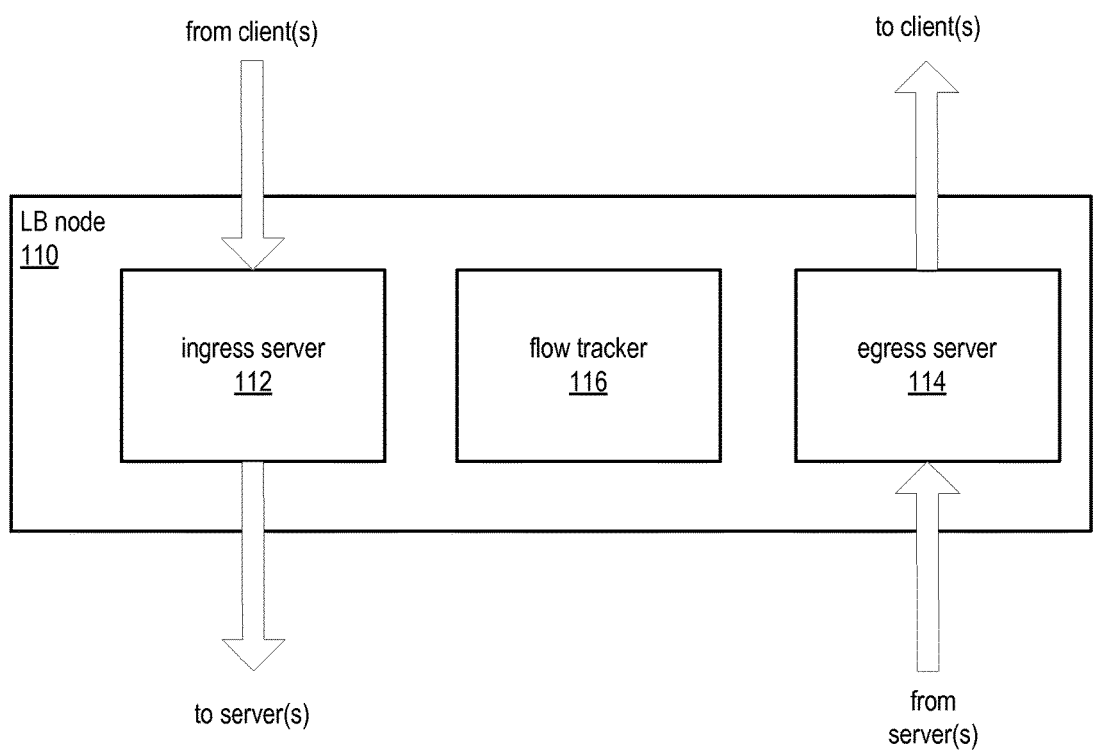
FIG. 3 shows an example load balancer node that includes ingress, egress, and flow tracker components, according to at least some embodiments.

FIG. 3 shows an example load balancer (LB) node 110 that includes components that implement all three roles (ingress, egress, and flow tracker), according to at least some embodiments. In this example, an ingress server 112 component performs the ingress role of receiving inbound TCP packets from client(s) and sending the TCP packets as encapsulated packets to the server(s). An egress server 114 component performs the egress role of receiving outbound encapsulated packets from the server(s) and sending the decapsulated TCP packets on to the client(s). A flow tracker 116 component performs as a primary or secondary flow tracker for one or more packet flows that are established between the client(s) 160 and the server(s) 134. The ingress server 112 may also communicate with the flow tracker 116 on load balancer node 110, or with the flow tracker 116 on another load balancer node 110 to initiate a TCP connection between a client and one of the servers 134 in response to a connection request received from the respective client 160, or to obtain mapping information for the packet flow.

Load Balancer Nodes

Referring again to FIG. 1, in at least some embodiments, the load balancer nodes 110 in the load balancer node layer receive client traffic (packets, e.g. TCP packets) from one or more routers 104 on the network and encapsulate the packets according to a protocol (e.g., the User Datagram Protocol (UDP)) used by the distributed load balancer system on the fabric 120. The load balancer node layer then forwards the encapsulated packets to the destination server nodes 130 over fabric 120. Each server node 130 includes a local module 132 that is a component of the load balancer system. The module 132 may be referred to herein as a load balancer module or simply LB module, and may be implemented in software, hardware, or a combination thereof on the server node 130. At each server node 130, the respective load balancer module 132 decapsulates the packets and sends the TCP packets to a local TCP stack for normal TCP processing. In at least some embodiments, the load balancer node layer may maintain state information for every client-server TCP flow; however, the load balancer nodes 110 in the load balancer node layer may not interpret anything about the TCP flow. Each flow is managed between the server 134 on the respective server node 130 and the client 160. The distributed load balancer system insures that the TCP packets arrive at the correct destination server 134. The load balancer module 132 at each server node 130 makes the decision as to whether the respective server 134 will accept or reject a new connection in response to a client connection request received from a load balancer node 110.

In at least some embodiments, the distributed load balancing system may use consistent hashing technology to, for example, determine which load balancer node(s) 110 should remember which server node 130 is responsible for a particular TCP packet flow. Using consistent hashing technology, the load balancer nodes 110 in the load balancer node layer may be viewed as a consistent hash ring, and the load balancer nodes 110 may keep track of membership in the ring and determine particular members in the ring that are responsible for particular packet flows according to a consistent hashing function. In at least some embodiments, there are two load balancer nodes 110 that are responsible for tracking each packet flow between the clients 160 and the servers 134; these nodes 110 may be referred to as the primary flow tracker (PFT) node and the secondary flow tracker (SFT) node. In at least some embodiments, the primary flow tracker is the first load balancer node 110 on the consistent hash ring for the flow, and the secondary flow tracker is the next or subsequent load balancer node 110 on the consistent hash ring distinct from the primary flow tracker node. In this arrangement, if the primary flow tracker node fails, then the secondary flow tracker node may become the new primary flow tracker, and another load balancer node 110 (e.g., the next node 110 on the consistent hash ring) may assume the role of the secondary flow tracker. Note that, in at least some embodiments, a load balancer node 110 is not allowed to serve as both the primary flow tracker and the secondary flow tracker for a given packet flow. This and other membership changes in the consistent hash ring are discussed later in this document. In at least some embodiments, configuration information for the load balancer implementation (e.g., authoritative list(s) of the load balancer nodes 110 and server nodes 130 that are currently in the implementation) may be maintained by a configuration service 122 component of the distributed load balancing system, which may for example be implemented on one or more server devices coupled to the load balancer nodes 110 via the fabric 120.

In at least some embodiments, in addition to serving as primary and secondary flow tracker nodes, the load balancer nodes 110 may also perform in one of two other roles for a given flow: the role of an ingress node and the role of an egress node. An ingress node for a packet flow is the load balancer node 110 that receives the respective packet flow from the edge router 104 and forwards the packet flow (as encapsulated packets) to a selected server 134 on a server node 130 via fabric 120. An ingress node is the only load balancer node 110 that moves actual client data (TCP data packets) to the respective destination server node 130. The ingress node maintains a mapping of the TCP flow to a respective load balancer module 132 on the destination server node 130 so that the ingress node knows which load balancer module 132 to forward the client traffic to. An egress node is a load balancer node 110 that is responsible for forwarding the response traffic for a packet flow received from the server node 130 via fabric 120 to the respective client 160 via the border network. The load balancer module 132 encapsulates response packets obtained from the server 134 according to a load balancer protocol (e.g., UDP) and sends the encapsulated response packets to the respective egress node for the flow via fabric 120. The egress nodes are stateless and simply decapsulate the packets and send the response packets (e.g., TCP packets) onto the border network to a border router 102 for delivery to the respective client 160 via the external network 150.

As previously mentioned, in at least some embodiments, each load balancer node 110 may perform the roles of an ingress node, an egress node, and/or a flow tracker node (as either a primary or a secondary flow tracker) for different packet flows. A single load balancer node 110 in the load balancer node layer may perform in any one of the roles depending on what packet flow the node is processing. For example, in at least some embodiments, a load balancer node 110 may perform as an ingress node for one packet flow, as a primary or secondary flow tracker for another packet flow, and as an egress node for yet another packet flow. In addition, in at least some embodiments a load balancer node 110 may perform multiple roles for the same packet flow, for example as the ingress node and as the primary (or secondary) flow tracker node for a given packet flow. However, in at least some embodiments, for redundancy and recovery purposes, a load balancer node 110 is not allowed to serve as both the primary and secondary flow tracker node for the same packet flow.

The above describes embodiments where each load balancer node 110 may serve in any of the three roles of ingress server, egress server, and flow tracker. However, in some embodiments, different groups of computing devices may be assigned to the different roles in the load balancing system. For example, in some embodiments, there may be distinct sets of ingress nodes, egress nodes and flow tracker nodes each implemented on a separate computing device. As another example, in some embodiments, one set of computing devices may serve as both ingress nodes and flow tracker nodes, while another set of computing devices may serve only as egress nodes.

Load Balancer Modules

As previously mentioned, each server node 130 includes a local load balancer module 132 that is a component of the load balancer system. The module 132 may be implemented in software, hardware, or a combination thereof on the server node 130. In at least some embodiments, the load balancer module 132 on a server node 130 may perform three main roles: encapsulating outgoing and decapsulating incoming packets, making local load balancing decisions for the server 134 on the node 130, and connection publishing. These three roles are briefly described below, and described in more detail later in this document.

At least some embodiments of the distributed load balancing system do not terminate TCP connections and do not spoof packets; the source and destination IP addresses of all packets sent through the load balancer node layer are the actual IP addresses of the endpoints (i.e., the clients 160 and servers 134) involved in the packet flows. Instead of spoofing, these embodiments encapsulate all packets sent between the load balancer nodes 110 and the server nodes 130 on fabric 120, for example as UDP packets. Since the inbound packets in a packet flow arriving at a server node 130 from a load balancer node 110 acting as the ingress node for the flow are encapsulated by the load balancer node 110, the packets need to be decapsulated and redirected to a localhost TCP flow for the server 134 on the node 130. The load balancer module 132 on node 130 performs this decapsulation. Similarly, outgoing packets for a packet flow from the server 134 are encapsulated by the load balancer module 132 and sent via fabric 120 to a load balancer node 110 acting as the egress node for the packet flow.

In at least some embodiments, the load balancer modules 132 on the server nodes 130 also make local decisions related to load balancing for the servers 134 on the respective server nodes 130. Specifically, the load balancer module 132 on a node 130 decides whether the respective server 134 will accept another TCP flow in response to receiving a request for a new TCP connection. As previously noted, the load balancer nodes 110 encapsulate all packets sent to the load balancer module 132, so the load balancer module 132 actually does not receive a TCP synchronize (SYN) packet from the client 160; instead, the load balancer module 132 receives a connection request message according to the encapsulation protocol (e.g., UDP) from a flow tracker 116 which the load balancer module 132 can either accept or reject. If the load balancer module 132 accepts the connection request message, the load balancer module 132 creates a SYN packet destined for the localhost. When the localhost accepts the connection, this becomes the actual TCP stack handling the respective client connection.

In at least some embodiments, to make the decision as to whether a connection request message should be accepted, the load balancer module 132 looks at one or more metrics regarding current resource consumption on the server node 130, and if there are sufficient resources available to handle the new connection, the load balancer module 132 accepts the connection. In at least some embodiments, resource metrics that may be considered by the load balancer module 132 may include one or more of, but are not limited to, CPU utilization, recent bandwidth consumption, and number of established connections. Other metrics may be considered instead of or in addition to these metrics in some embodiments. For example, in some embodiments, the load balancer module may consider server latency (i.e., the amount of time requests are spending in the server connection backlog) as a metric, and may reject the connection request if server latency is above a threshold. Using these and/or other metrics, the load balancer module 132 can decide for the respective server 134 whether the server 134 is to accept or reject new packet flows. In at least some embodiments, a resource utilization rate (e.g., N % utilization) may be determined from the metric(s) individually or in combination and compared to a threshold (e.g., 90% utilization). If the determined resource utilization rate is at or above the threshold, or if adding the connection would move the rate to above the threshold, then the connection request may be rejected.

In at least some embodiments, the load balancer modules 132 may implement a probabilistic method for determining if connection request messages are to be rejected. Instead of rejecting all connection requests if resource utilization is at or above a threshold as described above, in this method may reject connection requests at different probabilities at two or more different levels of utilization. For example, if resource utilization is 80%, a load balancer module 132 may reject connection requests at 20% probability; if resource utilization is 90%, the load balancer module 132 may reject connection requests at 25% probability; if resource utilization is 95%, the load balancer module 132 may reject connection requests at 50% probability; and at 98% or above, the load balancer module 132 may reject all connection requests.

In at least some embodiments, each connection request message may include an indication of how many times the connection request message has been rejected by load balancer modules 132. If a connection request message received by a load balancer module 130 indicates that it has been rejected over a threshold number of times, the load balancer module 130 may accept the connection even though the performance metrics of the server node 130 indicate that the connection request should be rejected.

In some cases, it is possible that all of the load balancer modules 132 that a connection request message is sent to may reject the connection request. In at least some embodiments, to prevent a connection request message from being bounced from load balancer module 132 to load balancer module 132 for an indefinite period, each connection request message may be given a time to live. If this time to live expires, the flow tracker node may terminate the request and notify the respective client 160 that the request cannot currently be serviced.

In at least some embodiments, the load balancer modules 132 on the server nodes 130 also perform connection publishing to the load balancer nodes 110. In at least some embodiments, to perform connection publishing, periodically or aperiodically (e.g., once a second) each load balancer module 132 looks at the routing table (e.g., a netstat routing table) on the server node 130 and publishes a list of active connections (TCP flows) back to the load balancer nodes 110. The load balancer nodes 110 that need to be informed about the existence of a given packet flow are the load balancer nodes 110 that are serving as the ingress node and as the primary and secondary flow trackers for the respective packet flow. In some embodiments, the load balancer module 132 may use a consistent hashing technique to filter the list of load balancer nodes 110 that need to be informed about the active TCP flows on the server node 130. For example, the load balancer module 132 may determine which load balancer nodes 110 are serving as the primary and secondary flow trackers for a given packet flow according to the consistent hash ring. In some embodiments, the load balancer module 132 tracks which load balancer node 110 last sent a data packet to the load balancer module 132 for each packet flow, and uses this information to determine which load balancer nodes 110 are serving as ingress nodes for the packet flows, since only ingress nodes forward client data to the load balancer module 132. In some embodiments, the load balancer module 132 then formulates messages for each of the load balancer nodes 110 that it has determined need to be informed about the packet flows and sends the messages to the load balancer nodes 110 to inform the nodes 110 that the respective server node 130 is still maintaining the connection(s) to the client(s) 160. This connection publishing to the load balancer nodes 110 by the load balancer modules 132 may be viewed as extending a lease at the load balancer nodes 110. If a load balancer node 110 has not received a connection publishing message indicating a particular packet flow within a period of time (e.g., ten seconds), then the load balancer node 110 is free to forget about the respective packet flow.

Multipath Routing to Load Balancer Nodes

Figure 4:
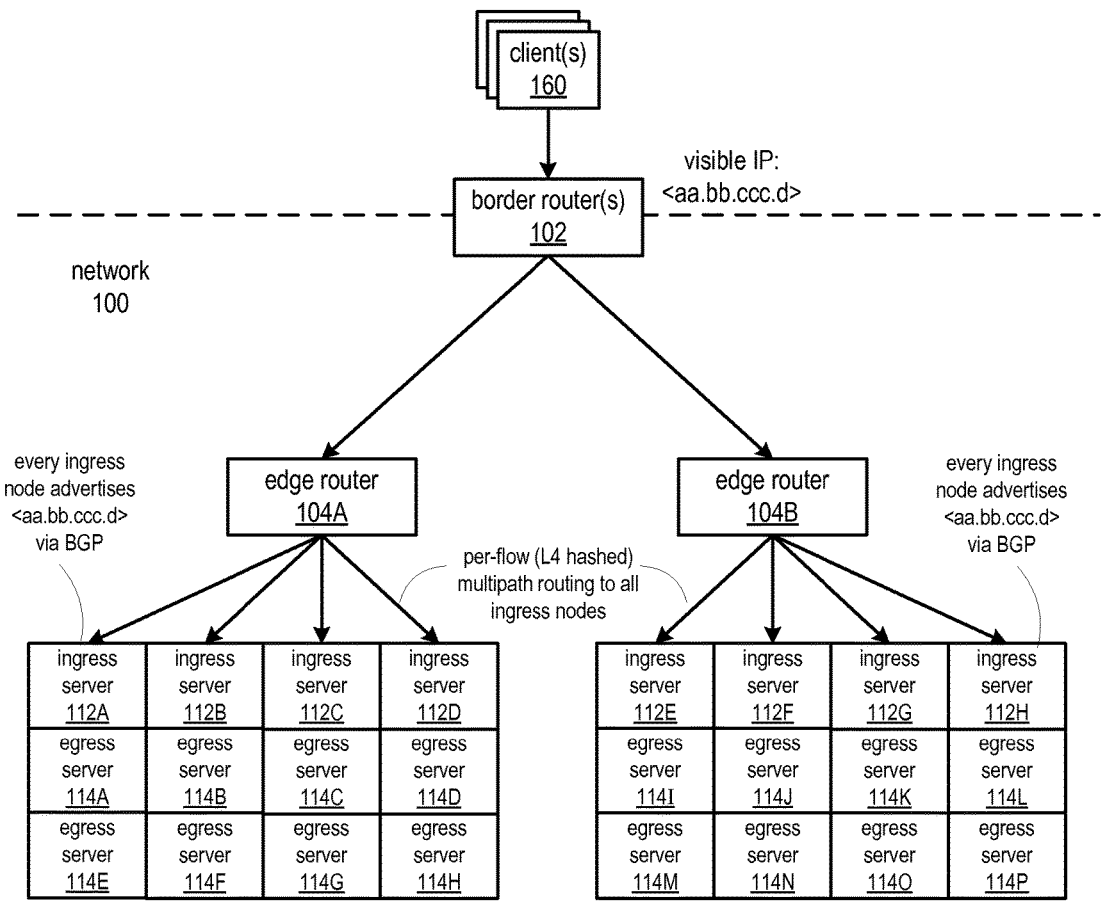
FIG. 4 illustrates routing and packet flow in the distributed load balancer, according to at least some embodiments.

FIG. 4 illustrates aspects of routing and packet flow in the distributed load balancer, according to at least some embodiments. In at least some embodiments, each ingress node (ingress nodes are shown in FIG. 4 as ingress servers 112) advertises its ability to route one or more public endpoints (e.g., IP address and port) to the edge router 104 for the distributed load balancer, for example via the border gateway protocol (BGP). In at least some embodiments, rather than each ingress node advertising itself to the edge router 104 via a BGP session, one or more other ingress nodes, for example two neighbor nodes, may establish BGP sessions with the edge router 104 to advertise the ingress node, as shown in FIG. 5.

Conventional load balancers can typically only serve a single public endpoint. In contrast, embodiments of the distributed load balancer enable multiple load balancer nodes 110 to service a single public endpoint. Depending on router capabilities, this enables configurations in which a single public IP address routed to all the ingress servers 112 may handle the entire bandwidth (e.g., 160 Gbps) through the edge router(s) 104. In at least some embodiments, to achieve this, the edge router(s) 104 may utilize a layer 4 per-flow hashed multipath routing technique, for example an equal-cost multipath (ECMP) routing technique, to distribute traffic across multiple ingress servers 112 each advertising the same public IP address. Distributing incoming packets to all of the ingress servers 112 using layer-4 source and destination ports for the flows as part of the edge router(s) 104 flow hash may generally keep the packets for each connection routed to the same load balancer node 110 serving as the ingress server 112 to avoid out-of-order packets. Note, however, that the edge router(s) 104 may use other techniques to distribute traffic across the ingress servers 112 in some embodiments.

FIG. 4 also shows that two or more distributed load balancers may be implemented on a network 100. The two or more distributed load balancers may each act as an independent load balancer that fronts a plurality of servers 130 and that each advertises a different public IP address, or alternatively as shown in FIG. 4 two or more distributed load balancers may each advertise the same IP address, and a hashing technique (e.g., a layer 4 per-flow hashed multipath routing technique) may be used at the border router(s) 102 to partition the packet flows out to the edge routers 104, which in turn distribute the packet flows to their respective ingress servers 112.

Figure 5:
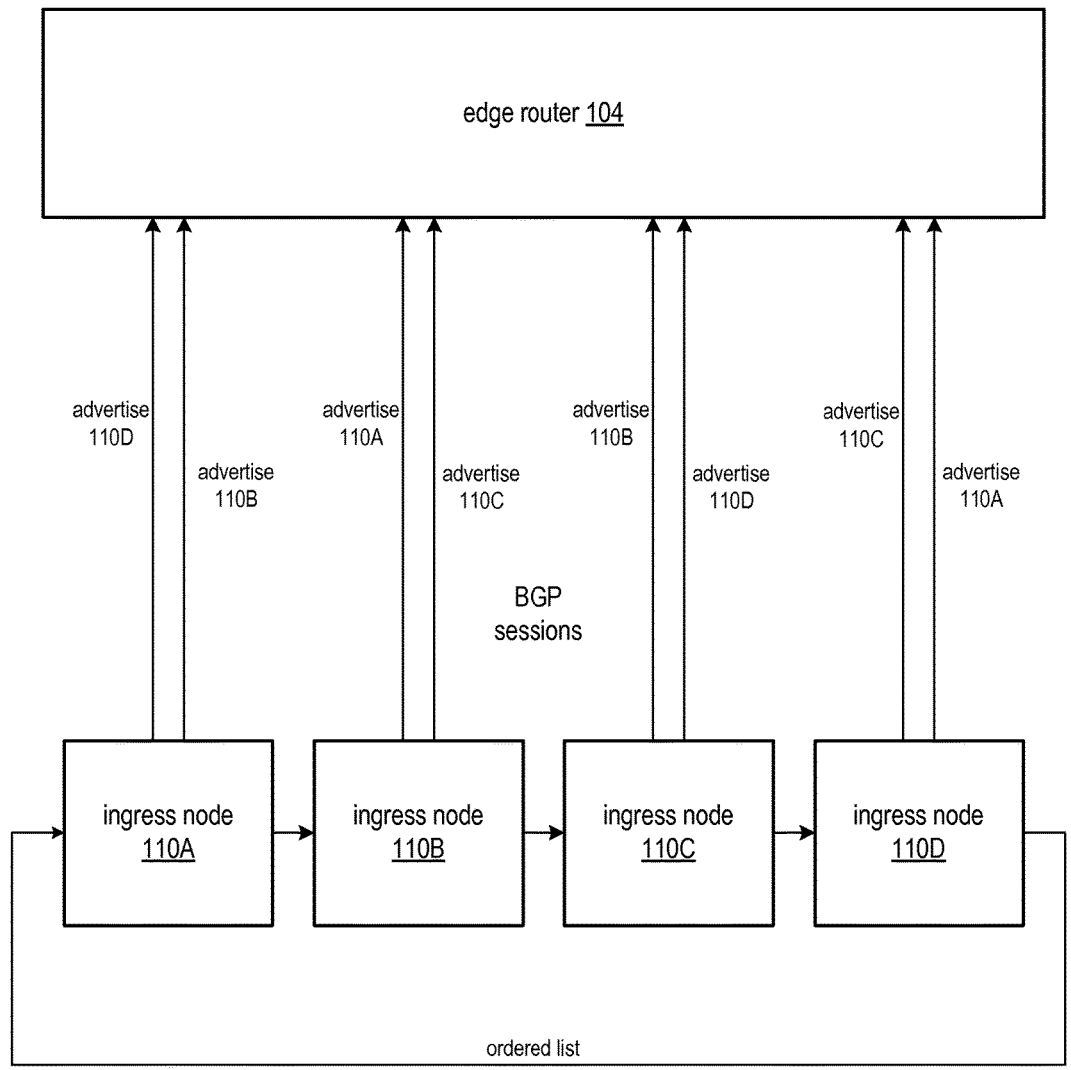
FIG. 5 illustrates advertising ingress nodes to the edge router, according to at least some embodiments.

FIG. 5 illustrates using Border Gateway Protocol (BGP) to advertise ingress nodes to the edge router, according to at least some embodiments. In this example, there are four load balancer nodes serving as ingress nodes 110A through 110D in the load balancer implementation. Edge router 104 routes incoming packets from clients (not shown) to the load balancer nodes 110. In at least some embodiments, the edge router 104 may make the routing decisions according to a layer 4 per-flow hashed multipath routing technique, for example an equal-cost multipath (ECMP) routing technique.

In at least some embodiments, edge router 104 learns about the ingress nodes 110 that are currently available in the load balancer implementation to receive client traffic via Border Gateway Protocol (BGP) technology advertising sessions initiated by the ingress nodes 110. Each ingress node 110 could use BGP to advertise itself to the edge router 104. However, BGP typically takes a relatively long time to converge (three seconds or more). Using this technique where each ingress node 110 advertises itself via BGP, if an ingress node 110 goes down, it may take considerable time in networking terms (three seconds or more) for the BGP session on the edge router 104 to time out and thus for the edge router 104 to learn about the failure close down and reroute the current TCP flows to the ingress node 110.

To avoid the convergence problem with BGP and to recover more quickly upon node 110 failure, in at least some embodiments, instead of an ingress node 110 advertising itself to the edge router 104 via a BGP session, at least one other ingress node 110 in the load balancer implementation takes responsibility for advertising the ingress node 110 to the edge router 104 via BGP. For example, in some embodiments as shown in FIG. 5, the left and right neighbor ingress nodes 110 of a given ingress node 110, for example the left and right neighbors in an ordered listing of the nodes 110, for example a consistent hash ring formed by the nodes 110, may advertise the given ingress node 110 to the edge router 104. For example, in FIG. 5, ingress node 110A advertises ingress nodes 110B and 110D, ingress node 110B advertises ingress nodes 110A and 110C, ingress node 110C advertises ingress nodes 110B and 110D, and ingress node 110D advertises ingress nodes 110C and 110A. The ingress nodes 110 check and gossip each other's health as described later in this document. Using the health check method as described, unhealthy nodes can be detected and the information can be propagated among the nodes 110 in less than a second, for example in 100 milliseconds (ms). Upon determining that an ingress node 110 is not healthy, the ingress nodes 110 that advertise the unhealthy node may immediately stop advertising the unhealthy node 110. In at least some embodiments, the ingress nodes 110 end the BGP sessions with the edge router 104 by sending a TCP Close or similar message for the BGP session to the edge router 104. Thus, rather than having to wait for a BGP session established by a failed node 110 to time out to detect the node 110 failure, the edge router 104 may discover the failed node 110 when the other ingress nodes 110 that advertise on behalf of the failed node 110 terminate the BGP sessions with the edge router 104 that advertise the node 110 upon detecting that the node 110 is unhealthy. The handling of load balancer node failures is further discussed in relation to FIGS. 18A and 18B later in this document.

Figure 6:
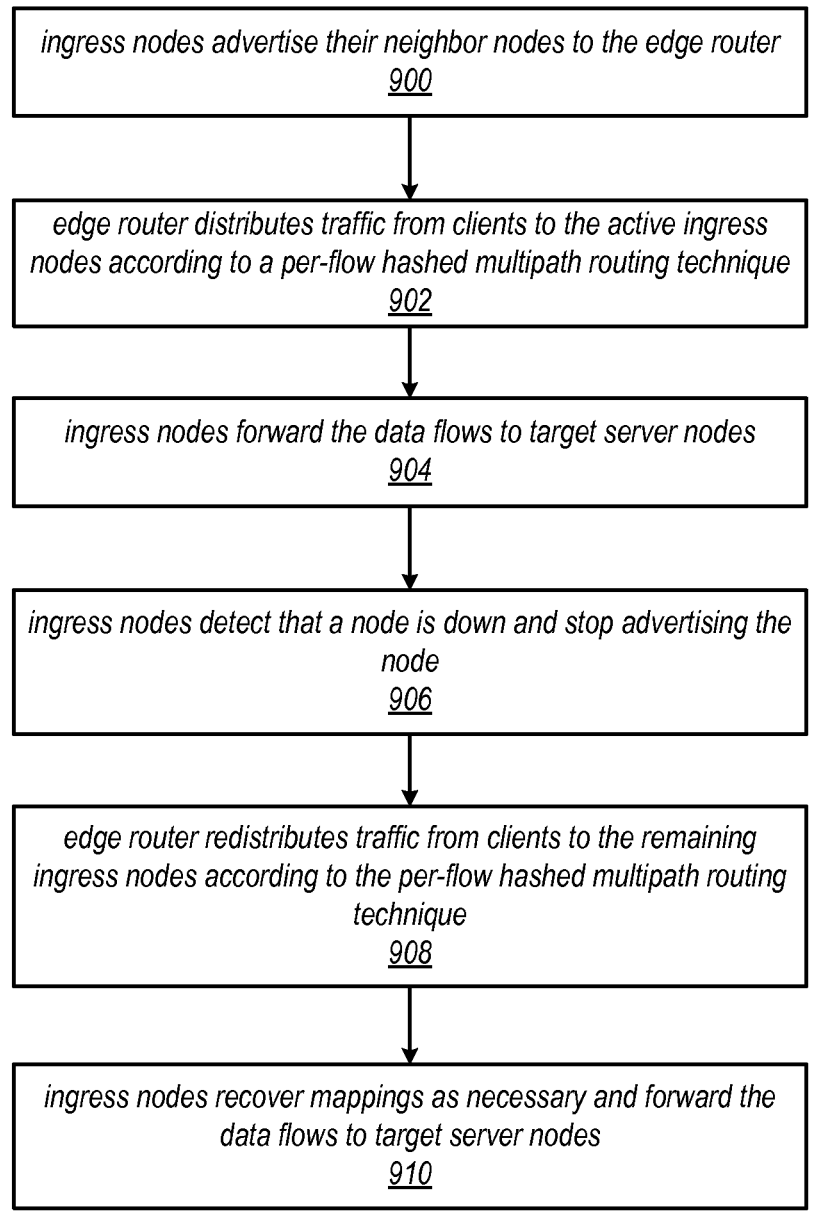
FIG. 6 is a flowchart of a multipath routing method, according to at least some embodiments.

FIG. 6 is a flowchart of a multipath routing method, according to at least some embodiments of the distributed load balancing system. As indicated at 900, the ingress nodes 110 in a load balancer implementation advertise their neighbor nodes 110 to the edge router 104. In at least some embodiments, the ingress nodes 110 may determine their neighbor nodes 110 according to an ordered listing of the nodes 110 such as a consistent hash ring. In at least some embodiments, the ingress nodes 110 advertise their neighbor node(s) 110 to the edge router 104 using BGP sessions, with one BGP session established to the edge router 104 for each advertised node 110.

As indicated at 902, the edge router 104 distributes traffic received from clients 160 to the active (advertised) ingress nodes 110 according to a per-flow hashed multipath routing technique, for example an equal-cost multipath (ECMP) routing technique. In at least some embodiments, the edge router 104 exposes a public IP address to the clients 160; the ingress nodes 110 all advertise the same public IP address to the edge router 104. The edge router uses layer-4 source and destination ports as part of the edge router's 104 flow hash to distribute the incoming packets among the ingress nodes 110. This generally keeps the packets for each connection routed to the same ingress node 110.

As indicated at 902, the ingress nodes forwards the data flows to target server nodes 130. In at least some embodiments, the ingress nodes 110 interact with primary and secondary flow tracker nodes for the data flows to map the data flows to the target server nodes 130. Thus, each ingress node 110 may maintain mappings of active data flows through the node 110 that may be used to appropriately forward the received packets to the target server nodes 130.

Elements 906 through 910 relate to detecting and recovering from ingress node 110 failures. As indicated at 906, the ingress nodes 110 may detect that an ingress node 110 is down, for example according to a health checking technique as described herein. Upon detecting that the node 110 is down, its neighbor nodes 110 stop advertising the node 110 to the edge router 104. In at least some embodiments, this involves sending a TCP Close to the edge router 104 for the respective BGP session.

As indicated at 908, the edge router 104, upon detecting that the ingress node 110 is down via the closing of the BGP sessions, redistributes incoming traffic from the clients 160 to the remaining ingress nodes 110 according to the per-flow hashed multipath routing technique. Thus, at least some data flows may be routed to different ingress nodes 110.

As indicated at 910, the ingress nodes 110 may recover mappings as necessary and forward the data flows to the appropriate target server nodes. Methods for recovering from node 110 failures on ingress nodes 110 are discussed elsewhere in this document. As one example, an ingress node 110, upon receiving a packet for which it does not have a current mapping, may use a consistent hash function to determine a flow tracker node for the data flow according to a consistent hash ring and recover the mapping from the flow tracker node.

Asymmetric Packet Flow

Figure 7:
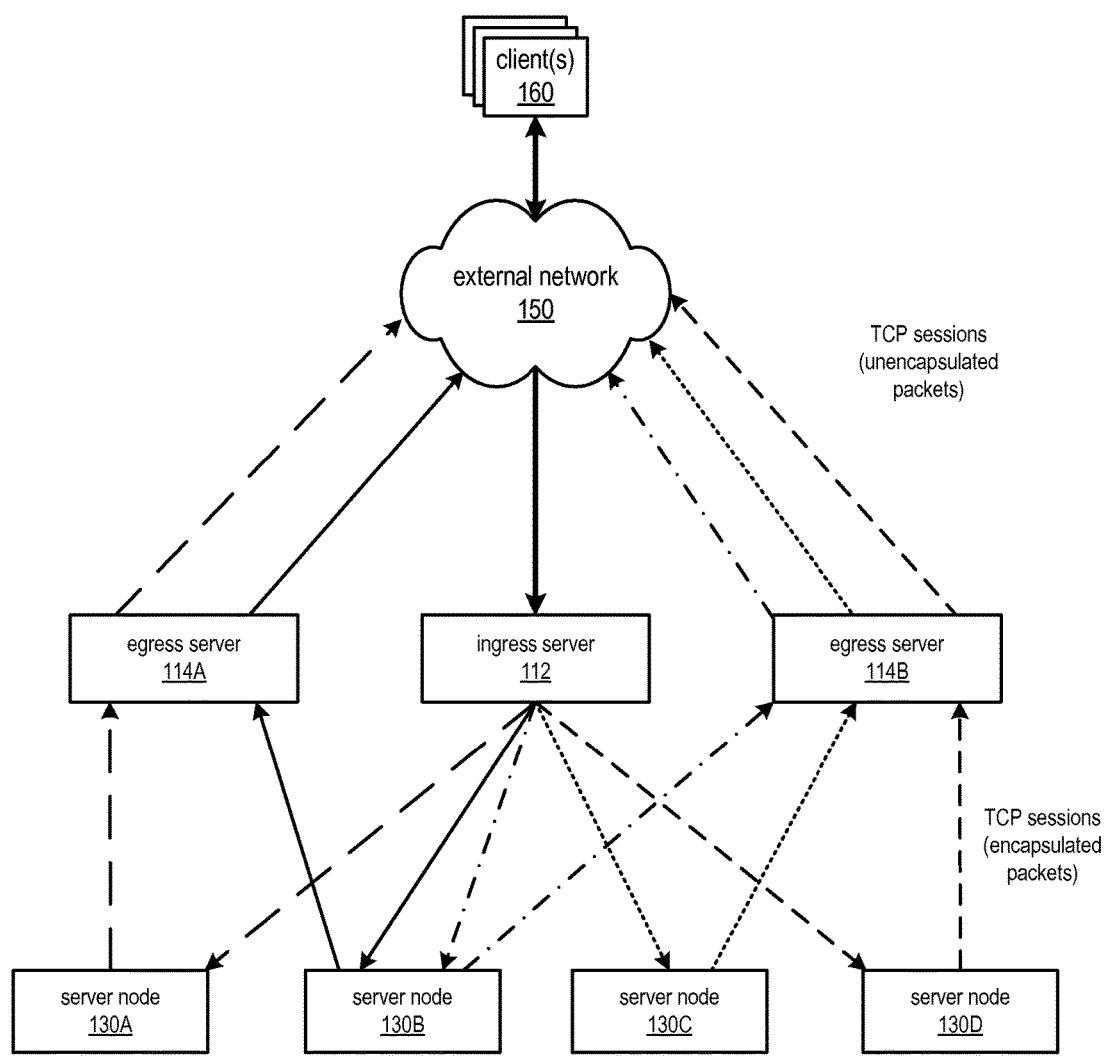
FIG. 7 graphically illustrates asymmetric packet flow, according to at least some embodiments.

In at least some embodiments, to efficiently utilize ingress node bandwidth and CPU usage when the ratio of outbound traffic to inbound data is greater than 1, the distributed load balancing system forwards outbound packets from the server nodes 130 to multiple egress nodes as shown in FIG. 7. In at least some embodiments, for each connection, the load balancer module 132 on the respective server node 130 hashes the client endpoint/public endpoint tuple and uses a consistent hash algorithm to select a load balancer node 110 to serve as the egress server 114 for the respective outbound packet flow. However, in some embodiments other methods and/or data may be used to select the egress servers 114 for connections. The selected egress server 114 may typically be, but is not necessarily, a different load balancer node 110 than the load balancer node 110 that serves as the ingress server 112 for the connection. In at least some embodiments, unless there is a failure of that load balancer node 110/egress server 114, all of the outbound packets for the particular connection will be forwarded to the same egress server 114 in order to avoid out-of-order packets.

In at least some embodiments, the method and data used for selecting an egress server 114 by the server nodes 130 may be different than the method and data used for selecting an ingress server 112 performed by the edge router(s) 104. Using the different methods and data may generally result in a different load balancer node 110 being selected as the egress node for a given connections than the load balancer node 110 selected as the ingress node for the connection, and may also result in multiple load balancer nodes 110 being selected as egress nodes to handle the outgoing traffic for connections that pass through a single load balancer node 110 serving as an ingress node.

FIG. 7 graphically illustrates asymmetric packet flow, according to at least some embodiments. At least one connection has been established from clients 160 on external network 150 through ingress server 112 to each of server nodes 130A, 130B, 130C, and 130D. In at least some embodiments, to select egress nodes for the connections, for each connection, the load balancer module 132 on the respective server node 130 hashes the client endpoint/public endpoint tuple and uses a consistent hash algorithm to select a load balancer node 110 to serve as the egress server 114 for the respective outbound packet flow. For example, server node 130A has selected egress server 114A for a connection, and server node 130B has selected egress server 114A for one connection and egress server 114B for another connection. However, in some embodiments other methods and/or data may be used to select the egress nodes for connections.

ps Recovering from Load Balancer Node Failures without Dropping Client Connections While it is possible for the load balancer nodes 110 to use consistent hashing to determine which server node 130 should receive client traffic, due to the long lifespan of some connections this approach may not maintain existing flows in cases where a new server node 130 joins the consistent hash membership and there is a subsequent ingress load balancer node 110 failure. In this scenario, a load balancer node 110 that takes over a flow from the failed node 110 may not be able to determine the original mapping selected, as the consistent hash ring for the servers 130 would have different membership. Thus, in at least some embodiments, distributed hash table (DHT) technology may be used by the load balancer nodes 110 to select server nodes 130 for connections and to route packets to the selected server nodes 130. Once a server node 130 has been selected according to the DHT to receive a particular connection, and assuming that the server node 130 stays healthy and that the load balancer module 132 on the server node 130 continues to extend the lease by periodically transmitting the status of that active connection to the DHT (e.g., via connection publishing), the DHT will retain the mapping until the connection completes. An ingress node 110 failure impacts the distribution of packets from the edge router 104 to the remaining load balancer nodes 110, resulting in the load balancer nodes 110 receiving traffic from a different set of client connections. However, since the DHT tracks all active connections, the load balancer nodes 110 can query the DHT to obtain leases for any active mappings. As a result, all the load balancer nodes 110 will pass traffic to the correct server nodes 130, thus preventing failure of active client connections even in the event of an ingress load balancer node 110 failure.

Packet Flow in the Distributed Load Balancing System

Figure 8:
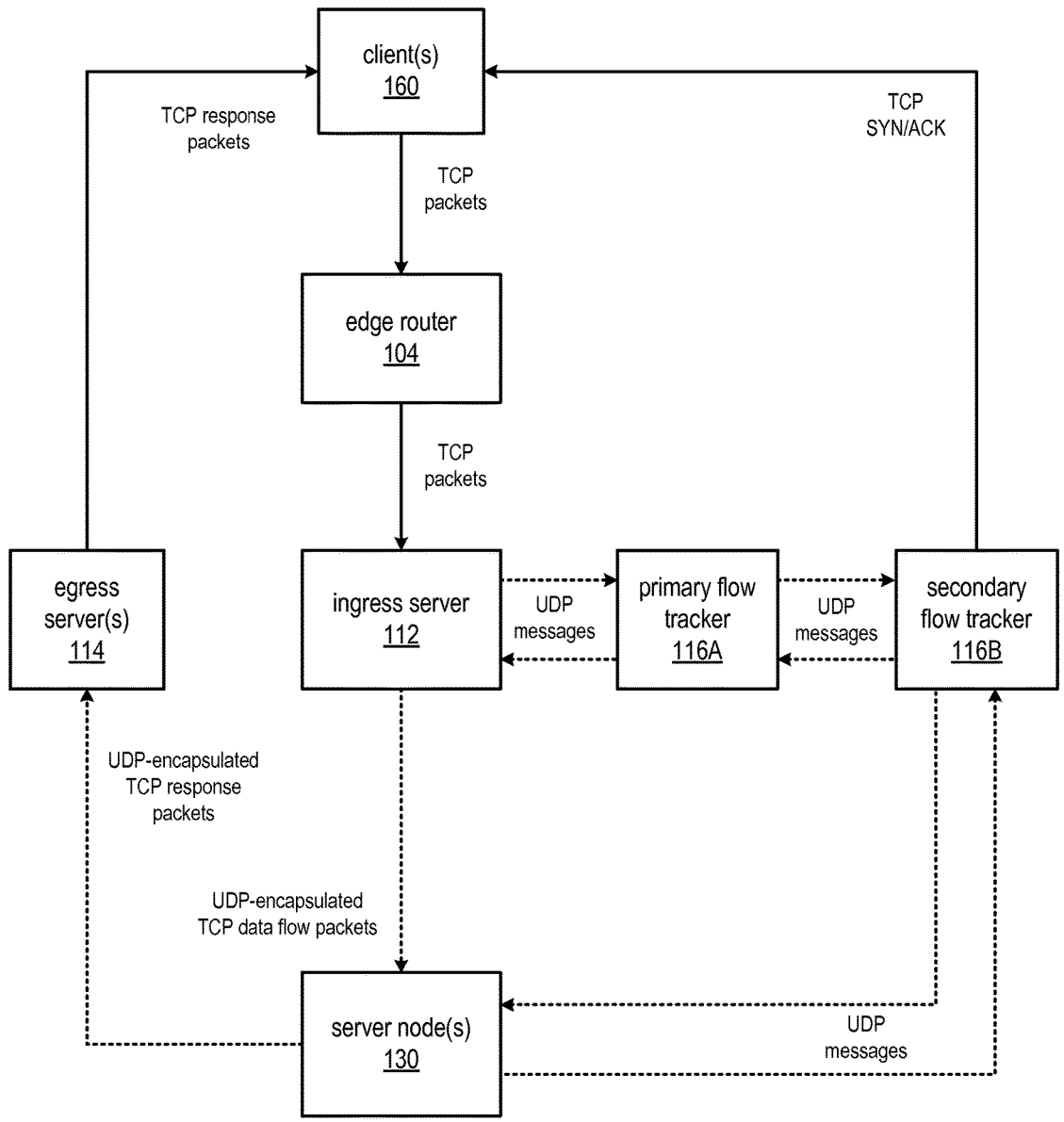
FIG. 8 illustrates packet flow in the distributed load balancing system, according to at least some embodiments.

FIG. 8 illustrates packet flow in the distributed load balancing system, according to at least some embodiments. Note that the solid lines with arrows in FIG. 8 represent TCP packets, while the dotted lines with arrows represent UDP packets. In FIG. 8, an ingress server 112 receives TCP packets from one or more clients 160 via the edge router 104. Upon receipt of a TCP packet, ingress server 112 determines if it has a mapping for the TCP packet flow to a server node 130. If the ingress server 112 does have a mapping for the TCP packet flow, then the server 112 encapsulates the TCP packet (for example according to UDP) and sends the encapsulated packet to the target server node 130. If the ingress server 112 does not have a mapping for the TCP packet flow, then the ingress server 112 may send a UDP message including information about the TCP packet flow extracted from the TCP packet to the primary flow tracker 116A to establish a connection to a server node 130 and/or obtain a mapping for the TCP packet flow. FIGS. 9A and 9B and FIGS. 10A through 10G illustrate methods for establishing a connection between a client 160 and a server node 130. The load balancer module 132 on a server node 130 randomly selects load balancer node(s) 110 to serve as the egress server(s) 114 for TCP connection(s) on the server node 130 and sends UDP-encapsulated TCP response packets to the client(s) 160 via the egress server(s) 114.

Figure 9A:
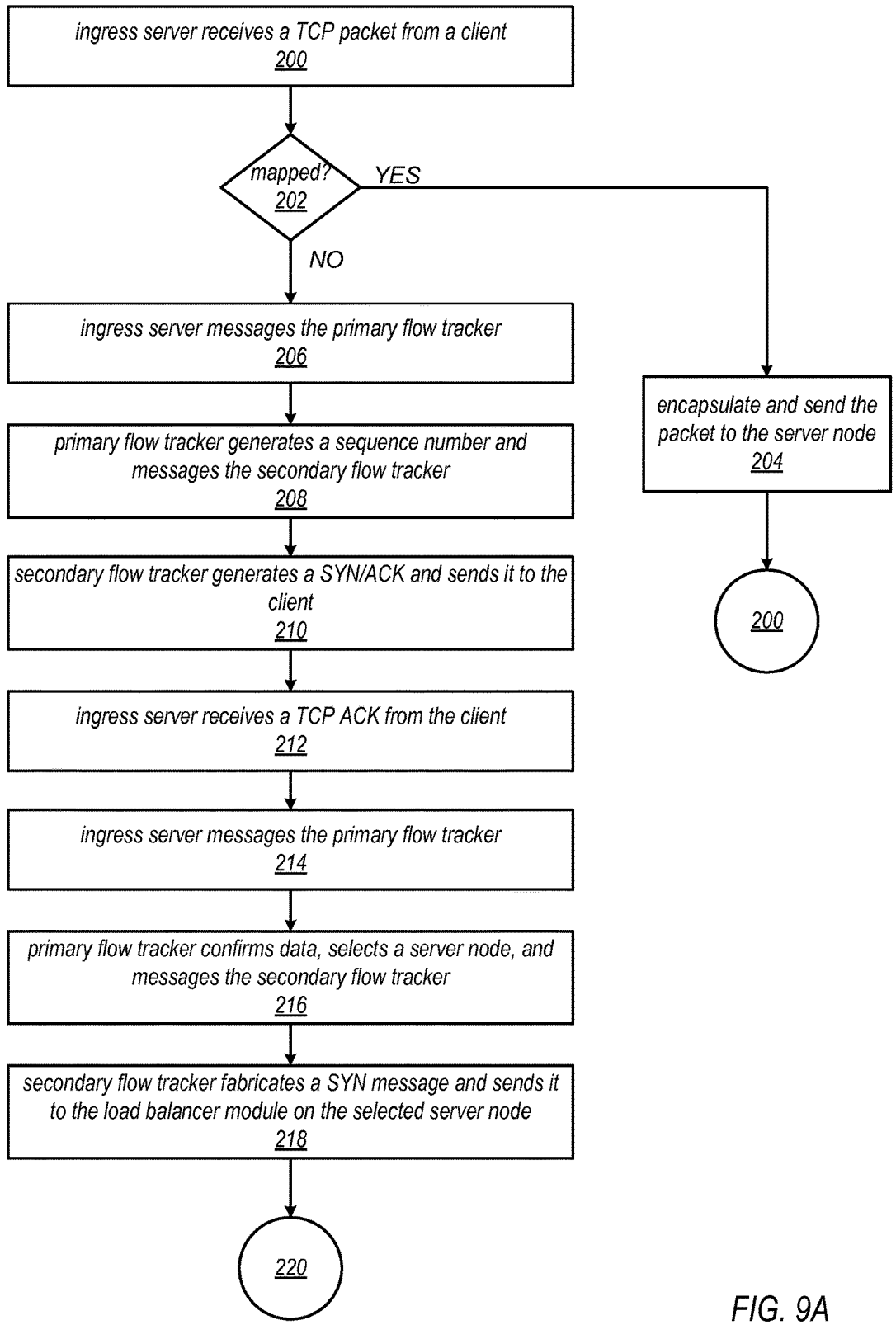
FIGS. 9A and 9B provide a flowchart of packet flow when establishing connections in the distributed load balancing system, according to at least some embodiments.
Figure 9B:
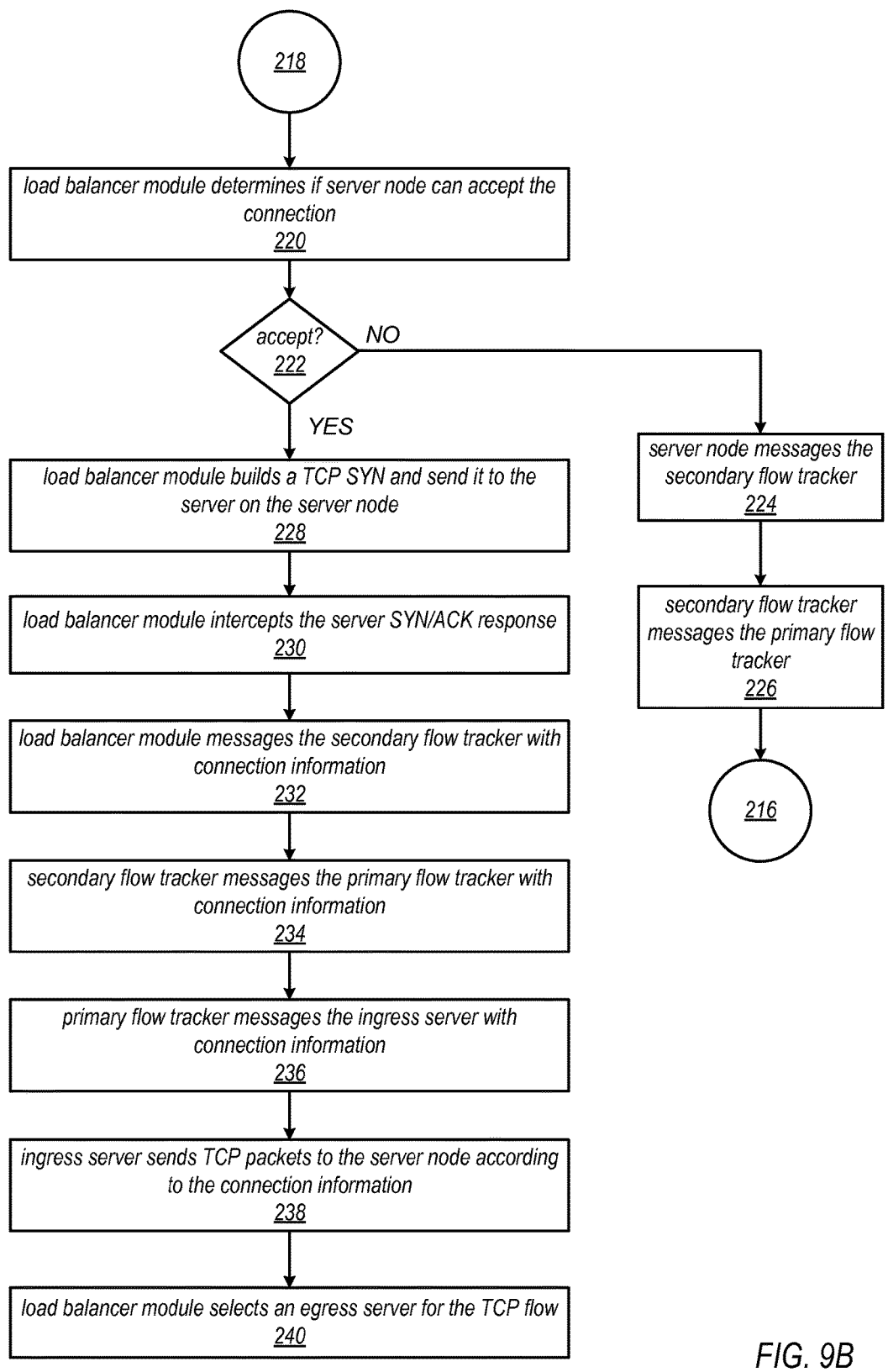

FIGS. 9A and 9B provide a flowchart of packet flow when establishing connections in the distributed load balancing system, according to at least some embodiments. As indicated at 200 of FIG. 9A, an ingress server 112 receives a TCP packet from a client 160 via the edge router 104. At 202, if the ingress server 112 has a mapping for the TCP flow to a server node 130, then the ingress server 112 encapsulates and sends the TCP packet to the respective server node 130 as indicated at 204. Note that the ingress server 112 may be continuously receiving and processing packets for one, two or more TCP flows from one, two, or more clients 160.

At 202, if the ingress server 112 does not have a mapping for the TCP flow, the packet may be a TCP synchronize (SYN) packet from a client 160. As indicated at 206, upon receipt of a SYN packet, the ingress server 112 extracts data from the SYN packet and forwards the data to the primary flow tracker 116A, for example in a UDP message. In at least some embodiments, the ingress server 112 can determine the primary flow tracker 116A and/or secondary flow tracker 116B for the TCP flow according to a consistent hash function. At 208, the primary flow tracker 116A stores the data, for example in a hash table, generates an initial TCP sequence number for the server node 130 side of the TCP connection, and forwards the data and the TCP sequence number to the secondary flow tracker 116B. At 210, the secondary flow tracker 116B may also store the data, and fabricates and sends a SYN/ACK packet to the client 160, the SYN/ACK packet containing at least the TCP sequence number.

As indicated at 212, the ingress server 112 receives a TCP acknowledgement (ACK) packet from the client 160 via the edge router 104. The ingress server 112 does not at this time have a mapping for the TCP flow to a server 130 node, so at 214 the ingress server 112 sends a message including data extracted from the ACK packet to the primary flow tracker 116A. As indicated at 216, upon receiving the message, the primary flow tracker 116A confirms the TCP flow according to the stored data, and confirms that the acknowledged sequence number (+1) from the ACK packet matches the value sent in the SYN/ACK. The primary flow tracker 116A then selects a server node 130 to receive the TCP flow, and sends a message containing the data, TCP sequence number, and IP address of the local load balancer module 132 on the selected server node 130 to the secondary flow tracker 116B. As indicated at 218, the secondary flow tracker 116B also confirms the data and TCP sequence number, fabricates a SYN message, and sends the fabricated SYN message to the local load balancer module 132 on the selected server node 130. The method continues at element 220 of FIG. 9B.

As indicated at 220 of FIG. 9B, in response to the fabricated SYN message, the load balancer module 132 may examine one or more metrics of the server node 130 to determine if the server node 130 can accept the connection. At 222, if the load balancer module 132 determines that the server node 130 cannot currently accept the connection, then at 224 the load balancer module 132 messages the secondary flow tracker 116B. The secondary flow tracker 116B may delete the information for the flow that it previously stored. At 226, the secondary flow tracker 116B messages the primary flow tracker 116A. The primary flow tracker 116A may then select a new target server node 130 and message the secondary flow tracker 116B as indicated at 216 of FIG. 9A.

At 222, if the load balancer module 132 determines that the server node 130 can accept the connection, then as indicated at 228 of FIG. 9B the local load balancer module 132 constructs a TCP SYN packet from the fabricated SYN and sends the TCP SYN packet to the server 134 on the server node 130. The source IP address of the TCP SYN packet is populated with client 160's actual IP address so that server 134 will believe that it has received a direct TCP connection to the client 160. The load balancer module 132 stores relevant details about the TCP flow, for example in a local hash table. As indicated at 230, the server 134 responds with a SYN/ACK packet that the load balancer module 132 intercepts. As indicated at 232, the load balancer module 132 then sends a message including connection information to the secondary flow tracker 116B to indicate that the connection has been accepted. Upon receipt of this message, at 234 the secondary flow tracker 116B records the mapping to the server 134, and sends a similar message to the primary flow tracker 116A, which also records the mapping information. As indicated at 236, the primary flow tracker 116A then forwards a mapping message to the ingress server 112. Ingress server 112 now has a mapping for the TCP flow from the client 160 to the server 130.

At 238, ingress server 112 encapsulates and forwards any buffered data packets for the data flow to the local load balancer module 132 on the server node 130. Additional incoming packets for the data flow from the client 160 received by the ingress server 112 are encapsulated and forwarded directly to the load balancer module 132, which decapsulates the packets and sends the data packets on to the server 134.

At 240, the load balancer module 132 randomly selects an egress server 114 for the data flow. Subsequent outbound TCP packets from the server 134 are intercepted by the load balancer module 132, encapsulated according to UDP, and forwarded to the arbitrarily selected egress server 114. The egress server 114 decapsulates the outgoing packets and sends the TCP packets to the client 160.

As noted above, at 202, if the ingress server 112 does not have a mapping for the TCP flow of a received packet, the packet may be a TCP synchronize (SYN) packet from a client 160. However, the packet may not be TCP SYN packet. For example, if load balancer node 110 membership changes due to addition or failure of a load balancer node 110, the edge router 104 may start routing packets for one or more TCP flows to the ingress server 112 that the ingress server 112 does not have mappings for. In at least some embodiments, upon receiving such a packet for which the ingress server 112 does not have a mapping, the ingress server 112 may use the consistent hash function to determine the primary flow tracker 116A and/or secondary flow tracker 116B for the TCP flow according to the consistent hash ring and message either the primary flow tracker 116A or the secondary flow tracker 116B to request the mapping. Upon receiving the mapping for the TCP flow from a flow tracker 116, the ingress server 112 can store the mapping and begin encapsulating and forwarding the TCP packet(s) for the TCP flow to the correct destination server node 130.

Load Balancer Node Details

In at least some embodiments, the load balancer nodes 110 each have three roles:

Ingress—Receiving all incoming packets from a client 160 in a client connection, routing the packets to a server node 130 if the mapping is known, or messaging a flow tracker if the mapping is not known. The outgoing packets from an ingress node are encapsulated (e.g., according to UDP) by the ingress node.

Flow tracking—Keeping track of connection states (e.g. which server node 130/server 134 has been assigned to service each client connection). Flow trackers also participate in establishing connections between clients 160 and servers 134.

Egress—Decapsulating and forwarding outbound packets received from a server 134 to a client 160.

In at least some embodiments, in the ingress role, a load balancer node 110 is responsible for forwarding packets to servers 134 when a client->server mapping is known, or forwarding a request to a flow tracker when the mapping is unknown. In at least some embodiments, a load balancer node 110 serving as an ingress node for a particular client connection/data flow may also serve as either the primary flow tracker or the secondary flow tracker for the client connection, but not both.

In at least some embodiments, in the flow tracker role, a load balancer node 110 is responsible for maintaining the state of connections that are still being established, as well as maintaining the client->server mapping for established connections. Two flow trackers are involved with each individual client connection, referred to as the primary flow tracker and the secondary flow tracker. In at least some embodiments, the flow trackers associated with client connections may be determined using a consistent hash algorithm. The flow trackers also perform load-balancing functionality, including but not limited to pseudorandomly selecting a server node 130 for each new client connection. Note that the local load balancer module 132 on a selected server node 130 may reject a connection request if it determines that the server 134 cannot handle the connection. If this happens, then the flow trackers may select another server node 130 and send the connection request to the other server node 130. In at least some embodiments, the primary flow tracker role and the secondary flow tracker role for a given connection are performed by different load balancer nodes 110.

In at least some embodiments, in the egress role, a load balancer node 110 is stateless and decapsulates incoming packets received from server nodes 130, performs some validation, and forwards the outbound TCP packets to respective clients 160. In at least some embodiments, a local load balancer module 132 on a server node 130 may arbitrarily select a load balancer node 110 for a given connection.

Load Balancer Node Consistent Hash Ring Topology

In at least some embodiments, the load balancer nodes 110 form a ring topology based on the consistent hashing of input keyspace (client endpoint, public endpoint). The input keyspace may be partitioned among the available flow tracker nodes, and every flow tracker node may be responsible for answering queries corresponding to its keyspace. In at least some embodiments, data may be replicated to the primary and secondary flow tracker nodes based on the successor in the consistent hash ring (e.g., the secondary flow tracker node is the successor node, or next node in the consistent hash ring, to the primary flow tracker node). If a flow tracker node goes down for some reason, the next load balancer node in the consistent hash ring acquires the keyspace of the failed node. When a new flow tracker node joins, the node registers its endpoint (e.g., with a configuration service 122 as shown in FIG. 1) so that other load balancer nodes may learn about the configuration change in the load balancer implementation and thus in the consistent hash ring. The handling of additions and failures of flow trackers in the consistent hash ring is discussed in more detail in reference to FIGS. 11A through 11D.

Ingress Node<->Flow Tracker Node Communications

In at least some embodiments, the load balancer nodes 110 serving as ingress nodes may learn about the load balancer nodes 110 serving as flow tracker nodes from configuration service 122. The ingress nodes may monitor the configuration service 122 for membership changes in the load balancer implementation and thus in the consistent hash ring. When an ingress node receives a packet from a client 160 that the ingress node does not have a mapping for, the ingress node may use a consistent hash function to determine which flow tracker node should service the packet. In at least some embodiments, the input to the hash function is the (client endpoint, public endpoint) pair from the packet. In at least some embodiments, the ingress nodes and flow tracker nodes communicate using UDP messages.

When a primary flow tracker node receives a message from an ingress node for a new packet flow, the primary flow tracker node randomly determines a TCP sequence number and forwards another message to the secondary flow tracker node. The secondary flow tracker node generates a TCP SYN/ACK message for the client. Both flow trackers remember the client connection endpoint pair and the TCP sequence number, and retain this information until memory pressure or expiration causes the state to be purged.

When the primary flow tracker node receives a message from an Ingress node that a TCP ACK packet has been received, the primary flow tracker node verifies that the acknowledged TCP sequence number matches the stored value that was sent in the SYN/ACK packet, selects a server node 130 to service the request, and forwards a message to the secondary flow tracker node. The secondary flow tracker node sends a message to the load balancer module 132 on the selected server node 130 to initiate an actual TCP connection with the TCP stack on the server node 130, and then waits for an acknowledgement response from the server node 130.

When the secondary flow tracker node receives a connection acknowledgement from the load balancer module 132 on the server node 130, a reverse message flow through the primary flow tracker to the ingress node is triggered that stores information about the associated server node 130 in both nodes. From this point forward, additional TCP packets received at the ingress node are forwarded directly to the load balancer module 132 on the server node 130.

Load Balancer Module<->Load Balancer Node Communications

In at least some embodiments, every load balancer module 132 registers its endpoint with configuration service 122 and monitors configuration service 122 continuously for membership changes in the load balancer node layer. The following describes functions of the load balancer module 132, according to at least some embodiments:

Connection publishing—periodically (e.g., once a second) or aperiodically publish the set of active connections (client endpoint, public endpoint) on the respective server node 130 to both the primary and the secondary flow tracker nodes responsible for those connections, as well as to the ingress nodes that last sent packets to the load balancer module 132 for those connections. The connection publishing function renews the lease for the connection states at the responsible load balancer nodes 110.

Monitor membership changes in the load balancer layer. If the membership changes, the load balancer modules 132 may use this change information to immediately send active connections to the load balancer nodes that are now responsible for the connections.

Packet Flow in the Distributed Load Balancing System—Details

The distributed load balancing system may include multiple load balancer nodes 110. In at least some embodiments, each load balancer node 110 in the distributed load balancing system may serve in the roles of a flow tracker node, an egress node, and an ingress node for client 160 connections to the servers 134. The distributed load balancing system may also include a load balancer module 132 on each server node 130.

FIGS. 10A through 10G illustrate packet flow in the distributed load balancing system, according to at least some embodiments. In FIGS. 10A through 10G, packets exchanged between load balancer nodes 110 and packets exchanged between load balancer nodes 110 and server nodes 130 are either UDP messages or UDP-encapsulated client TCP packets. In at least some embodiments, client TCP packets only exist on network 100 in decapsulated form on the north side of the load balancer nodes 110 in transit to and from the border router 102 (see FIG. 1). Note that the solid lines with arrows in FIGS. 10A-10G represent TCP packets, while the dotted lines with arrows represent UDP packets.

In at least some embodiments, the distributed load balancing system may attempt to preserve established connections in the event of a single load balancer node 110 failure. In at least some embodiments, this may be achieved by replicating connection details in a primary flow tracker node and a secondary flow tracker node so that, if either of these nodes fails, a connection's client->server mapping may be restored by the remaining flow tracker node. In at least some embodiments, some packet loss may occur in the event of a node failure; however, client/server TCP packet retransmissions may recover the lost packets.

Each TCP connection from a client may be referred to as a TCP flow, and is uniquely identified by a 4-tuple consisting of: the client IP address, client port, server (public) IP address, and server port. This identifier may be abbreviated as CP or CcPp indicating the client and public endpoint pair. Packets associated with any given TCP flow (or CP pair) can appear on any load balancer node 110 operating as an ingress server 112 due to the hashed equal-cost multipath (ECMP) flow distribution from the upstream edge router 104. However, packets for a TCP flow may generally continue to arrive at the same load balancer node 110 unless there is a link or load balancer node 110 failure that causes the TCP flows to be redirected. The load balancer node 110 that receives packets for a TCP flow from the upstream router 104 is referred to as the ingress node for the TCP flow.

In at least some embodiments, consistent hashing is used so that when packets arrive at a load balancer node 110 serving as an ingress node for the TCP flow, the ingress node can determine which load balancer node 110 contains the state for the TCP flow (i.e., the flow tracker node). The CP pair may be hashed by the ingress node into a consistent hash ring to determine which load balancer node 110 is responsible for maintaining state regarding the TCP flow. This node serves as the primary flow tracker for the TCP flow. The successor node in the consistent hash ring serves as the secondary flow tracker for the TCP flow.

In at least some embodiments, all load balancer nodes 110 may serve as ingress nodes, primary flow tracker nodes, and secondary flow tracker nodes. Depending on the consistent hash result for a TCP flow, a load balancer node 110 serving as the ingress node for the TCP flow may also serve as the primary or the secondary flow tracker node for the TCP flow. However, in at least some embodiments, different physical load balancer nodes 110 perform the primary and secondary flow tracker roles for the TCP flow.

Establishing Connections

Figure 10A:
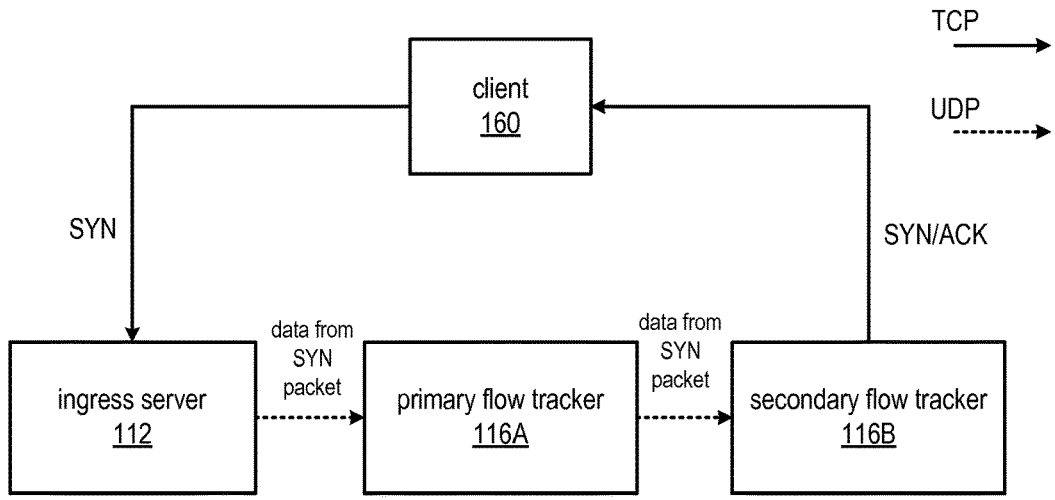
FIGS. 10A through 10G illustrate packet flow in the distributed load balancing system, according to at least some embodiments.
Figure 10B:
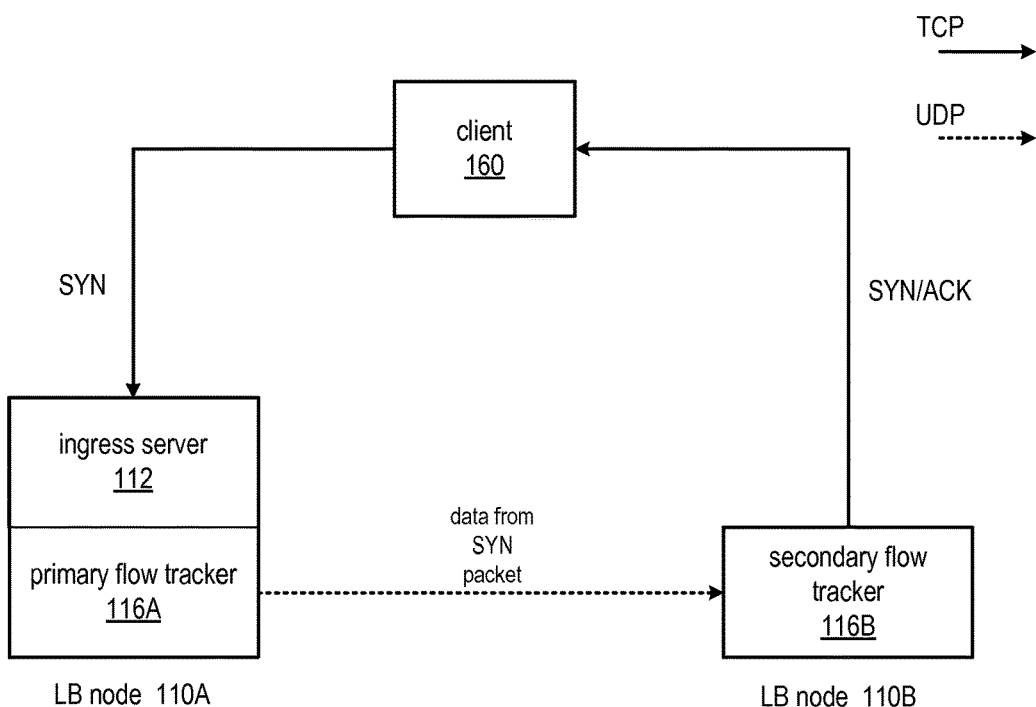
Figure 10C:
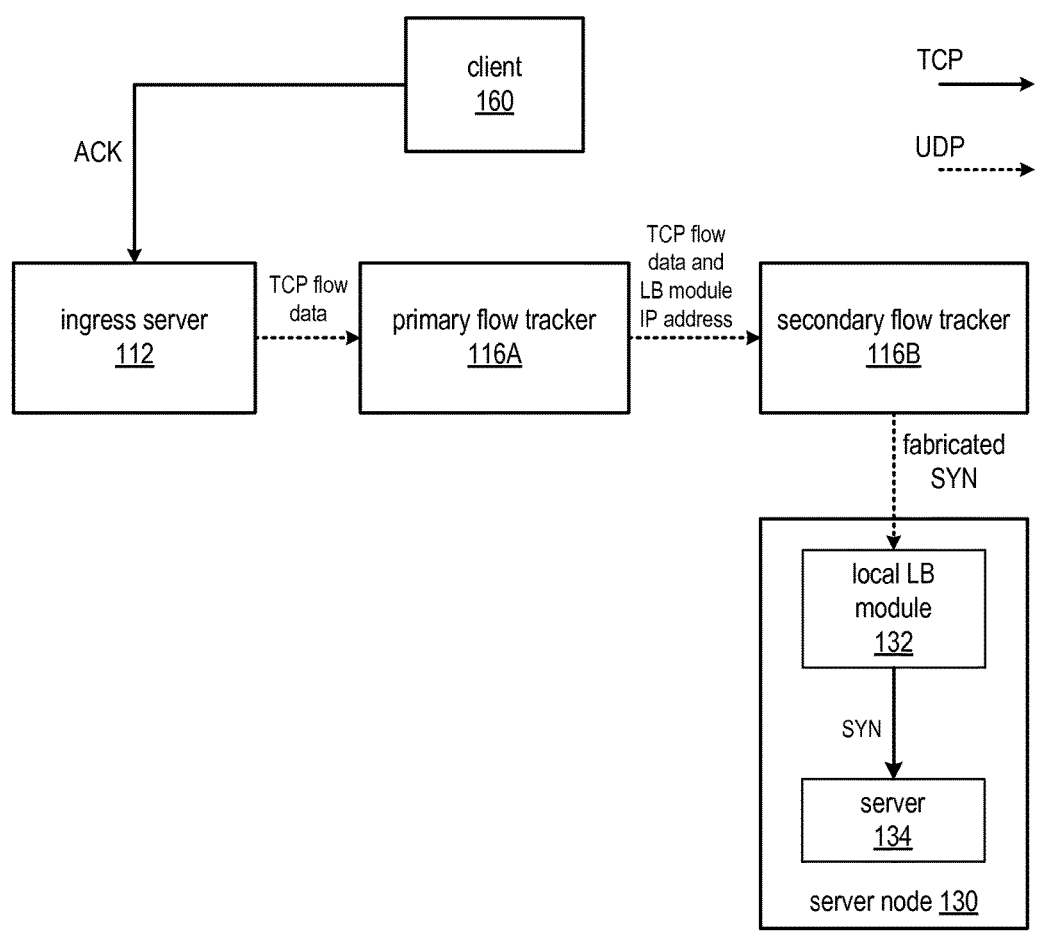

Referring to FIG. 10A, new connections from a client 160 may be triggered by a client TCP synchronize (SYN) packet. The load balancer nodes 110 do not actually establish a connection with a server node 130 upon receipt of the SYN packet, nor do they immediately select a server node 130 to receive the connection. Instead, the load balancer nodes 110 store relevant data from the client's SYN packet, and generate a SYN/ACK packet on behalf of the yet-to-be-chosen server node 130. Referring to FIG. 10C, once the client 160 responds with the first ACK packet in the TCP three-way handshake, the load balancer nodes 110 select a server node 130, generate an equivalent SYN packet for that server node 130, and attempt to establish an actual TCP connection with the server node 130.

Referring again to FIG. 10A, upon receipt of a client SYN packet at the load balancer node 110 serving as the ingress server 112 for the TCP flow, the ingress server 112 extracts the data fields from the SYN packet and forwards the data to the primary flow tracker 116A for the TCP flow. The primary flow tracker 116A stores the data, for example in a hash table, generates an initial TCP sequence number (for the server side of the TCP connection), and forwards the same data to the secondary flow tracker 116B. The secondary flow tracker 116B fabricates a SYN/ACK packet for the client 160 containing that server TCP sequence number.

In FIG. 10A, the ingress server 112, primary flow tracker 116A, and secondary flow tracker 116B roles are each performed by different load balancer nodes 110. However, in some cases, the load balancer node 110 serving as the ingress server 112 for a TCP flow may be the same node 110 that serves as the primary flow tracker 116A or the secondary flow tracker 116B for the TCP flow (but not both). The reason that the ingress server 112 for a packet flow may be on the same node 110 as a flow tracker 116 for the flow is that the edge router 104 pseudorandomly selects the ingress server 112 for the flow according to a per-flow hashed multipath routing technique (e.g., an ECMP routing technique), while the flow trackers 116 for the packet flow are determined on a consistent hash ring according to a consistent hash function applied to the packet flow's address information. If the ingress server 112 for a packet flow is on the same node 110 as a flow tracker 116 for the packet flow, the data from the SYN packet may only be forwarded from the node 110 that implements the ingress server 112 to the other flow tracker 116 node 110. For example, in FIG. 10B, the primary flow tracker 116A is on the same load balancer node 110A as the ingress server 112 for the TCP flow, while the secondary flow tracker 116B is on a different load balancer node 110B, and thus the data from the SYN packet is forwarded from node 110A (by flow tracker 116A) to the secondary flow tracker 116B on load balancer node 110B.

Referring to FIG. 10C, when non-SYN packets arrive at an ingress server 112, the ingress server 112 either knows or does not know which server node 130 to forward the packets to. The first non-SYN packet to arrive at an ingress server 112 for a TCP flow should be the first TCP acknowledgement (ACK) packet in the TCP three-way handshake (or possibly a subsequent data packet), where the TCP acknowledgement number field matches the server sequence number (+1) that was sent in the SYN/ACK packet in FIG. 10A. When the ingress server 112 receives a non-SYN packet for which it has no server mapping, it forwards a message to the primary flow tracker 116A for the TCP flow, the message including information from the ACK packet such as a sequence number, or alternatively containing the ACK packet itself. In at least some cases, the primary flow tracker 116A remembers the stored data for the TCP flow and confirms that the acknowledged sequence number (+1) matches the value that was sent to the client 160 in the SYN/ACK packet. The primary flow tracker then selects a server node 130 for the TCP flow and forwards another message containing the previously stored data for the TCP flow, the server sequence number, and an IP address for the load balancer module 132 on the selected server node 130 to the secondary flow tracker 116B. The secondary flow tracker 116B confirms the server sequence number, records the information, and sends a fabricated SYN message to the load balancer module 132 on the selected server node 130. The TCP flow's CP endpoint pair is now mapped to the load balancer module 132/server node 130. The load balancer module 132 on the server node 130 is responsible for creating a legitimate TCP SYN packet for the server 134 on the server node 130 when it receives the fabricated SYN message from the secondary flow tracker 116B. In creating the SYN packet, the source IP address is populated with the client 160's actual IP address so that the server 134 will believe that it has received a direct TCP connection request from the client 160. The load balancer module 132 stores the relevant details about the TCP flow, for example in a local hash table, and sends the TCP SYN packet to the server 134 (e.g., injects the SYN packet into the Linux kernel of the server 134).

In FIG. 10C, the ingress server 112, primary flow tracker 116A, and secondary flow tracker 116B roles are each performed by different load balancer nodes 110. However, in some cases, the load balancer node 110 serving as the ingress server 112 for a TCP flow will be the same node 110 that serves as the primary flow tracker 116A or the secondary flow tracker 116B for the TCP flow (but not both). For example, in FIG. 10D, the secondary flow tracker 116B is on the same load balancer node 110A as the ingress server 112 for the TCP flow, while the primary flow tracker 116A is on a different load balancer node 110B.

Figure 10D:
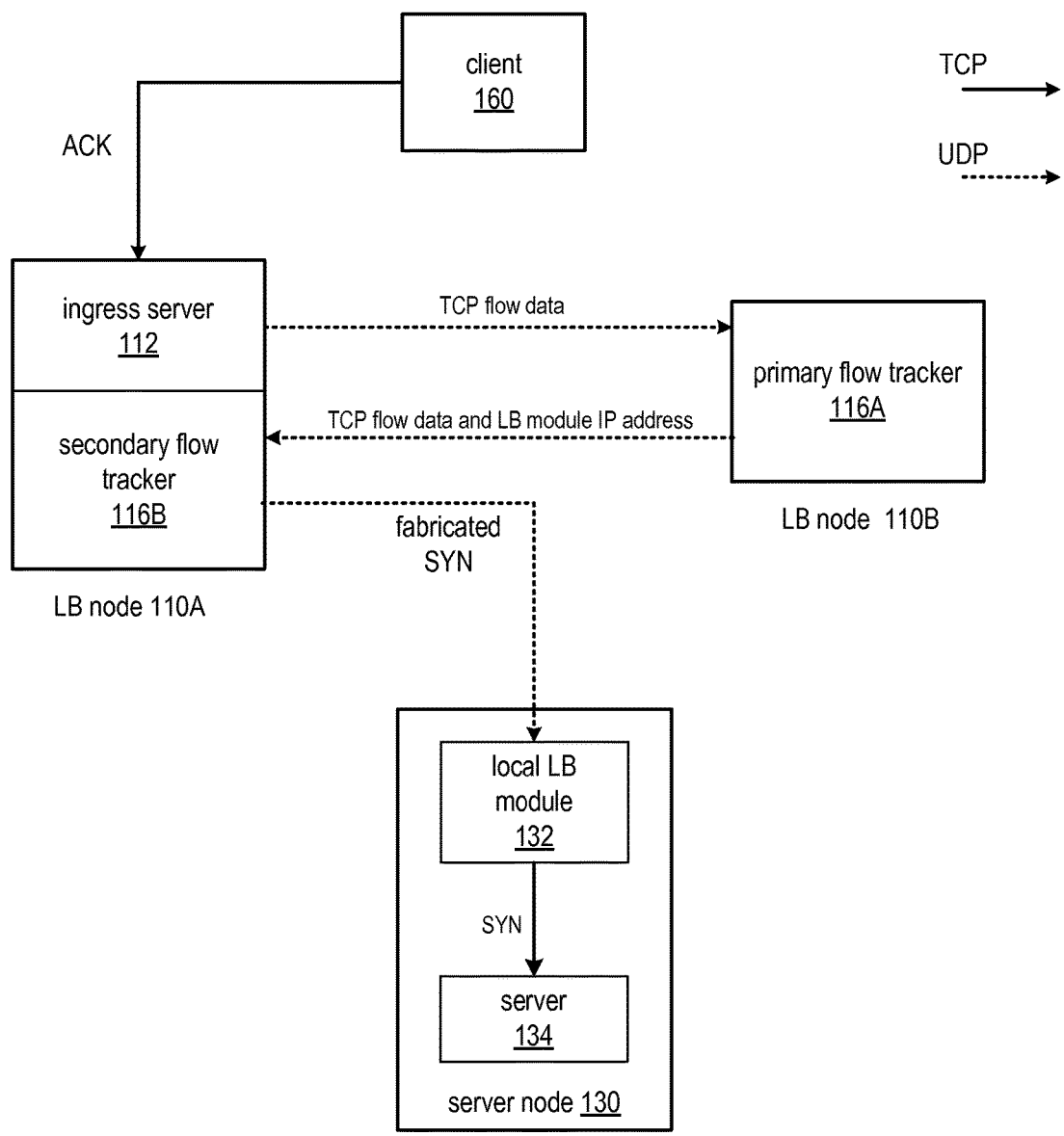
Figure 10E:
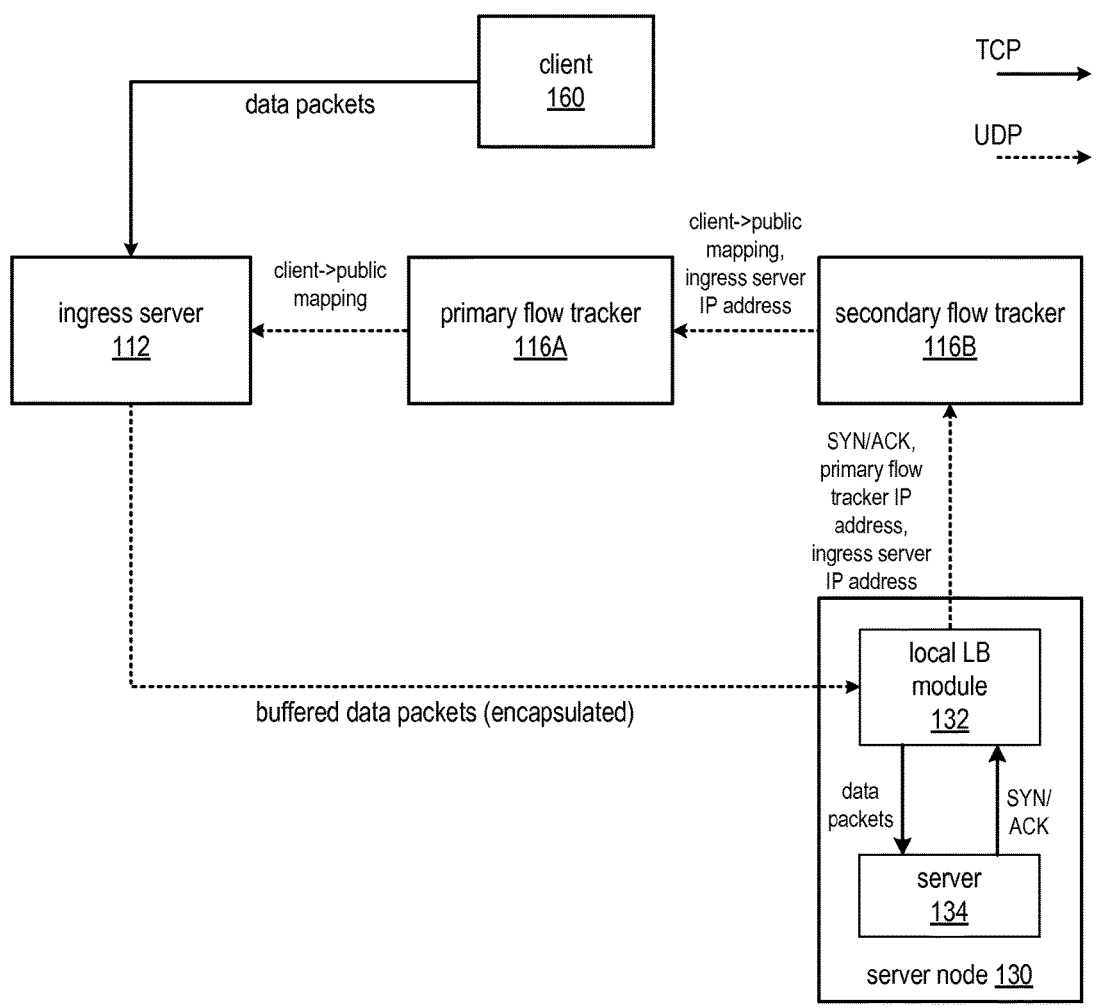

Referring to FIG. 10E, the server 134 (e.g., the Linux kernel) responds with a SYN/ACK packet that the load balancer module 132 also intercepts. The SYN/ACK packet may contain a different TCP sequence number than was originally delivered to the client 160 in the generated SYN/ACK from the secondary flow tracker 116B (see FIG. 10A). The load balancer module 132 is responsible for applying the sequence number delta to incoming and outgoing packets. The SYN/ACK packet from the server 134 also triggers a message (e.g., a UDP message) from the load balancer module 132 back to the secondary flow tracker 116B to indicate that the connection to the selected server node 130/load balancer module 132/server 134 has succeeded. Upon receipt of this message, the secondary flow tracker 116A may record the client and public endpoint pair (CP) mapping between the client 160 and the server 134 as committed, and send a similar message to the primary flow tracker 116A which will also record the CP mapping. The primary flow tracker 116A may then forward a CP mapping message to the ingress server 112, which causes the ingress server 112 to forward any buffered data packets for the connection to the local load balancer module 132 on the server node 130 as encapsulated data packets.

Figure 10F:
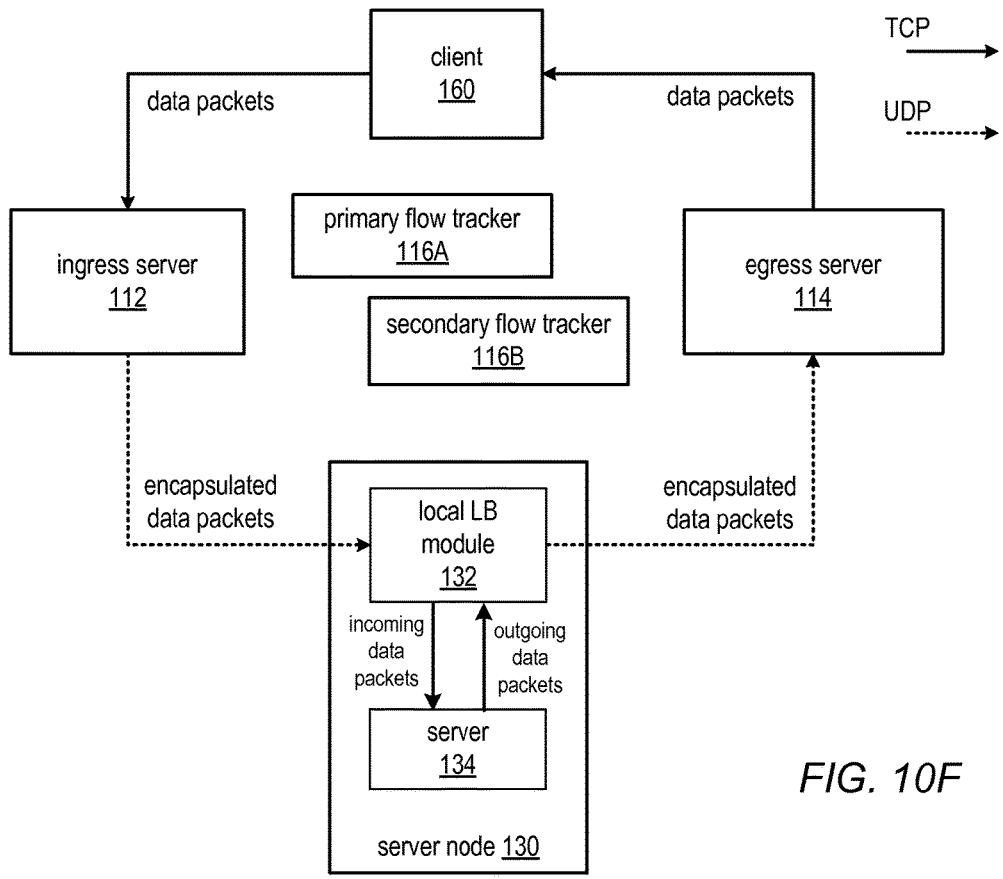

Referring to FIG. 10F, the CP mapping for the connection is known to the ingress server, so incoming TCP packets received by the ingress server 112 for the connection may be encapsulated (e.g., according to UDP) and forwarded directly to the to the local load balancer module 132 on the server node 130 as encapsulated data packets. The load balancer module 132 decapsulates the data packets and sends the TCP packets to the server 134 on the server node 130, for example by injecting the TCP packets on to a TCP stack of the kernel. Outbound packets from the server 134 are intercepted by the load balancer module 132 on the server node 130, encapsulated (e.g., according to UDP), and forwarded to an arbitrary load balancer node 110 that the load balancer module 132 randomly selects as the egress server 114 for this connection. The egress server 114 decapsulates the packets and sends the decapsulated packets to the client 116. The egress function of the selected load balancer node 110 is stateless, so a different load balancer node 110 can be selected as the egress server 114 for the connection in the event of failure of the load balancer node 110 serving as the egress server. However, generally the same load balancer node 110 is used as the egress server 114 for the duration of the connection to reduce or eliminate re-ordering of the outbound packets.

Figure 10G:
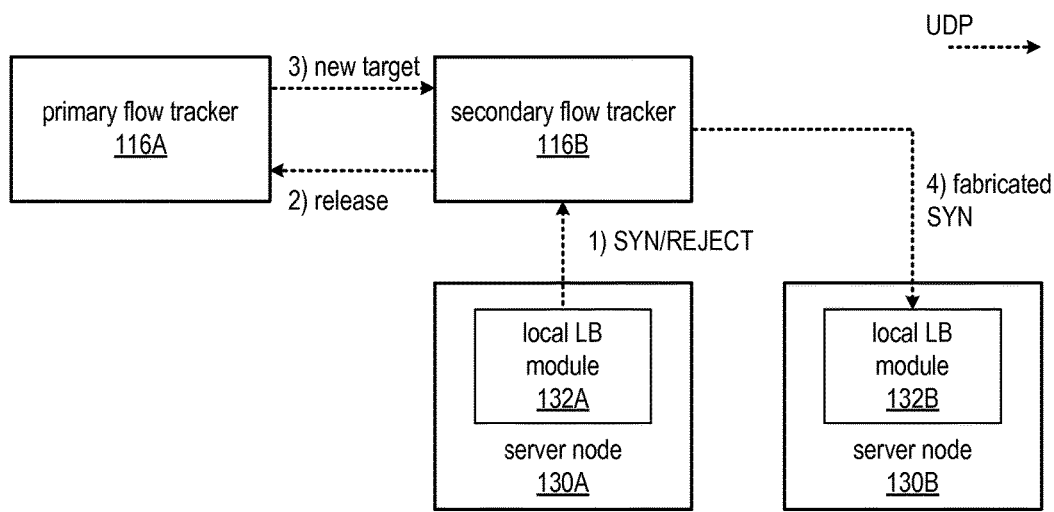

Referring to FIG. 10G, in at least some embodiments, if the load balancer module 132A on a server node 130A that is selected by the primary flow tracker 116A (see FIG. 10C) determines that it is overloaded, it has the option to reject the fabricated SYN message received from the secondary flow tracker 116B (see FIG. 10C). In at least some embodiments, the fabricated SYN message includes a time to live (TTL) value or counter that allows for a maximum number of rejections. In at least some embodiments, if this TTL value reaches zero, the load balancer module 132A may either accept the connection or drop the connection to shed load. If the load balancer module 132A decides to reject the connection, it decrements the TTL value and sends a reject message to the secondary flow tracker 116B. The secondary flow tracker 116B resets the CP mapping and sends a release message to the primary flow tracker 116A to do the same. The primary flow tracker 116A chooses a new load balancer module 132B on another server node 130B and sends a new target message back to the secondary flow tracker 116B, which sends a new fabricated SYN message to the newly chosen load balancer module 132B. Note that packet drops may result in this sequence failing to complete; however, a retransmission from the client 160 may trigger the load balancer module selection process again at the primary flow tracker 116A, which may, but does not necessarily, choose the same load balancer module 132 for the connection if it has not learned about the previous rejection of the fabricated SYN packet.

In at least some embodiments, the TTL counter may be used to prevent continuously sending connection requests to server nodes 130, which may occur for example if all the server nodes 130 are busy. In at least some embodiments, each time a load balancer module 132 rejects a connection request on behalf of a respective server node 130, the load balancer module 132 decrements the TTL counter. The flow tracker nodes 116 may monitor the TTL counter and, as long as the TTL counter is not zero (or is above some specified threshold), may select another server node 130 and try again. If the TTL counter reaches zero (or reaches the specified threshold), the connection request is dropped and no further attempts are made by the flow tracker nodes 116 to send a connection request to a selected one of the server nodes 130 for that connection. In at least some embodiments, an error message may be sent to the respective client 160.

In at least some embodiments, the distributed load balancer system supports multiple public IP addresses. As such, it is possible that a client 160 may initiate two TCP connections from the same client port number to two different public IP addresses. These TCP connections are distinct from the client 160's point of view, but internally the distributed load balancer may map the connections to the same server node 130, which would result in a collision. In at least some embodiments, to detect and handle possible collisions, the load balancer module 132, upon receiving the fabricated SYN packet from the secondary flow tracker 116B as shown in FIGS. 10C and 10D, may compare the address information to its active connections and, if this connection would cause a collision, reject the connection request as shown in FIG. 10G.

Handling Load Balancer Node Failures and Additions

In many conventional load balancers, some or all existing connections are lost in the event of a load balancer failure. In at least some embodiments, in the event of failure of a single load balancer node 110, the distributed load balancing system may maintain at least some of the established connections so that the clients and servers can continue to exchange packets via the connections until the connections complete normally. In addition, the distributed load balancing system may continue to service connections that were in the process of being established at the time of failure.

In at least some embodiments of the distributed load balancing system, a failure recovery protocol may be implemented that may recover existing client connections in the event of a single load balancer node 110 failure. Multiple load balancer node 110 failures, however, may result in lost client connections. In at least some embodiments, TCP retransmissions between a client 160 and a server 134 may be used as a means of recovery following a load balancer node 110 failure.

In addition to potential load balancer node 110 failures, new load balancer nodes 110 may be added to the distributed load balancer system. These new nodes 110 may be added to the load balancer layer and thus to the consistent hash ring, and load balancer node 110 roles regarding existing client connections may be adjusted according to the change, as necessary.

Handling Flow Tracker Node Failures and Additions

In at least some embodiments, as each connection is established (see, e.g., FIGS. 10A through 10G), the connection state information is passed through two load balancer nodes 110, referred to as the primary and secondary flow trackers, which may be determined using a consistent hash algorithm that, for example, uses the (client IP:port, public IP:port) tuple as hash function input. In the event of a single load balancer node 110 failure, at least one of the surviving load balancer nodes 110 may continue to be mapped via the consistent hash function and may contain the necessary state information for a connection to direct packets to the selected server node 130 for a connection. In addition, in the case of an addition of a load balancer node 110 to the consistent hash ring, state information for connections may be refreshed to the appropriate flow trackers.

FIGS. 11A through 11D illustrate the handling of events that effect membership in the load balancer node consistent hash ring, according to at least some embodiments. These events may include, but are not limited to, adding a new primary flow tracker node, adding a new secondary flow tracker node, failure of a primary flow tracker node, and failure of a secondary flow tracker node.

Figure 11A:
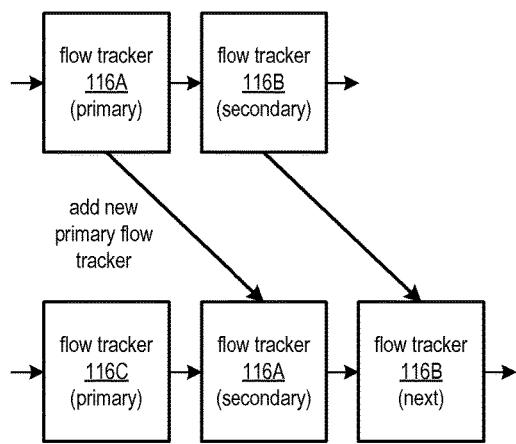
FIGS. 11A through 11D illustrate the handling of events that effect membership in the load balancer node consistent hash ring, according to at least some embodiments.

FIG. 11A illustrates handling the addition of a new primary flow tracker node to the consistent hash ring. The top row of FIG. 11A shows flow tracker 116A as the primary flow tracker for one or more client connections and flow tracker node 116B as the secondary flow tracker for the same connection(s). In the bottom row of FIG. 11A, a new flow tracker node 116C has been added, and becomes the primary flow tracker for the client connection(s). Flow tracker node 116A, formerly the primary flow tracker, becomes the secondary flow tracker, while flow tracker node 116B, formerly the secondary flow tracker, becomes a next flow tracker in the consistent hash ring. State information for the client connection(s) that was maintained by flow trackers 116A and 116B may be provided to the new primary flow tracker 116C. In addition, flow tracker 116B may "forget" its formerly tracked connections in the role of secondary flow tracker.

Figure 11B:
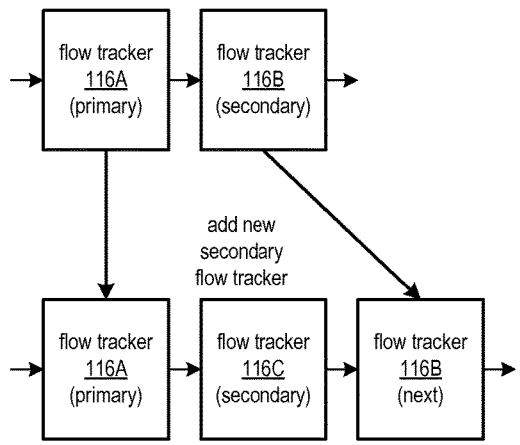

FIG. 11B illustrates handling the addition of a new secondary flow tracker node to the consistent hash ring. The top row of FIG. 11B shows flow tracker 116A as the primary flow tracker for one or more client connections and flow tracker node 116B as the secondary flow tracker for the same connection(s). In the bottom row of FIG. 11B, a new flow tracker node 116C has been added, and becomes the secondary flow tracker for the client connection(s). Flow tracker node 116A remains as the primary flow tracker for the connection(s), while flow tracker node 116B, formerly the secondary flow tracker, becomes a next flow tracker in the consistent hash ring. State information for the client connection(s) that was maintained by flow trackers 116A and 116B may be provided to the new secondary flow tracker 116C. In addition, flow tracker 116B may "forget" its formerly tracked connections in the role of secondary flow tracker.

Figure 11C:
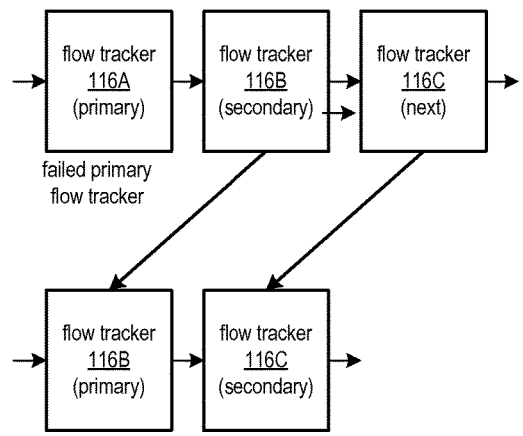

FIG. 11C illustrates handling the failure of a primary flow tracker node in the consistent hash ring. The top row of FIG. 11C shows flow tracker 116A as the primary flow tracker for one or more client connections, flow tracker node 116B as the secondary flow tracker for the same connection(s), and flow tracker node 116C as a next flow tracker in the consistent hash ring. In the bottom row of FIG. 11C, primary flow tracker node 116A has failed. Flow tracker node 116B becomes the primary flow tracker for the connection(s), while flow tracker node 116C becomes the secondary flow tracker for the connection(s). State information for the client connection(s) is maintained by flow tracker 116B and may be provided to the new secondary flow tracker 116C.

Figure 11D:
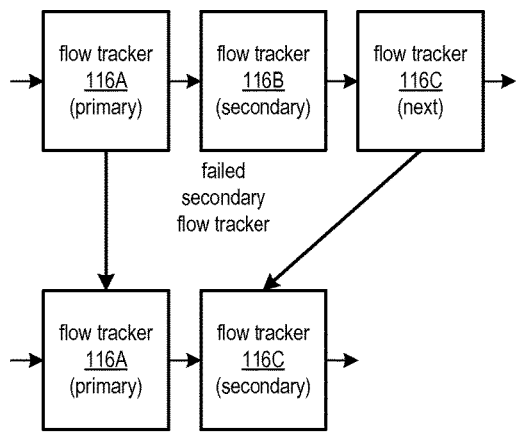

FIG. 11D illustrates handling the failure of a secondary flow tracker node in the consistent hash ring. The top row of FIG. 11D shows flow tracker 116A as the primary flow tracker for one or more client connections, flow tracker node 116B as the secondary flow tracker for the same connection(s), and flow tracker node 116C as a next flow tracker in the consistent hash ring. In the bottom row of FIG. 11D, secondary flow tracker node 116B has failed. Flow tracker node 116A remains as the primary flow tracker for the connection(s), while flow tracker node 116C becomes the secondary flow tracker for the connection(s). State information for the client connection(s) is maintained by flow tracker 116B and may be provided to the new secondary flow tracker 116C.

In at least some embodiments, the load balancer modules 132 on the server nodes 130 perform connection publishing to the load balancer nodes 110. In at least some embodiments, the connection publishing periodically (e.g., once a second) or aperiodically pushes current connection state information from the server nodes 130 to the load balancer nodes 110 serving as flow tracker nodes and ingress nodes, which acts to refresh or restore the connection mappings to both the primary and secondary flow tracker nodes for the connections. In at least some embodiments, a load balancer module 132 may detect a flow tracker membership change, for example as illustrated in FIGS. 11A through 11D. In response, the load balancer module 132 may perform a connection publication to populate the state information for the connections in the primary and secondary flow tracker nodes, which may have changed for the connections when the membership changed. Note that connection publishing may allow at least some established connections to be recovered in the event of multiple load balancer node failures.

Failure-related Message Flow

In at least some embodiments, the protocol between the primary and secondary flow tracker nodes may include a correction or synchronization functionality. For example, referring to FIG. 11A, when a new primary flow tracker node 116C joins the consistent hash ring, the new node 116C may lay claim to the consistent hash keyspace for some number of connections (~1/N) and begin receiving traffic related to these connections from the edge router 104. However, the new primary flow tracker node 116C does not have any state stored for the connections, so it may operate on each packet as if it were the first packet received from the client 160. The primary flow tracker is responsible for generating server TCP sequence numbers in response to SYN packets (see, e.g., FIG. 10A) and for selecting server nodes 130 in response to the first ACK packet from a client 160 (see, e.g., FIG. 1), and these generated values may disagree with values chosen by the previous primary flow tracker (flow tracker node 116A in FIG. 11A). However, in at least some embodiments the consistent hash algorithm assigns the previous primary flow tracker (flow tracker node 116A in FIG. 11A) into the secondary flow tracker role, and this flow tracker still retains the previously stored state for the connections. Thus, in at least some embodiments, when the secondary flow tracker (flow tracker node 116A in FIG. 11A) detects a discrepancy in information received from the primary flow tracker 116C, it can send update messages back to the primary flow tracker 116C to bring the two load balancer nodes 110 serving as flow trackers for the connections into synchronization. Similar methods may be used to synchronize the flow trackers after other changes in the consistent hash ring membership.

Load Balancer Module Details

In at least some embodiments, the load balancer module 132 is a component of the distributed load balancer system that resides on each of the server nodes 130. Roles of the load balancer node 132 include, but are not limited to, decapsulating packets received from the load balancer nodes 110 and sending the decapsulated packets to the server 134 on the server node 130, and encapsulating outgoing packets from the server 134 and sending the encapsulated packets to a load balancer node 110.

In at least some embodiments, incoming packets to the load balancer modules 132 on the server nodes 130 from the load balancer nodes 110 serving as ingress servers 112 are stateless protocol (e.g., UDP) packets that encapsulate the actual client data packets. Each encapsulated client data packet has the original clientIP:port of a respective client 160 as the source address and the server 134 publicIP:port as the destination address. The load balancer modules 132 strip the encapsulation from the client data packets and send the packets to the respective servers 134 on the server nodes 130, for example by redirecting the packets to a localhost TCP flow.

In at least some embodiments, outgoing packets from the servers 134 to the load balancer nodes 110 serving as egress servers 114 are stateless protocol (e.g., UDP) packets that encapsulate the outgoing IP packets. The load balancer modules 132 encapsulate the outgoing IP packets and send the encapsulated packets to the egress servers 114 via the fabric 120. Each encapsulated outgoing IP packet has the server 134 publicIP:port as the source address and the clientIP:port of a respective client 160 as the destination address.

Load Balancer Module Functionality

In at least some embodiments, functions of the load balancer module 132 on a server node 130 may include one or more of, but are not limited to:

Terminating UDP tunnels from the load balancer node(s) 110, e.g. from the ingress server 112 handling a connection to a client 160. This includes stripping UDP encapsulation from incoming client data packets received from the ingress servers 112.

Selecting an egress server 114 to receive outgoing traffic for a connection.

Intercepting outgoing IP packets on a connection to the respective server 134, encapsulating the outgoing IP packets for the connection, and sending the encapsulated packets to the egress server 114.

Mangling the sequence number in incoming and outgoing packets so that the sequence number aligns with the sequence number generated by the flow tracker nodes 116 when the flow tracker nodes 116 sent a SYN/ACK to the client 160.

Making the decision on whether to accept or reject a connection for the respective server 134, for example based on one or more metrics indicating the respective server 134's current load.

Detecting and rejecting connections from the same clientIP:port address to the respective server 134 if there is an active connection for that clientIP:port address to avoid collisions.

Connection tracking and connection publishing.

Load Balancer Module Configuration Information

In at least some embodiments, each load balancer module 132 may acquire and locally store one or more of, but is not limited to, the following sets of information for its configuration: a set of load balancer node 110 endpoints; a set of valid public IP addresses which it is to serve; and the port number(s) on which the respective server 134 accepts incoming connections. In a least some embodiments, this information may be acquired from or updated by accessing or querying a configuration service 122 component of the distributed load balancer system, as illustrated in FIG. 1. Other methods of acquiring the information may be used in some embodiments.

Load Balancer Module Packet Handling

The following describes load balancer module 132 operations for inbound traffic and outbound traffic according to at least some embodiments. In at least some embodiments, when an inbound data packet is received by the load balancer module 132, the data packet is decapsulated from the UDP packet, and the destination address in the decapsulated TCP packet is first validated against a set of configured valid public IP addresses. If there is no match, the packet is dropped or ignored. In at least some embodiments, the load balancer module 132 may adjust the sequence number in the TCP header by a constant delta so that the sequence number matches the randomly chosen sequence number generated by the flow tracker nodes 116 that sent the SYN/ACK packet to the client 160. The load balancer module 132 records the mapping from the [Client:Public] endpoint to the [Client:Server] endpoint as an internal state.

In at least some embodiments, for outbound TCP packets from the server 134, the load balancer module 132 first checks its internal state to determine if the packet is for an active connection that the load balancer module is managing. If it is not, the load balancer module 132 just passes the packet through. If it is, the load balancer module 132 encapsulates the outgoing TCP packet, for example according to UDP, and forwards the encapsulated packet to a load balancer node 110 that was selected as the egress server 114 for this connection. In at least some embodiments, the load balancer module 134 may adjust the TCP sequence number in the outgoing TCP packet by a constant delta so that it aligns with the sequence number generated by the flow tracker nodes 116 that sent the SYN/ACK packet to the client 160.

Connection Tracking

In at least some embodiments, the load balancer module 132 on each server node 130 manages a hash table containing connection details for every active client connection to the respective server 134. In at least some embodiments, the key for the hash table is the (clientIp:port, publicIp:port) tuple. In at least some embodiments, the connection state for each client connection may include one or more of, but is not limited to:

The client IP:Port
The public IP:Port
The initial server TCP sequence number provided by the flow tracker 116 nodes.
The server TCP sequence number delta.
The original primary flow tracker IP address.
The original secondary flow tracker IP address.
The IP address of the last detected ingress server 112.
An expiration time for this entry
Least Recently Used (LRU)/Collision indices.

In at least some embodiments, each load balancer module 132 periodically generates connection publishing messages to the primary and secondary flow tracker nodes for all active client connections. In at least some embodiments, the content of /proc/net/tcp is scanned and intersected with the active connections in the load balancer module's hash table so that they will continue to be published to the flow tracker nodes until the Linux kernel stops tracking the connection. Connection publishing will be discussed in more detail later in this document.

Sequence Number Mangling

As previously described, in at least some embodiments the load balancer nodes 110 generate SYN/ACK packets in response to client 160 SYN packets on behalf of the server 134. Only after the client 160 sends an ACK packet (the TCP three-way handshake) does a load balancer module 110 send any data to a load balancer module 132 on a server node 130. When the load balancer module 132 is first instructed to establish a client connection, the load balancer module 132 locally fabricates a SYN packet to begin a TCP connection with the server 134 on the server node 130, and intercepts the server 134's corresponding SYN/ACK packet. Typically, the server 134 (e.g., the Linux kernel on the server node 130) selects an entirely different TCP sequence number than the one the client received in the SYN/ACK packet from the load balancer nodes 110. Thus, in at least some embodiments, the load balancer module 132 may correct for the sequence numbers in all the packets in the TCP connection between the client 160 and the server 134. In at least some embodiments, the load balancer module 132 computes the difference between the sequence number generated by the load balancer nodes 110 and the sequence number generated by the server 134 and stores the difference as a delta value in the hash table entry for the TCP connection. When incoming data packets arrive from the client 160 on the connection, the TCP header will contain acknowledgement numbers that will not align with the sequence number used by the server 134, so the load balancer module 132 subtracts the delta value (e.g., using two's complement) from the sequence number value in the TCP header. The load balancer module also adds the delta value to the sequence number in outbound packets from the server 134 to the client 130 on the connection.

Health Checking in the Distributed Load Balancer System

In at least some embodiments of the distributed load balancer system, each load balancer node 110 requires a consistent view of the healthy members in the load balancer implementation (i.e., of the healthy load balancer nodes 110 and server nodes 130) for at least the following reasons:

Load balancing—The load balancer nodes 110 need to detect server node 130 failures and converge on a set of healthy server nodes 130 that can accept client traffic.

Distributed state management—The load balancer is a distributed system with the state shared/replicated across multiple load balancer nodes 110 (e.g., according to a consistent hashing mechanism). In order to properly handle client traffic, each load balancer node 110 needs to have an eventually consistent view of the healthy member nodes 110 in the load balancer implementation.

To accomplish this, at least some embodiments of the distributed load balancer system may implement embodiments of a health check protocol that monitors nodes in the load balancer implementation and detects unhealthy nodes as soon as possible. The health check protocol may propagate health information among the nodes in the load balancer implementation, and may provide methods that enable the nodes to converge on a set of healthy nodes. In addition, the health check protocol may provide mechanisms for reporting healthy/unhealthy nodes and state changes in the load balancer implementation.

In at least some embodiments, the health check protocol may be based on one or more of, but not limited to, the following assumptions:

All nodes in the load balancer implementation are known. (I.e., the health check protocol may not perform discovery).

All node failures are fail-stop.

All messages between nodes are stateless protocol (e.g., UDP) messages, and the messages may be dropped, delayed, duplicated or corrupted. There are no guarantees on message delivery.

In at least some embodiments, a node in a load balancer implementation (e.g., a load balancer node 110 or server node 130) may be considered healthy under the following conditions:

All of the node's internal components are in ready state (ready to handle client traffic).

The node's incoming/outgoing network links are healthy (for at least the network interface controllers (NICs) on which client traffic flows).

Figure 12:
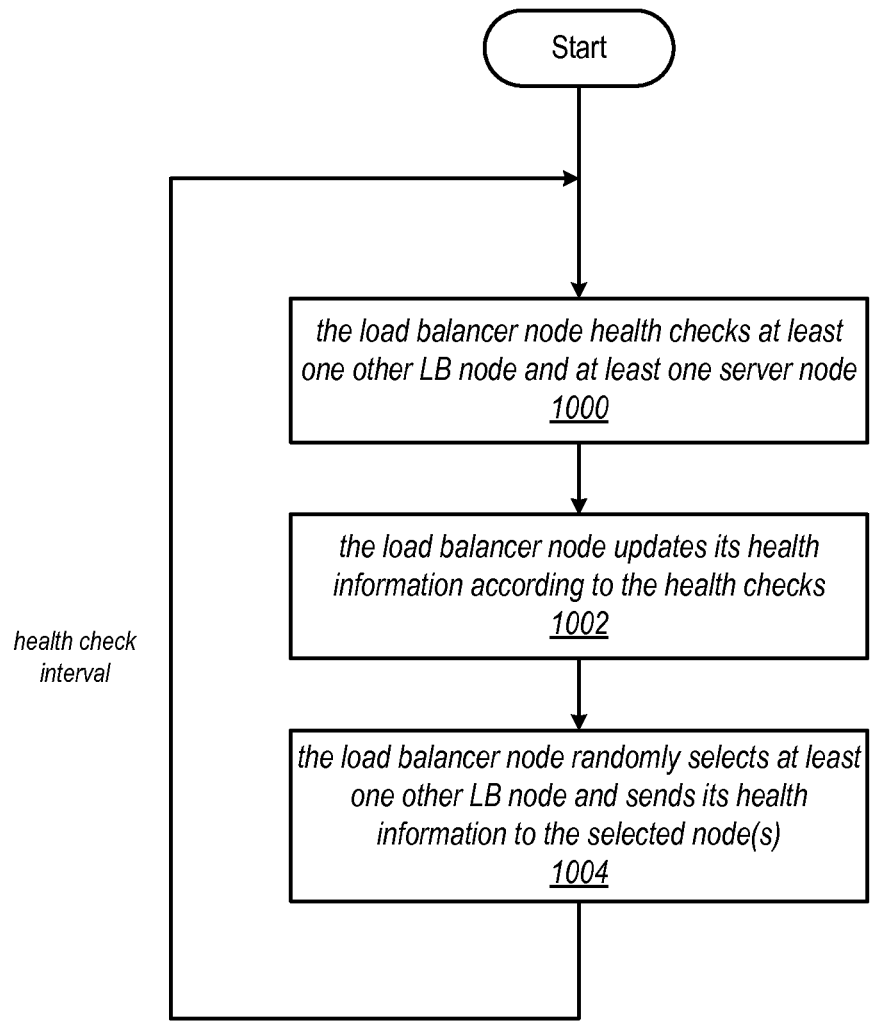
FIG. 12 is a high-level flowchart of a health check method that may be performed by each load balancer node according to a health check interval, according to at least some embodiments.

FIG. 12 is a high-level flowchart of a health check method that may be performed by each load balancer node according to a health check interval, according to at least some embodiments. As indicated at 1000, at each load balancer interval, for example every 100 milliseconds, each load balancer (LB) node 110 may health check at least one other LB node 110 and at least one server node 130. As indicated at 1002, the load balancer node 110 may update its locally stored health information according to the health checks. As indicated at 1004, the load balancer node 110 may then randomly select at least one other load balancer node 110 and send its health information to the selected load balancer node(s) 110. In at least some embodiments, the node 110 may also send a list of healthy load balancer nodes 110 to one or more server nodes 130, for example to the same server node(s) 130 that are health checked by the node 110. The elements of FIG. 12 are explained in more detail in the following discussion.

Figure 23:
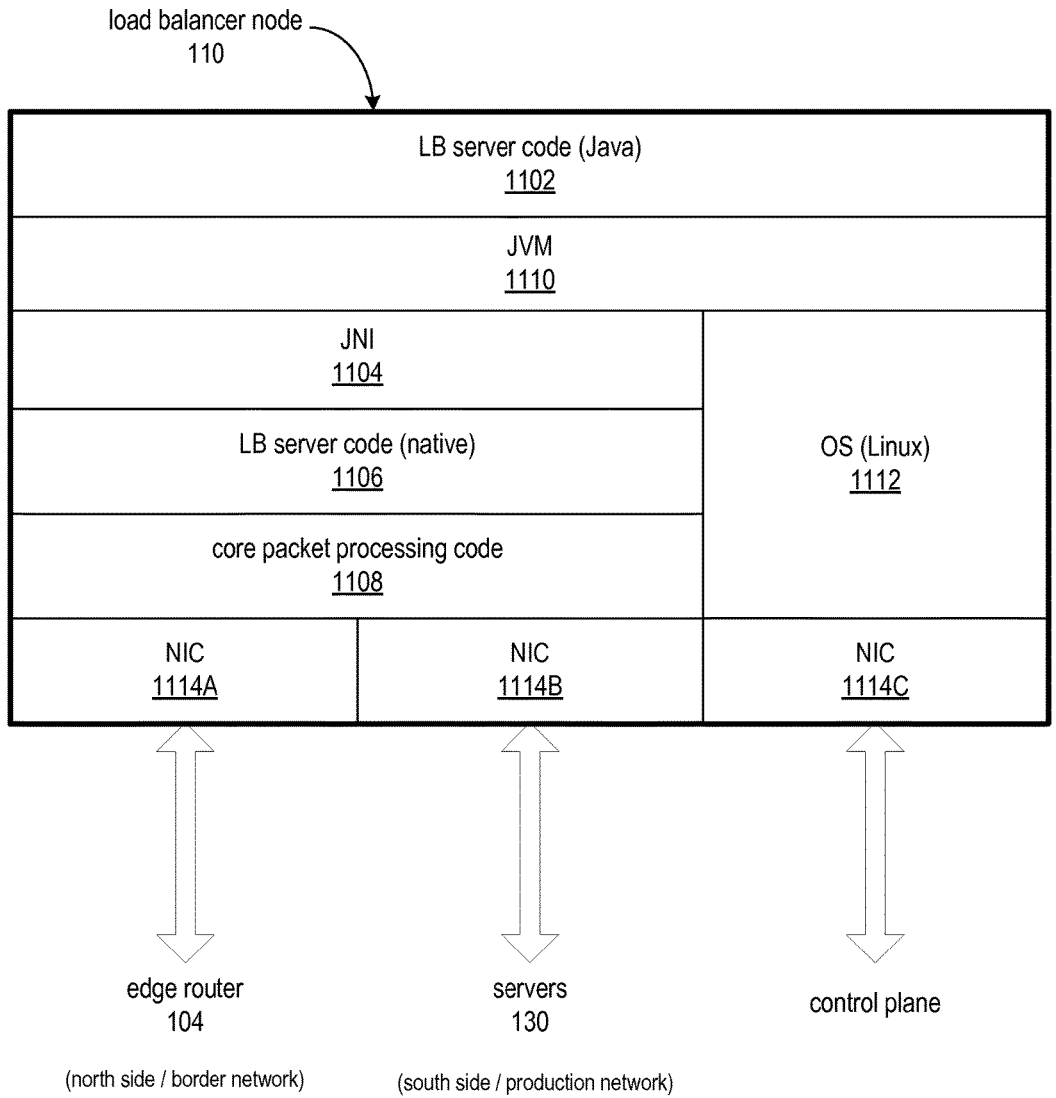
FIG. 23 illustrates example software stack architecture for a load balancer node according to at least some embodiments.

In at least some embodiments of the health check protocol, a load balancer node 110 does not assert its own health to the other load balancer nodes 110. Instead, one or more other load balancer nodes 110 may health-check the node 110. For example, in at least some embodiments, each load balancer node 110 may periodically or aperiodically randomly select one or more other nodes 110 to health-check. As another example, in at least some embodiments, one or more other load balancer nodes 110, for example the two nearest neighbors of a given load balancer node 110 on an ordered list of nodes 110 such as a consistent hash ring, may each periodically or aperiodically check the health of the given node 110. In at least some embodiments, health checking a node 110 may include using health pings sent to the NICs 1114 on the node 110 as illustrated in FIG. 23. In at least some embodiments, if a first node 110 determines that a second node 110 is healthy via a health check, the first node 110 may update (e.g., increment) the heartbeat counter for the second node 110 stored in local health information for the load balancer nodes 110. The first node 110 periodically or aperiodically sends its local health information to one or more other load balancer nodes 110 in the load balancer implementation, which may update their own local health information accordingly (e.g., by incrementing the heartbeat counter for the second node) and send their updated local health information to one or more other nodes 110. The heartbeat information for the second node 110 may thus be propagated to the other nodes 110 in the load balancer implementation. As long as the second node 110 is healthy, all of the other nodes 110 that are reachable from the second node 110 should thus see the second node 110's heartbeat counter getting incremented on a consistent basis, e.g. once a second or once every ten seconds. If the second node 110 is detected to be unhealthy by the node(s) 110 that check its health, no heartbeat for the node 110 is sent by the health checking nodes 110 and, after some time threshold, the other nodes 110 in the load balancer implementation 110 consider the node 110 in question to be unhealthy, or down.

In at least some embodiments, a load balancer node 110 may check one or more aspects of its own internal state and, if the node 110 detects that it is unhealthy for some reason, the node 110 may stop responding to the health pings from other nodes 110 that check its health. Thus, the nodes 110 checking the unhealthy node 110's health may consider the node 110 as unhealthy, and may not propagate heartbeat increments on behalf of the node 110.

Health Check Protocol Details

In at least some embodiments, the health check protocol may leverage a heartbeat counter technique and gossip protocol technology. The health check protocol may be considered to have two main parts—health checking and gossip/failure detection.

Health checking—Every load balancer node 110 in the load balancer implementation may periodically or aperiodically health check one or more other nodes 110 in the implementation. Methods by which the one or more other nodes are determined are discussed later. A core idea of health checking is that if a node 110 health checks another node 110 and determines that the other node 110 is healthy, the checking node 110 asserts that the other node 110 is healthy by incrementing and propagating a heartbeat counter for the other node 110. In other words, the nodes 110 do not assert their own health to the other nodes; instead, one or more other nodes 110 check and assert the health of each node 110 in the load balancer implementation.

Gossip/failure detection—In at least some embodiments, the health check protocol may leverage a gossip protocol to propagate load balancer node 110 health information among the member load balancer nodes 110 in the load balancer implementation. The gossip protocol converges rapidly, and provides eventual consistency guarantees that are sufficient for the purposes of the distributed load balancing system. In at least some embodiments, using the gossip protocol, each load balancer node 110 maintains a heartbeat counter for each other node 110 in the load balancer implementation, for example in a heartbeat list. Each load balancer node 110 periodically or aperiodically performs a health check of at least one other load balancer node 110 as described above, and increments the heartbeat counter for a node 110 upon determining via the health check that the checked node 110 is healthy. In at least some embodiments, each load balancer node 110 periodically or aperiodically randomly selects at least one other node 110 in the load balancer implementation to which it sends its current heartbeat list. Upon receipt of a heartbeat list from another node 110, a load balancer node 110 merges the heartbeat information in the received list with its own heartbeat list by determining the maximum heartbeat counter for each node 110 in the two lists (the received lists and its own list) and using the determined maximum heartbeat counter in its own heartbeat list. In turn, this heartbeat list gets sent to another randomly selected node 110, which updates its own heartbeat list accordingly, and so on. Using this technique, heartbeat information for each healthy node 110 is eventually (e.g., in a few seconds) propagated to all of the other load balancer nodes 110 in the load balancer implementation. As long as the heartbeat counter keeps increasing for a given load balancer node 110, it is considered to be healthy by the other nodes 110. If a load balancer node 110's heartbeat counter does not get incremented for a specified period by the health checking and gossiping method, then other load balancer nodes 110 may converge on the load balancer node 110 being considered unhealthy.

Health Checking Load Balancer Nodes

The following describes a method for health checking a load balancer node 110 that may be performed by another load balancer node 110, according to at least some embodiments. With reference to FIG. 23, in at least some embodiments, a load balancer node 110 may be considered healthy if one or more of the following conditions are determined for the node 110:

- The processor threads (e.g., core packet processing code 1108 threads) of the node 110 are in the ready state (internal).
- The node 110 knows the edge router 104's IP address and/or MAC address (internal).
- All of the threads and/or protocol handlers of the node 110 are in the ready state (internal).
- The incoming and outgoing links from the north side (edge router 104/border network) and from the south side (servers 130/production network) are active (external).
- The node 110 can receive and dispatch packets via the network interface controllers (NICs) used in the load balancer implementation. For example, in an example load balancer node 110 embodiment as shown in FIG. 23, the node 110 should successfully receive and dispatch packets via the north-facing NIC 1114A and the south-facing NIC 1114B.

If one or more of these health conditions does not hold for a given node 110, the node 110 may be considered not healthy. Note that, in some embodiments, a node 110 is only considered healthy if all of the above conditions hold for the node 110.

In at least some embodiments, in addition to the above health conditions, a third NIC, shown in FIG. 23 as NIC 1114C, on each load balancer node 110 that may, for example, be used for control plane communications may also be checked by a health-checking node 110 by sending packets to and receiving packets from the NIC and, if the check of the third NIC fails, the node 110 being checked may be considered unhealthy.

Figure 13:
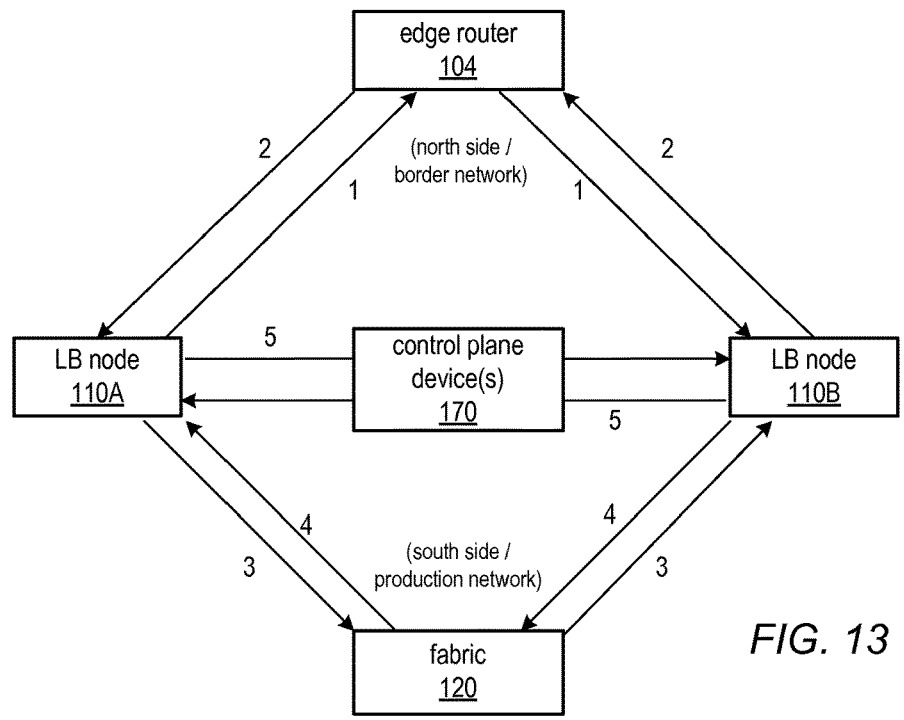
FIG. 13 illustrates a method for health checking a load balancer node from another load balancer node, according to at least some embodiments.

FIG. 13 illustrates an example method for health checking a load balancer node from another load balancer node, according to at least some embodiments. In this example, load balancer node 110A is health checking load balancer node 110B. Each node 110A and 110B has a north-facing NIC (NIC 1114A in FIG. 23) and a south-facing NIC (NIC 1114B in FIG. 23). At 1, node 110A sends a packet (e.g., a ping packet) from its north-facing NIC to the north-facing NIC of node 110B via edge router 104. Node 110B receives the packet on its north-facing NIC, and at 2 sends a response from its north-facing NIC to the north-facing NIC of node 110A via fabric 120, provided the conditions given in the list above are satisfied. After receiving the response on its north-facing NIC, at 3, node 110A sends a packet (e.g., a ping packet) from its south-facing NIC to the south-facing NIC of node 110B via fabric 120. Node 110B receives the packet on its south-facing NIC, and at 4 sends a response from its south-facing NIC to the south-facing NIC of node 110A via edge router 104, provided the conditions given in the list above are satisfied. Upon receiving the response on its south-facing NIC, node 110A considers node 110B to be healthy and increments node 110B's local heartbeat counter, which may then be propagated to other nodes 110 according to a gossip protocol as previously described.

As an alternative to the above, in some embodiments, load balancer node 110B may respond to the first ping message, received at its north-facing NIC, via its south-facing NIC to the south-facing NIC of node 110A, and respond to the second ping message, received at its south-facing NIC, via its north-facing NIC to the north-facing NIC of node 110A.

In addition, in some embodiments, node 110A may also health check a third NIC of node 110B that is used for control plane communications (shown as NIC 1114C in FIG. 23) by pinging node 110B's third NIC from its own third NIC and receiving a response to the ping message on its third NIC from node 110B's third NIC if node 110B is healthy. The ping message and response may pass through one or more control plane device(s) 170, for example a network switch.

The above-described health check mechanism exercises all of the incoming and outgoing links and data paths of node 110B in all directions (north, south, and through the control plane) as well as all of node 110B's NICs, and also verifies the internal health of node 110B as the ping packets traverse the internal queues and dispatching of node 110B as would a client packet.

Assigning Health Checking Responsibilities to Load Balancer Nodes

In at least some embodiments, every load balancer node 110 in a load balancer implementation has access to a list (e.g., a sorted list) of all of the other load balancer nodes 110 in the load balancer implementation, for example via a configuration function and/or via a configuration service 122 component as shown in FIG. 1. In at least some embodiments, each load balancer node 110 may randomly select one or more other nodes 110 on the list to health check at each health check interval, incrementing their heartbeat counter if determined healthy. Note that the list includes all load balancer nodes 110 in the load balancer implementation whether currently considered healthy or unhealthy via the health check mechanism, and currently unhealthy nodes 110 may be randomly selected from the list and health checked as well as healthy nodes 110. Thus, a currently unhealthy node 110 may be determined to be healthy by one or more nodes 110 that health check the node 110, its heartbeat counter may be incremented and propagated to the other nodes 110, and the unhealthy node 110 may thus return to healthy status.

Alternatively, in some embodiments, each load balancer node 110 may assume responsibility for health checking one or more other nodes 110 in the list and incrementing their heartbeat counter if determined healthy. For example, in some embodiments, each node 110 may assume responsibility for two other nodes, for example its "left" (or previous) and "right" (or next) nearest neighbor nodes 110 in the list. Note that the list may be considered circular and a node 110 at the "end" of the list may assume responsibility for health checking a node 110 at the "beginning" of the list, and vice versa. In some embodiments, the two other nodes 110 may be otherwise selected, for example as the two nearest neighbors next on the list. In some embodiments, each node 110 may assume responsibility for health checking more than two other nodes 110 on the list, for example three or four other nodes 110. In at least some embodiments, if a neighbor node 110 that is being checked by a node 110 is determined to be unhealthy, then the node 110 may assume responsibility for health checking at least one node on the list that the unhealthy neighbor node 110 was responsible for checking. In at least some embodiments, in addition to health checking its neighbor nodes 110 (e.g., a "left" and "right" neighbor node), each load balancer node 110 may also periodically or aperiodically randomly select a node 110 in the ring and perform a health check of that randomly selected node 110 and, if healthy, increment and propagate the random node 110's heartbeat. In at least some embodiments, all other nodes 110 in the ordered list are considered for the random selection and health check regardless of whether the other node 110 was previously considered healthy or not.

In at least some embodiments, each node 110 performs the health check of one or more randomly selected nodes 110, or alternatively of its neighbor nodes 110 and a randomly selected node, at a regular interval, which may be referred to as the health check interval. For example, in some embodiments, the heartbeat interval may be 100 milliseconds, although shorter or longer intervals may be used. In addition, in at least some embodiments, each node 110 sends or "gossips" its current heartbeat list to at least one other randomly selected node 110 at a regular interval, which may be referred to as a gossip interval. In some embodiments, the health check interval and the gossip interval may be the same, although they are not necessarily the same.

Figure 14:
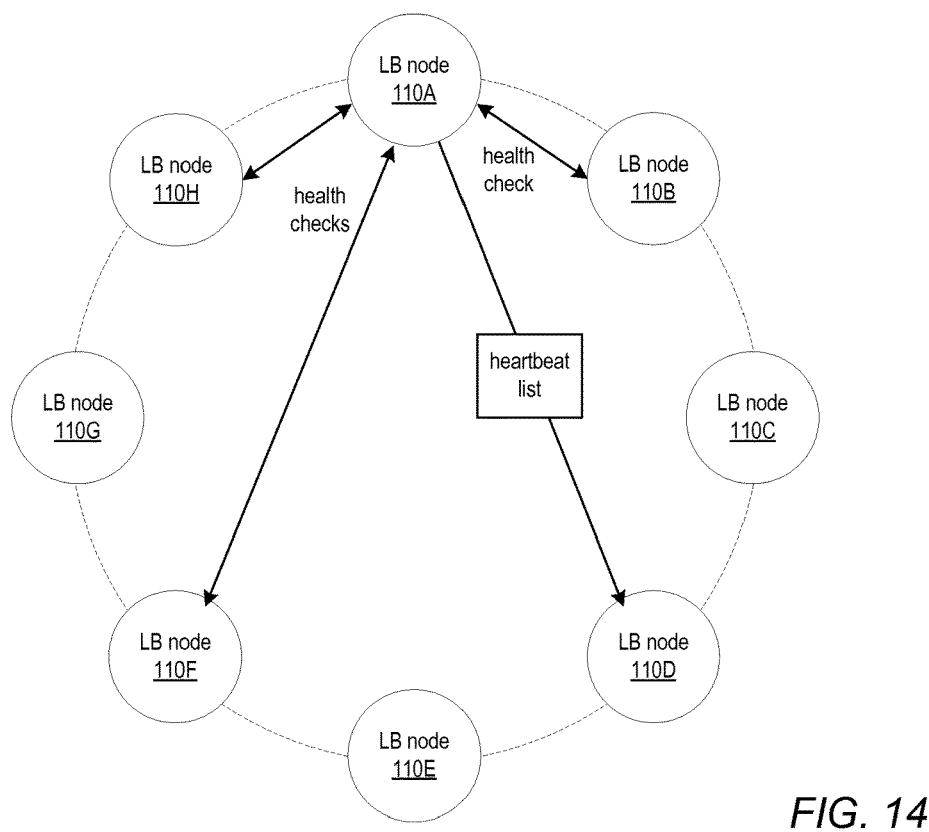
FIG. 14 graphically illustrates a load balancer node health checking one or more other load balancer nodes, according to at least some embodiments.

FIG. 14 graphically illustrates a load balancer node health checking one or more other load balancer nodes, according to at least some embodiments. In this example, there are eight load balancer nodes 110A-110H in the load balancer implementation. The dotted circle represents an ordered list of all nodes 110 in the implementation. In some embodiments, each node 110 may randomly select one or more other nodes 110 on the list to health check at each interval. As an alternative, in some embodiments, each load balancer node 110 may assume responsibility for checking one or more particular nodes 110 on the ordered list, for example node 110A may take responsibility for health-checking its two nearest neighbor nodes 110B and 110H according to the ordered list as shown in FIG. 14. In addition, the load balancer node may also randomly select another node 110 from the ordered list at each health check interval. As shown in this example, node 110A has also randomly selected node 110F to health check. At the gossip interval, node 110A randomly selects some other healthy node 110, for example node 110D, and sends its current heartbeat list to the selected other node 110, for example in a UDP message. A node 110, upon receiving a heartbeat list from another node 110, may update its own heartbeat list accordingly and propagate the heartbeat list to one or more randomly selected nodes 110 at the next gossip interval.

Health Checking the Server Nodes

In addition to health checking the load balancer nodes 110 as described above, embodiments of the health check protocol may perform health checking of the server nodes 130 including the load balancer modules 132 and servers 134 on those nodes 130. In at least some embodiments, a server node 130 may be considered healthy if one or both of the following conditions are determined for the node 130:

The load balancer module 132 is healthy.

The server node 130 responds successfully to health pings (e.g., L7 health pings).

Figure 15:
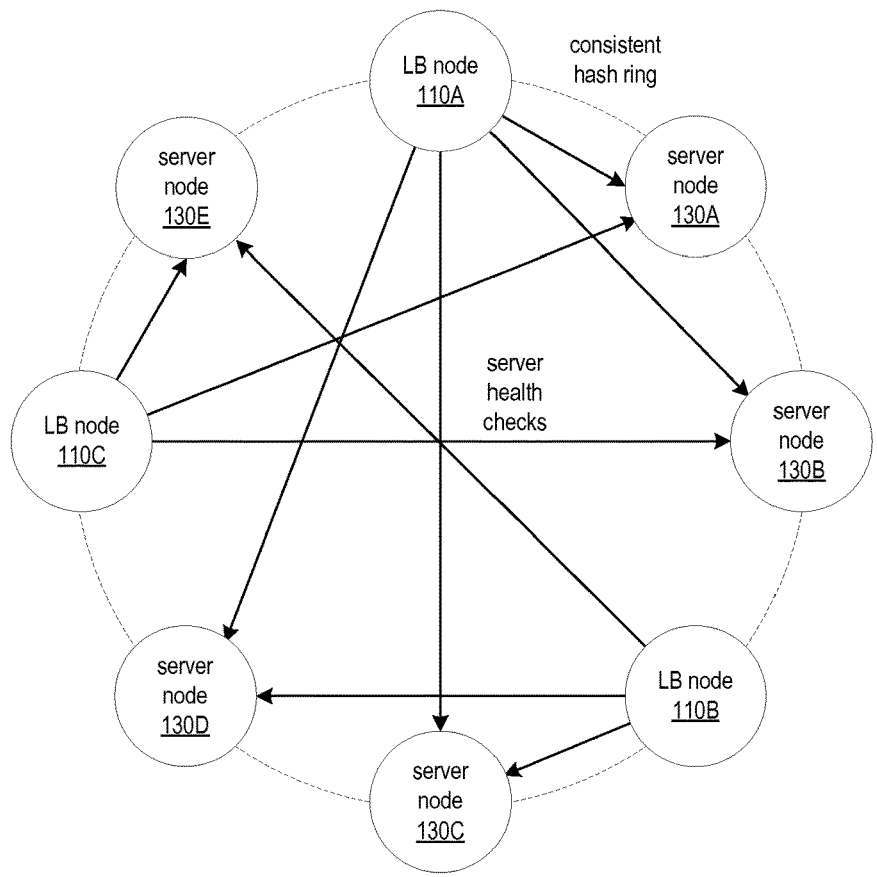
FIG. 15 illustrates the load balancer nodes health checking the server nodes, according to at least some embodiments.

FIG. 15 illustrates the load balancer nodes health checking the server nodes, according to at least some embodiments. In at least some embodiments, every load balancer node 110 in a load balancer implementation has access to a list of all of the other load balancer nodes 110 in the load balancer implementation, as well as a list of all server nodes 130 in the load balancer implementation. The list(s) may be obtained and updated, for example via a configuration function and/or via a configuration service 122 component as shown in FIG. 1. In at least some embodiments, the server nodes 130 may be consistent hashed against the healthy load balancer nodes 110 to form a consistent hash ring as illustrated in FIG. 15. In at least some embodiments, each server node 130 in the ring is health checked by two healthy load balancer nodes 110 in the ring. For example, in FIG. 15, server node 130A is health checked by load balancer nodes 110A and 110C. These two nodes 110 may be referred to as the first (node 110A) and second (node 110B) health checking nodes 110 for the server node 130 in the consistent hash ring. Note that a given healthy load balancer node 110 may health check more than one server node 130. For example, in FIG. 15, load balancer node 110A also health checks server nodes 130B and 130C. In addition, a given node balancer node 110 may be a first health checking node 110 for one or more server nodes 130 and a second health checking node 110 for one or more other server nodes 130. For example, in FIG. 15, load balancer node 110A is the first health checker node for server nodes 130A and 130B and the second health checker node for server nodes 130C and 130D.

In at least some embodiments, if a load balancer node 110 fails, the membership in the consistent hash ring changes, and one or more others of the load balancer nodes 110 that are still healthy and thus still on the consistent hash ring may assume responsibility for health checking the server nodes 130 previously health checked by the failed node 110.

In at least some embodiments, each healthy node 110 performs the health check of its assigned server nodes 130 at a regular interval, which may be referred to as a server check interval. In at least some embodiments, the server check interval may be greater than or equal to the gossip interval previously mentioned.

In at least some embodiments, to perform a health check of a server node 130, a healthy load balancer node 110 (e.g., node 110A in FIG. 15) initiates a health ping message (e.g., a L7 HTTP health ping message) to a server node 130 (e.g., server node 130A in FIG. 15). If healthy, the server node 130 sends a ping response back to the load balancer node 110. In at least some embodiments, the ping message is received and processed by the load balancer module 132 on the server node 130, so the health check ping, if successful, establishes that the module 132 on the server node 130 is healthy. Upon receiving the response to the ping, the load balancer node 110 considers the server node 130 as healthy, and increments a heartbeat counter for the server node 130.

In at least some embodiments, the heartbeat counters for all server nodes 130 health checked by a given healthy load balancer node 110 may be propagated to the other load balancer nodes 110, for example according to the gossip technique previously described for the load balancer node 110 heartbeat counters in which each node 110 sends its heartbeat list to at least one other randomly selected node 110 at a regular interval (the gossip interval), and the receiving node 110 updates its own heartbeat list according to the maximum values in the two lists.

Failure Detection and Gossip

In at least some embodiments, the information obtained through the load balancer node 110 health checks and the server node 130 health checks described above may need to be propagated to all the nodes 110 in the load balancer implementation so that all load balancer nodes 110 can maintain consistent view of the load balancer implementation. As described above, in at least some embodiments, the load balancer nodes 110 may communicate with each other according to a gossip protocol to exchange and propagate this health information and to detect load balancer node 110 and server node 130 failures.

In at least some embodiments, at a regular interval (referred to as the gossip interval), each load balancer node 110 randomly selects another load balancer node 110 and sends the other node 110 its view of healthy load balancer nodes 110 and server nodes 130 along with the heartbeat counters for the load balancer nodes 110 and server nodes 130. As long as a load balancer node or server node 130 is healthy, the node will pass its health checks and its heartbeat counter will keep increasing. If the heartbeat counter for a node does not change for a specified interval (which may be referred to as a fail time interval), then the node is suspected to have failed by the load balancer nodes 110. Once a node is suspected to have failed, the load balancer nodes 110 may wait for a specified interval (which may be referred to as the unhealthy time interval) before determining that the node is unhealthy. This unhealthy time interval allows the load balancer nodes 110 to wait until all the load balancer nodes 110 learn that the node has failed.

Figure 16:
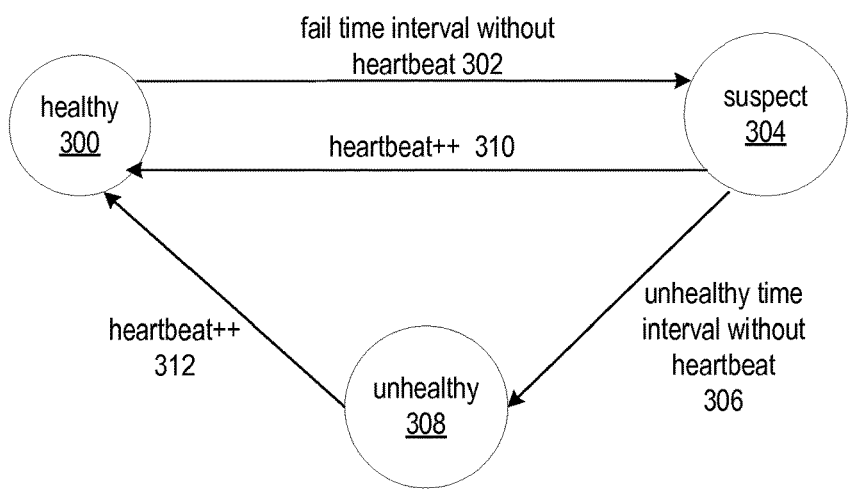
FIG. 16 graphically illustrates a view of health of another node that may be maintained by a load balancer node 110, according to at least some embodiments.

FIG. 16 graphically illustrates a state for, or view of, health of another node (either a load balancer node 110 or server node 130) that may be maintained by a load balancer node 110, according to at least some embodiments. Assume the load balancer node 110 starts with a view of the node in question as being healthy, as indicated at 300. This indicates that the heartbeat counter for the node has been incrementing. However, if the node's heartbeat counter does not increase for a specified interval (the fail time interval) as indicated at 302, then the load balancer node 110 suspects that the node has failed, as indicated at 304. If the node's heartbeat counter does not increase for a specified interval (the unhealthy time interval) as indicated at 306, then the load balancer node 110 considers the node unhealthy, as indicated at 308. However, if the heartbeat counter for the node increments before the unhealthy time interval expires as indicated at 310, the load balancer node 110 again considers the node as healthy 300. Similarly, receiving a heartbeat increment for an unhealthy node as indicated at 312 can cause the node to be considered as healthy 300.

Determining that a node is unhealthy may involve different actions by the load balancer node(s) 110 depending on whether the unhealthy node is a load balancer node 110 or a server node 130, and also depending on the load balancer node's 110 relationship with the unhealthy node, as described elsewhere herein.

Load Balancer Node Data

Figure 17:
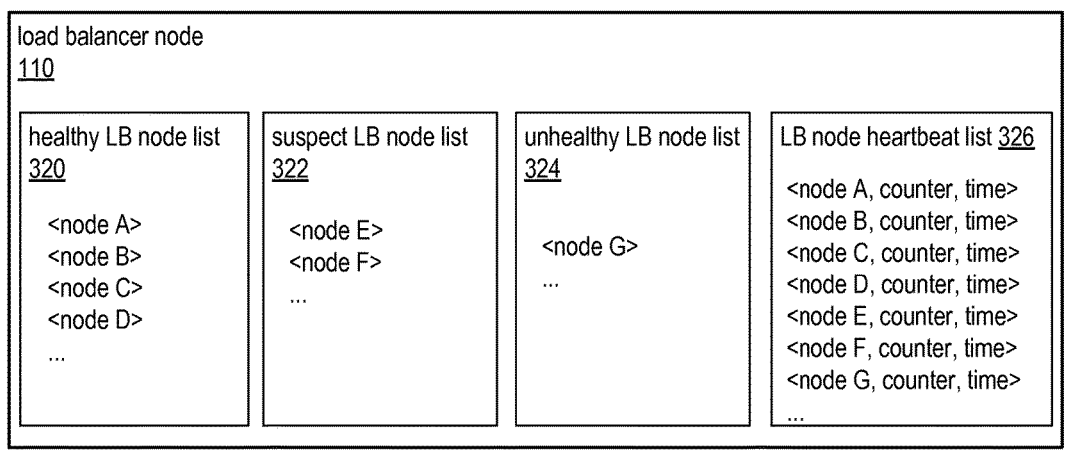
FIG. 17 illustrates health information that may be maintained by each load balancer node, according to at least some embodiments.

In at least some embodiments, each load balancer node 110 may maintain data about the state of the load balancer implementation. In at least some embodiments, this data may be maintained in one or more data structures on each load balancer node 110 including but not limited to a healthy load balancer node list, a suspect load balancer node list, and a heartbeat list. FIG. 17 illustrates an example load balancer node 110 that maintains a healthy load balancer node list 320, a suspect load balancer node list 322, an unhealthy load balancer node list 324, and a load balancer node heartbeat list 326.

In at least some embodiments, each load balancer node 110 may maintain a healthy load balancer node list 320, which is a list of healthy load balancer nodes 110 that may, for example, be used to determine which nodes 110 are healthy and are thus participating in the gossip protocol. Only the nodes 110 on the list 320 are involved in the propagation of load balancer information via the gossip protocol, only the nodes 110 on the list 320 are considered to be in the consistent hash ring, and only the nodes 110 on this list health-check server nodes 130. A node 110 may randomly select another node 110 from this list 320 to which its heartbeat information is sent. In addition, heartbeat counters are exchanged only for the nodes 110 that are currently in the healthy load balancer node list 320. In at least some embodiments, a load balancer node N can be added to the healthy load balancer node list 320 of another load balancer node 110 if node N passes a health check by the load balancer node 110 or if the load balancer node 110 receives a gossip message about node N from some other load balancer node 110 on the list 320.

In at least some embodiments, each load balancer node 110 may maintain a suspect load balancer node list 322, which is a list of load balancer nodes whose heartbeat counter (see heartbeat list 326) has not increased for a specified interval (referred to as the fail time interval). If a load balancer node E is in the suspect load balancer node list 322 of a load balancer node 110, then the load balancer node 110 will not gossip about node E. If some other load balancer node 110 on the healthy list 320 gossips to the load balancer node 110 about node E with a higher heartbeat counter than the counter for node E in the node 110's heartbeat list 326, then node E will be moved from the suspect list 322 to the healthy list 320. If the node E stays on the load balancer node 110's suspect list 322 for a specified interval (referred to as the unhealthy time interval), node E is considered unhealthy by the load balancer node 110 and is moved onto an unhealthy node list 324. A node 110 on the unhealthy node list 324 (in this example, node G) may be moved to the healthy node list 320 of a load balancer node 110 upon node G passing a health check by the node 110 or upon receiving an updated heartbeat counter for the node G from another node 110.

In at least some embodiments, each load balancer node 110 may maintain a heartbeat list 326 for all known load balancer nodes 110. For each node, 110, this list 326 may include a heartbeat counter and a timestamp that indicates when the heartbeat counter last changed.

In at least some embodiments, each load balancer node 110 may also maintain a heartbeat list for all known server nodes, not shown in FIG. 17. This list may be similar to the load balancer node heartbeat list 326. In some embodiments, the two lists may be combined. In at least some embodiments, the heartbeat information for the server nodes 130 may be propagated among the load balancer nodes 110, for example according to a gossip protocol, along with or in addition to the heartbeat information for the load balancer nodes 110.

While FIG. 17 shows four separate lists, it is to be noted that two or more of the lists may be combined into a single list. For example, in some embodiments, a single list of all nodes 110 may be maintained on each load balancer node 110, and bit flags or other data structures may be used to indicate whether each node is currently healthy, suspect, or unhealthy.

Server Node Data

In at least some embodiments, the server nodes 130 and local load balancer modules 132 on the nodes 130 do not participate in the gossip protocol with the load balancer nodes 110. The load balancer nodes 110 gossip the heartbeat information about the other load balancer nodes 110 obtained by the load balancer node health check method and the heartbeat information about the server nodes 130 obtained by the server node health check method only among themselves (specifically, each load balancer node 110 gossips only to nodes currently on its healthy load balancer node list 320).

However, each server node 130/load balancer module 132 may need information about healthy load balancer nodes 110 in the load balancer implementation so that the server node 130 can determine load balancer nodes 110 (specifically, egress nodes) to which the server node 130 can forward outgoing client traffic and determine which load balancer nodes to which connection publishing information is to be sent. In at least some embodiments, to provide this information to the server nodes 130, the load balancer nodes 110 may periodically or aperiodically update the server nodes 130 with information identifying the currently healthy load balancer nodes 110 (e.g., healthy load balancer node list 320 in FIG. 17). In at least some embodiments, the load balancer nodes 110 that are responsible for health checking a given server node 130 (see FIG. 15) are responsible for providing the information identifying the currently healthy load balancer nodes to the server 130. For example, referring to FIG. 15, load balancer node 110A may send its healthy load balancer node list 320 to server nodes 130A, 130B, 130C, and 130D, load balancer node 110B may send its healthy load balancer node list 320 to server nodes 130C, 130D, and 130E, and so on.

Handling Load Balancer Node Failures

Figure 18A:
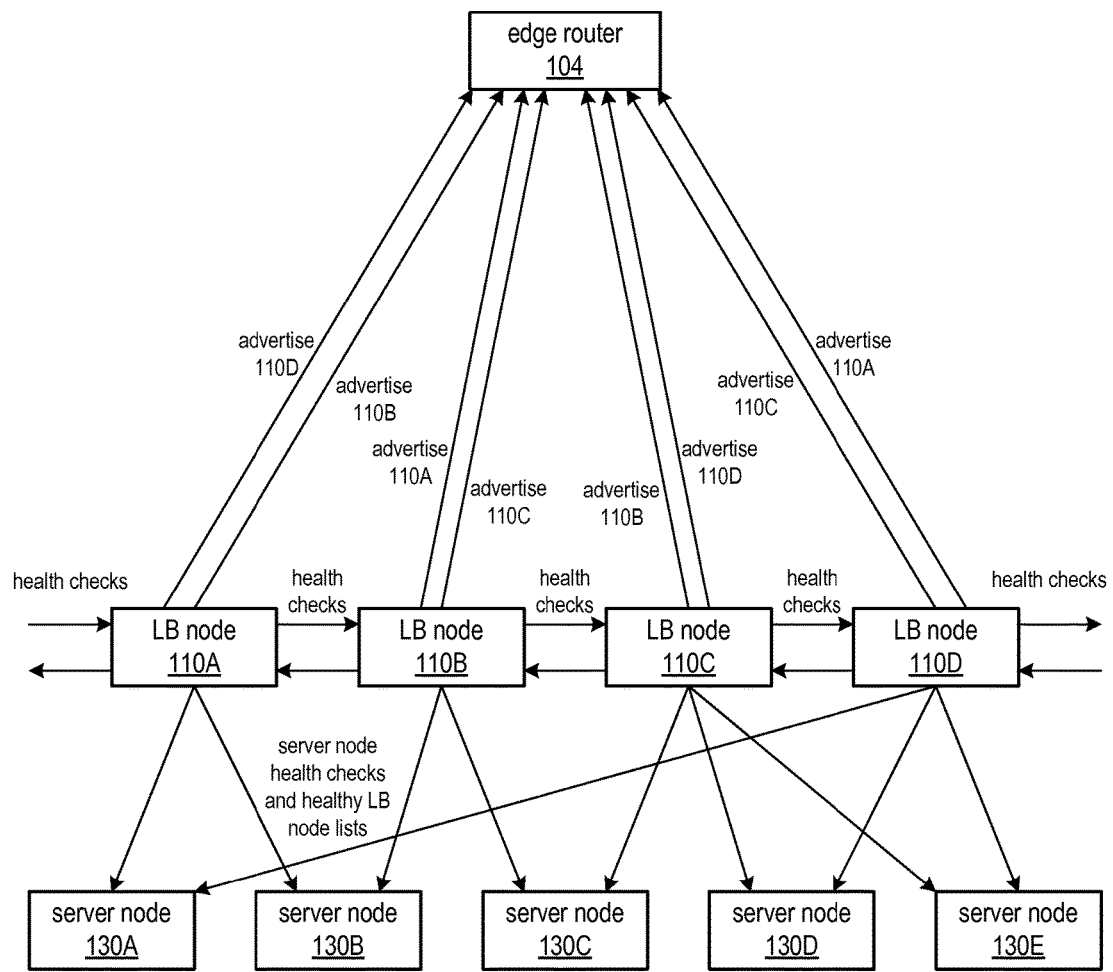
FIGS. 18A and 18B illustrate handling a load balancer node failure, according to at least some embodiments.
Figure 18B:
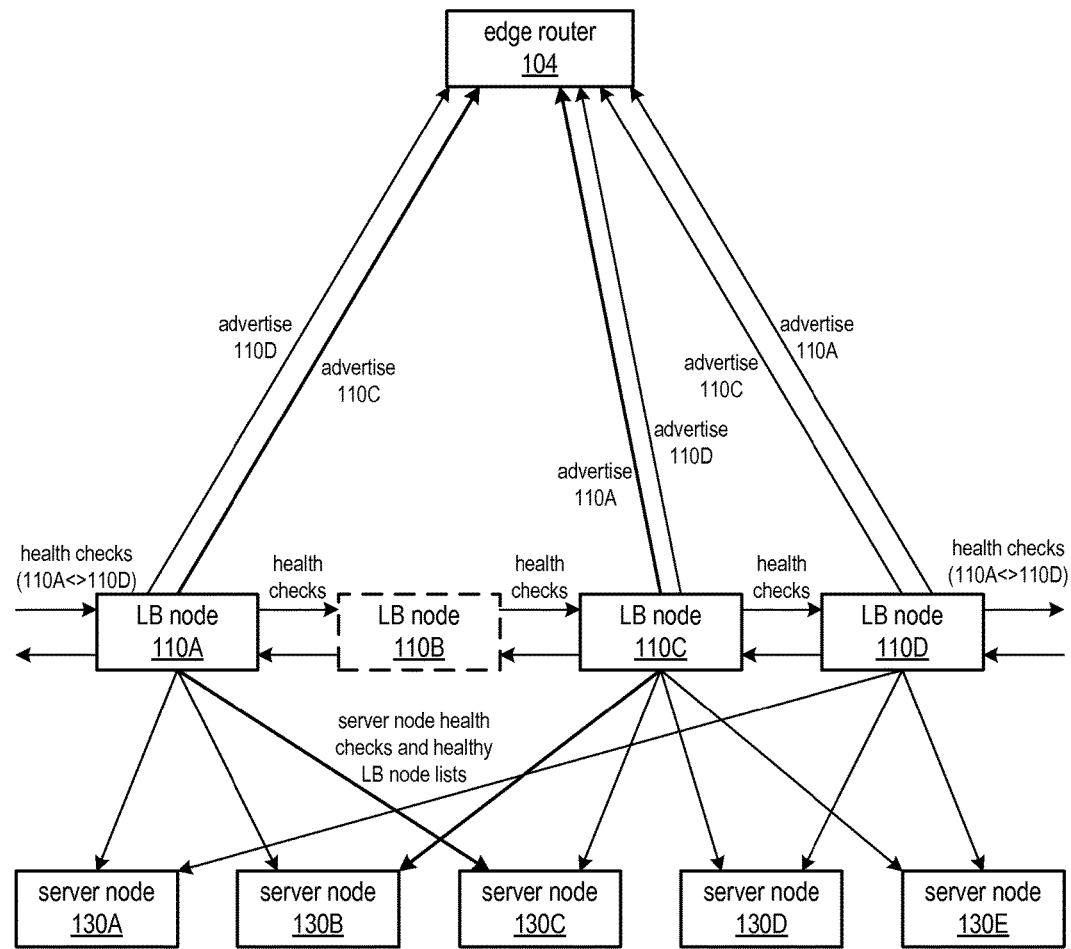

FIGS. 18A and 18B illustrate handling a load balancer node failure, according to at least some embodiments. FIG. 18A shows an example load balancer implementation. There are four load balancer nodes 110A through 110D currently in the load balancer implementation. Edge router 104 routes incoming packets from clients (not shown) to the load balancer nodes 110. In at least some embodiments, the edge router 104 may make the routing decisions according to a layer 4 per-flow hashed multipath routing technique, for example an equal-cost multipath (ECMP) routing technique. In at least some embodiments, edge router 104 learns about the load balancer nodes 110 that are currently available in the load balancer implementation to receive client traffic via load balancer node 110 advertisements, for example advertisements via Border Gateway Protocol (BGP) technology sessions initiated by the load balancer nodes 110. However, in at least some embodiments, instead of a load balancer node 110 advertising itself to the edge router 104 via a BGP session, at least one other node 110 in the load balancer implementation takes responsibility for advertising the node 110 to the edge router 104 via BGP. For example, in some embodiments as shown in FIG. 18A, the left and right neighbor nodes 110 of a given node 110 advertise the given node 110 to the edge router 104. For example, load balancer node 110A advertises nodes 110B and 110D, load balancer node 110B advertises nodes 110A and 110C, and load balancer node 110C advertises nodes 110B and 110D.

As shown in the example of FIG. 18A, each load balancer node 110 also periodically health checks one or more other load balancer nodes 110, for example one or more randomly selected nodes 110, one or more neighbor nodes 110 as determined by an ordered list of load balancer nodes, or one or more neighbor nodes and one or more randomly selected nodes. In addition, each load balancer node 110 may periodically health check at least one server node 130 and also may send its list of healthy load balancer nodes 110 to the server node(s) it health checks. Health information for the load balancer nodes 110 and the server nodes 130 may be propagated among the nodes 110, for example according to a gossip protocol.

FIG. 18B illustrates handling the failure of a single load balancer node 110 in the example load balancer implementation of FIG. 18A. In this example, load balancer node 110B has failed for some reason. For example, nodes 110A and 110C may health check node 110B, and both may detect that node 110B is failing its health checks. Thus, nodes 110A and 110C do not increment the heartbeat counter for node 110B. The heartbeat information from both nodes 110A and 110B is propagated to the other healthy load balancer nodes 110 (in this example, the only other load balancer node is node 110D) according to the gossip protocol. As soon as all of the healthy load balancer nodes 110 (in this example, nodes 110A, 110C, and 110D) converge on node 110B's failure, one or more of, but not limited to, the following events may occur. Note that these events do not necessarily occur in this order.

Nodes 110A and 110C stop advertising node 110B to the edge router 104. In at least some embodiments, this involves ending the BGP session that the node 110 established with the edge router 104 to advertise node 110B. Note that each node 110 establishes a separate BGP session with the edge router 104 for each other node 110 that it advertises, so ending the BGP session for node 110B does not affect other nodes 110 that are advertised. In at least some embodiments, a node 110 ends a BGP session with the edge router 104 by sending a TCP Close or similar message for the BGP session to the edge router 104.

In response to detecting that node 110B is no longer being advertised by any of the nodes, edge router 104 stops routing client data packets to node 110B. The edge router 104 also adjusts the multipath (e.g., ECMP) hashing to redistribute packet flows from the clients to the remaining healthy load balancer nodes 110, specifically to the ingress servers 112 on the nodes 110. For any packet flow routed to an ingress server 112 for which the ingress server 112 does not have a client->server mapping, the mapping may be obtained from a flow tracker node for the client->server connection, or alternatively a new client->server connection may be established according to the technique as illustrated in FIGS. 10A through 10G.

Nodes 110A and 110C may each opens a BGP session to edge router 104 to advertise each other. Note that, since both nodes 110A and 110C are advertised to edge router 104 by load balancer node 110D as well as node 110B, the fact that node 110B may stop advertising nodes 110A and 110B to the edge router 104 when it fails does not cause edge router 104 to stop routing packets to these two nodes 110.

In at least some embodiments, nodes 110A and 110C may take responsibility for health checking each other, since they are now neighbor nodes 110. Note that node 110B, even though considered unhealthy, may still be randomly health checked by one or more of the other nodes 110.

One or more of the remaining healthy load balancer nodes 110 may assume responsibility for flow tracking connections formerly flow tracked by node 110B. For example, node 110C and/or node 110D may take over as primary or secondary flow trackers as illustrated in FIGS. 11C and 11D for one or more connections for which node 110B was a primary or secondary flow tracker.

One or more of the remaining healthy load balancer nodes 110 may assume responsibility for health checking the server nodes 130 previously health checked by node 110B. The server nodes 130 are updated with the healthy load balancer node list (now not including node 110B) by the remaining load balancer nodes 110. For example, in FIG. 18B, load balancer node 110A begins health checking and updating server node 130C, and load balancer node 110C begins health checking and updating server node 130B.

On the edge router 104, the BGP sessions from the failed node 110B eventually time out. Alternatively, the edge router 104 may terminate the BGP sessions upon recognizing that node 110B has failed.

It is possible that two load balancer nodes 110 can fail at or at close to the same time. If the two failed load balancer nodes are not adjacent to each other, then the failures are independent and may be handled as separate single node 110 failures according to the method illustrated in FIG. 18B. However, if the two failed nodes are adjacent to each other (e.g., nodes 110B and 110C in FIG. 18A, then as soon as all of the healthy load balancer nodes 110 (in this example, nodes 110A and 110D) detect and converge on the failure, one or more of, but not limited to, the following events may occur. Note that these events do not necessarily occur in this order.

- Node 110A ends the BGP session to edge router 104 for node 110B.
- Node 110D ends the BGP session to edge router 104 for node 110C.
- Nodes 110A and 110D start BGP session with edge router 104 to advertise each other.
- Nodes 110A and 110D may begin health checking each other. Note that nodes 110A and 110D may also continue to health check the failed nodes 110.
- The remaining healthy nodes 110 update the server nodes 130 with the healthy load balancer node lists.
- Traffic may continue to flow from the edge router 104 to node 110B and/or node 110C since these two nodes 110 may continue to advertise each other to edge router 104. However, these BGP sessions will eventually timeout, and the edge router 104 will redistribute the flows to the remaining advertised nodes 110 accordingly.
- Nodes 110B and 110C may close their BGP sessions with edge router 104 on which they advertise nodes 110A and 110D, respectfully, if nodes 110B and 110C think they are still healthy.

Connection Publishing

Referring again to FIG. 1, in at least some embodiments, the load balancer nodes 110 in a load balancer implementation maintain state information for client TCP connections to servers 130. This state information allows the load balancer nodes 110 to route incoming client traffic from the edge router 104 to the server nodes 130 responsible for the TCP connections. The load balancer modules 132 on the server nodes 130 maintain lists of active TCP connections to their respective servers 134. Connection publishing is a mechanism via which the load balancer modules 132 on the server nodes 130 may publish their lists of active client TCP connections to the load balancer nodes 110. In at least some embodiments, the connection publishing packets are formed and published to the load balancer nodes 110 by the load modules 132 at a regular interval, which may be referred to as the connection publishing interval.

In at least some embodiments, the connection state information maintained by the load balancer nodes 110 may be viewed as a form of cache, and maintaining the state information for a particular connection may be viewed as maintaining a lease on the load balancer node 110 for that connection. Unless the cache entries are renewed, the load balancer nodes 110 may not be able to route client data flows to the server nodes 130 that are handling the data flows. The connection publishing mechanism periodically renews the caches, and thus the leases, on the load balancer nodes 110 with current connection state information from the server nodes 130 to thus keep the TCP packets flowing from the clients 160 to the appropriate server nodes 130. When a client 160 ends a TCP connection to a server 134, the load balancer module 132 on the server node 130 associated with that connection will drop the connection from its list of active connections and thus will no longer publish the TCP connection through the connection publishing mechanism. Thus, the connection state information for that connection (the cache entry or entries) on the load balancer nodes 110 associated with that connection (specifically, the ingress server 112 and the primary and secondary flow trackers 116 for the connection) is no longer renewed, and the connection is dropped by the load balancer nodes 110. In at least some embodiments, the cache entry or entries for the connection may remain in the cache on a load balancer node 110 until the memory is required for some other active connection.

Thus, the connection publishing mechanism periodically or aperiodically extends the connection leases on the ingress servers 112 and the primary and secondary flow trackers 116 to keep the client traffic flowing. In addition, the connection publishing mechanism may help recover from at least some load balancer node 110 failures. When one or more load balancer nodes 110 holding state information for a client connection fails, the active connection information provided to the remaining load balancer nodes 110 by connection publishing may in some cases be used to recover the connection.

Using the connection publishing mechanism, the server nodes 130 are the authoritative sources for the states of the connections between the servers 134 and the clients 160. In addition, closing of connections to the servers 134 is passively handled by the load balancer modules 132 on the server nodes 130 and the load balancer nodes 110. Handshaking is not required between the server nodes 130 and the load balancer nodes 110. In other words, the load balancer modules 132 do not have to send messages to the load balancer nodes 110 to actively inform the nodes that particular connections have been closed. When a server 134 closes a connection, the server 134 clears its internal state for the connection. The load balancer module 132 uses the server 134's internal state to populate the connection publishing packet. Since the connection is no longer in the server 134's internal state, the connection does not get published to the load balancer nodes 110. The lease for the connection on the load balancer node 110 thus expires, and the load balancer nodes 110 passively forget about the connection. Memory in a load balancer node 110's cache that was used for the connection can then be used for other connections as necessary.

In some embodiments, the leases for connections maintained by the load balancer nodes 110 may involve timestamping entries for the connections in the cache. When a connection's lease is renewed by a connection publishing packet, the timestamp may be updated. If a connection's lease is not renewed because the connection is no longer being published by the load balancer module 132 on the server node 130, then the timestamp is no longer updated. In at least some embodiments, a lazy garbage collection method may be used in which the entry for the connection may remain in the cache until the memory is needed. For example, in at least some embodiments, timestamps on cache entries may be compared to a lease renewal time threshold; if the timestamp for a cache entry is older than the threshold, then the entry is stale and may be reused. However, in some embodiments, stale entries may be actively garbage collected.

Connection Publishing Recipients

In at least some embodiments, for each client TCP connection, there are three load balancer nodes 110 that maintain a connection state—the node 110 serving as the ingress server 112, the node 110 serving as the primary flow tracker 116 and the node serving as the secondary flow tracker 116. For a given TCP flow, the primary and secondary flow trackers 116 can be determined, for example by a load balancer node 110, by applying a consistent hash function to the TCP flow to find the primary flow tracker 116 node and its successor node in the consistent hash ring. The load balancer node 110 serving as the ingress server 112 for a TCP flow is the node 110 that receives traffic for that flow from the edge router 104 based on the edge router 104's internal multipath (e.g., ECMP) hash function. If there is a node 110 failure or addition, the load balancer node 110 serving as the ingress server 112 may change for many of the active TCP flows; and the load balancer nodes 110 serving as flow trackers for at least some active TCP flows may change (see, e.g., FIGS. 11A through 11D). For every TCP flow to the server 132 on a server node 130, the load balancer module 132 on that server node 130 maintains state information indicating which of the load balancer nodes 110 is the ingress server 112 for that TCP flow, since it receives traffic from that load balancer node 110. However, in at least some embodiments, the load balancer module 132 may not know and may not be able to determine which load balancer nodes 110 are serving as the primary and secondary flow trackers for a TCP flow, since the load balancer module 132 may not know the consistent hash function that is used. In other words, in at least some embodiments, the load balancer modules 132 do not do consistent hashing.

Publishing the Active Connection Information

Figure 19A:
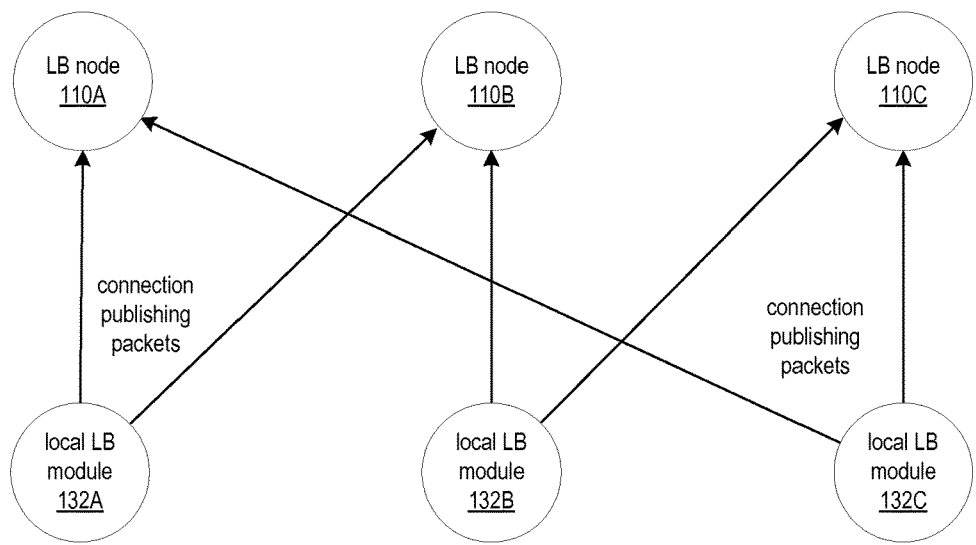
FIGS. 19A and 19B graphically illustrate a connection publishing technique, according to at least some embodiments.
Figure 19B:
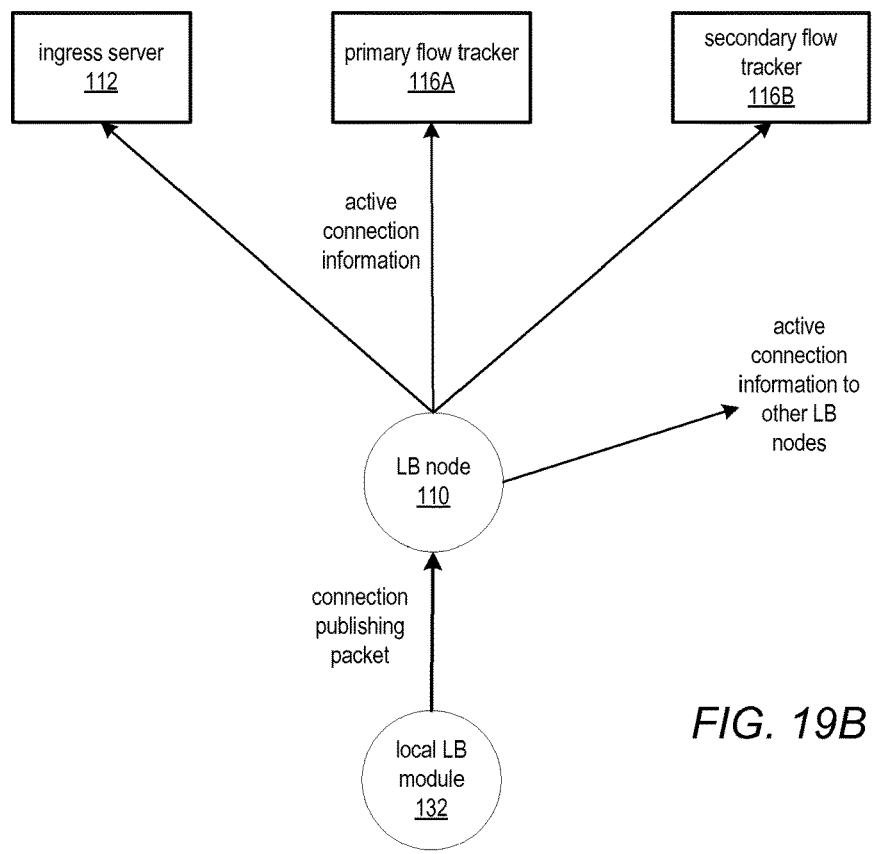

FIGS. 19A and 19B graphically illustrate a connection publishing technique, according to at least some embodiments. FIG. 19A illustrates load balancer (LB) modules publishing active connection information to the load balancer nodes. In at least some embodiments, each load balancer module 132 collects information for each active TCP flow on the server node 130 and forms a connection publishing packet. The information for a given TCP flow includes information identifying the load balancer node 110 serving as the ingress server 112 for the flow. When a connection publishing packet is ready (e.g., when the connection publishing interval has been reached), the load balancer module 132 randomly selects a load balancer node 110, for example from the list of healthy load balancer nodes 110 that are periodically sent to the server nodes 130 from the load balancer nodes 110 that health-check the server nodes 130 as previously described. The load balancer module 132 then sends the connection publishing packet to the selected node 110. For example, in FIG. 19A, load balancer module 132A has sent one connection publishing packet to load balancer node 110A, and later sends another connection publishing packet to load balancer node 110B.

Figure 20:
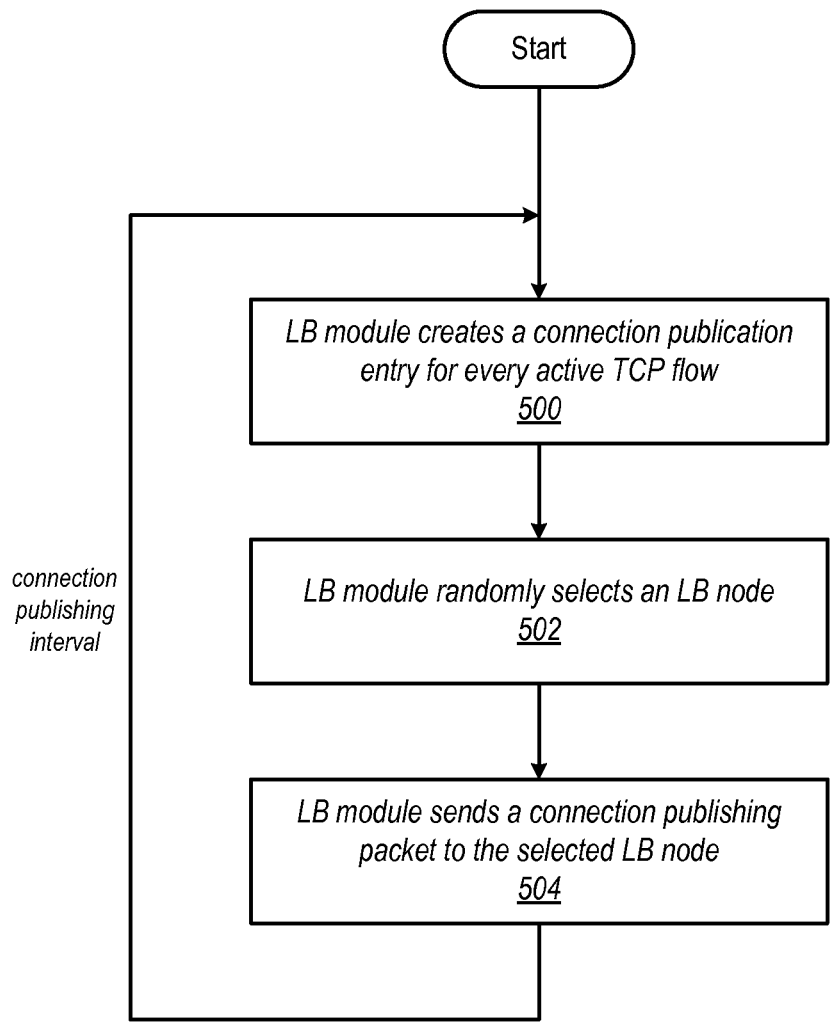
FIG. 20 is a high-level flowchart of a connection publishing method that may be performed by each load balancer module, according to at least some embodiments.

FIG. 20 is a high-level flowchart of a connection publishing method that may be performed by each load balancer module 132, according to at least some embodiments. As indicated at 500, the load balancer (LB) module 132 creates a connection publishing entry for every active TCP flow on the respective server node 130. In at least some embodiments, the load balancer module 132 retrieves the set of active TCP connections that the server 134 on the server node 130 handles, for example from /proc/net/tcp on the server node 130. For every active TCP connection, the load balancer module 132 looks up (e.g., in a locally maintained table of active connections) the load balancer node 110 that is serving as the ingress server 112 for the TCP flow and creates a connection publishing entry that indicates the TCP tuple for the connection (e.g., a 4-tuple consisting of: the client IP address, client port, server (public) IP address, and server port) and the ingress server 112 for the connection. Note that each load balancer module 132 maintains information for each active TCP connection indicating the last load balancer node 110 from which a packet was received for the connection, and this information may be used by the load balancer module 132 to identify the ingress node 110 for each active connection.

As indicated at 502, the load balancer module 132 randomly selects a load balancer node 110 to which the connection publishing packet (containing one or more connection publishing entries, with one entry for each active TCP connection) is to be sent. In at least some embodiments, the load balancer module 110 may be randomly selected when the load balancer module 132 determines that the connection publishing packet is ready to be sent. In at least some embodiments, this determination is made according to a connection publishing interval. As non-limiting examples, the connection publishing interval may be 100 milliseconds (ms), or one second. In at least some embodiments, the load balancer module 110 is selected from a list of healthy load balancer nodes 110 that has been previously received from one of the load balancer nodes 110. As indicated at 504, the load balancer module then publishes the connection publishing packet to the selected load balancer node 110. In at least some embodiments, the connection publishing packet is a stateless packet, for example a UDP packet. In some embodiments, the connection publishing packet may be compressed prior to sending the packets to the target load balancer node 110. In at least some embodiment, the connection publishing information may be sent to the target load balancer node 110 in two or more packets.

As indicated by the arrow returning from element 504 to element 500, the load balancer module 132 may continuously build connection publishing packets, select random nodes 110, and send the packets to the selected nodes. As noted above, this may be performed according to a connection publishing interval so that the load balancer nodes 110 are relatively regularly refreshed with current active connection information to maintain the connection leases on the load balancer nodes 110.

Figure 21:
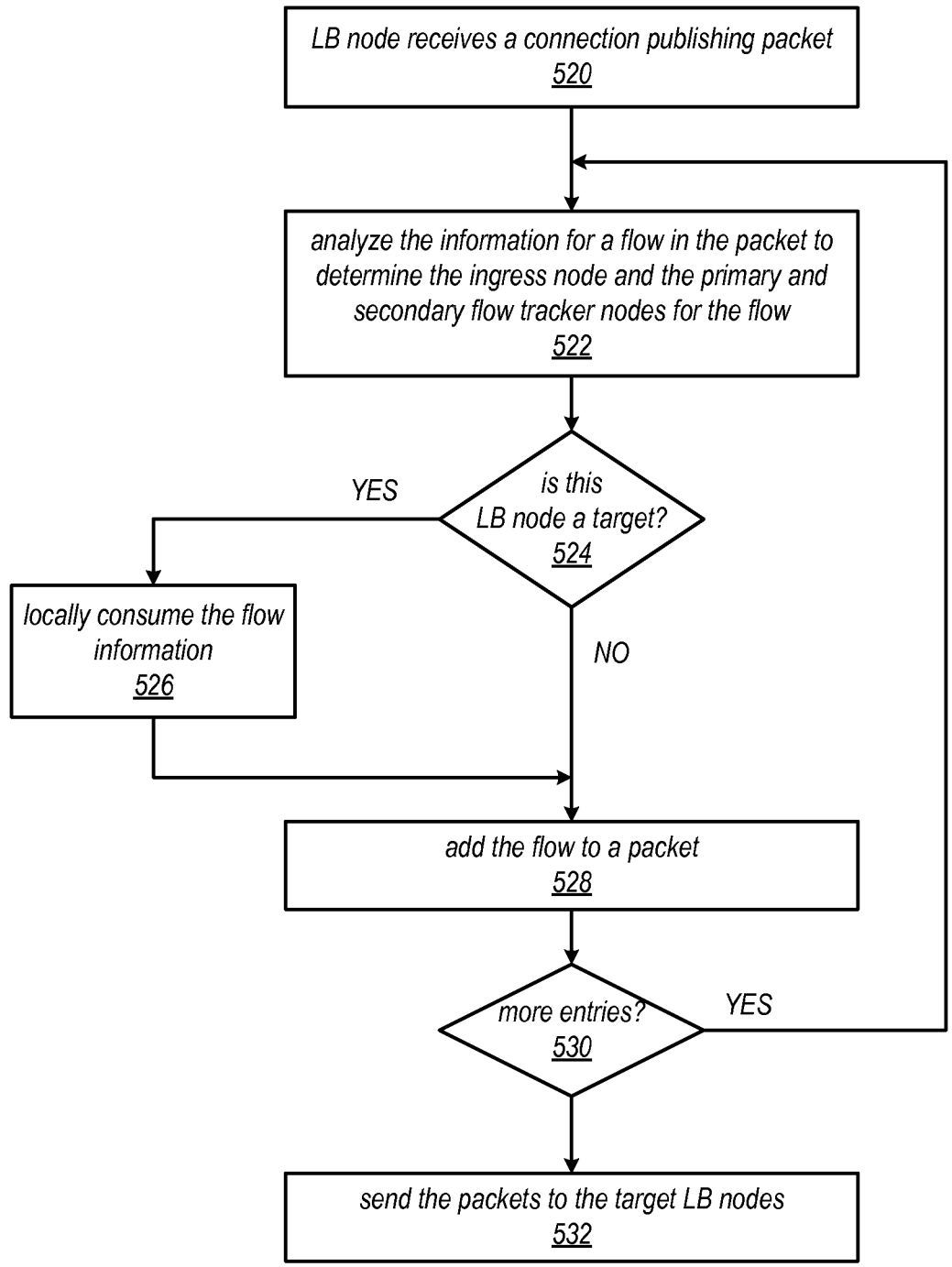
FIG. 21 is a flowchart of a method for distributing the active connection information received in a connection publishing packet to target load balancer nodes, according to at least some embodiments.
Figure 22:
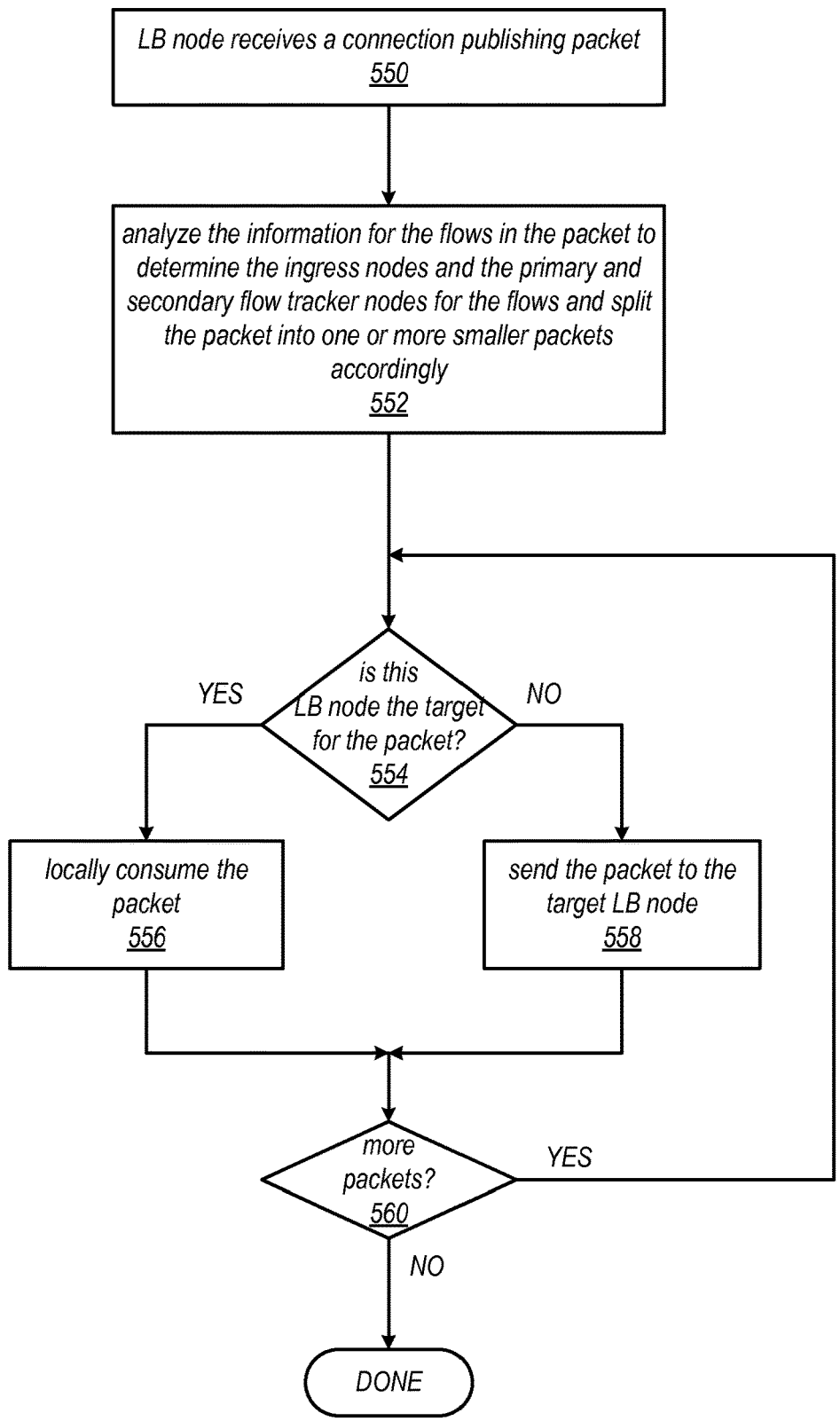
FIG. 22 illustrates an alternative method for distributing the active connection information received in a connection publishing packet to target load balancer nodes, according to at least some embodiments.

In at least some embodiments, since the connection publishing packets are randomly distributed to the load balancer nodes 110 by the load balancer modules, the load balancer nodes 110 that receive the connection publishing packets are responsible for distributing the active connection information in the connection publishing packets to the correct ingress/primary/secondary nodes 110 for the connections. FIG. 19B and FIGS. 21 and 22 illustrate methods for distributing the active connection information that may be used in at least some embodiments.

FIG. 19B illustrates distributing the active connection information among the load balancer nodes 110, according to at least some embodiments. When a load balancer node 110 receives a connection publishing packet from a load balancer module 132, the load balancer node 110 may analyze the information for each TCP flow indicated therein to determine the ingress node and the primary and secondary flow tracker nodes for that flow. If the load balancer node 110 is serving in one of those roles for a flow, the load balancer node 110 consumes the information for the flow (e.g., by updating its cache of state information). In at least some embodiments, the load balancer node 110 may also put the information for the flow in packet(s) to be sent to the one or more other nodes 110 that are serving in the other roles for the flow. For the remaining flows indicated by the connection publishing packet, the load balancer node 110 splits the active connection information into two or more smaller packets and sends each packet to one or more other load balancer nodes 110. For example, in at least some embodiments, a packet containing active connection information for one or more flows may be sent to the load balancer nodes 110 that are serving as the ingress server 112, primary flow tracker 116A, and secondary flow tracker 116B for the flow(s).

FIG. 21 is a flowchart of a method for distributing the active connection information received in a connection publishing packet to target load balancer nodes 110, according to at least some embodiments. As indicated at 520, a load balancer node 110 receives a connection publishing packet from a load balancer module 132. The load balancer module 132 generated the packet and selected the load balancer node 110 to receive the packet, for example as described above in reference to FIGS. 19A and 20. The connection publishing packet may include information identifying the server node 130 from which the packet was received (e.g., an IP address of the load balancer module 132 on the server node 130) and a list of entries identifying active TCP connections (e.g., a 4-tuple consisting of: the client IP address, client port, server (public) IP address, and server port for each connection).

In elements 522-530 of FIG. 21, the load balancer module 110 iteratively processes the active TCP connection information indicated in the received connection publishing packet. As indicated at 522, the load balancer node 110 analyzes the entry for a next TCP flow in the packet to determine the ingress node 110 and the primary and secondary flow tracker nodes 110 for the respective TCP flow. In at least some embodiments, the load balancer node 110 gets the identity of the ingress node 110 from the connection publishing entry. In at least some embodiments, the primary and secondary flow tracker nodes 110 for the TCP flow may be determined according to the consistent hash function. At 524, if the load balancer node 110 is serving in one of the roles for the TCP flow being examined, then at 526 the load balancer node 110 consumes the information for the flow, for example by updating its cache of state information. As indicated at 528, the load balancer node 110 may add the connection publishing entry for the TCP flow to a packet being constructed that is to be sent to another load balancer node 110. At 530, if there are more connection publishing entries for flows in the connection publishing packet, then the method returns to 522 to process the next entry. Otherwise, the load balancer node sends the newly constructed packet(s) each containing a subset of the connection publishing entries from the original connection publishing packet to target load balancer nodes 110 for the packets, as indicated at 532. In at least some embodiments, the packets sent to the target load balancer nodes 110 are stateless packet, for example UDP packets. In some embodiments, the packets may be compressed prior to sending the packets to the target load balancer nodes 110.

Thus, in at least some embodiments, in elements 522-528 of FIG. 21, the flow tracker node 110 constructs one or more packets (e.g., UDP packets) each to be sent to a particular one of the other nodes 110 according to the information determined at 522 from the connection publishing entries in the received connection publishing packet. In at least some embodiments, a packet sent to another node 110 contains entries for TCP flows for which the target node 110 is serving as the ingress node 110, primary flow tracker node 110, or secondary flow tracker node 110. Note that in some embodiments a given load balancer node 110 may serve as both the ingress and primary flow tracker node for a TCP flow, or as both the ingress and secondary flow tracker node for a TCP flow.

FIG. 22 illustrates an alternative method for distributing the active connection information received in a connection publishing packet to target load balancer nodes 110, according to at least some embodiments. As indicated at 550, a load balancer node 110 receives a connection publishing packet from a load balancer module 132. In this method, as indicated at 552, a process on the load balancer module 110 analyzes the connection publishing entries in the packet and splits the received packet into one or more smaller packets accordingly. The load balancer module 110 does not locally consume the flow information during this process. Once the connection publishing packet has been split into one or more packets, the packets are then processed as indicated at 554-560. At 554, if the target node 110 for the packet is this load balancer node 110, then the load balancer node 110 locally consumes the packet as indicated at 556. Otherwise, the packet is sent to the target load balancer node 110. At 560, if there are more packets to be processed, then the method returns to 554. Otherwise, the method is done.

Thus, the load balancer node 110 that receives a connection publishing packet from a load balancer module 132 may split the connection publishing packet into two or more smaller packets that are specific to particular ones of the other load balancer nodes 110 and distribute the packets accordingly, while internally consuming flow information for any TCP flows currently being handled by the load balancer node 110. In the meantime, other load balancer nodes 110 may also be receiving connection publishing packets from the load balancer modules 132, splitting the connection publishing entries in multiple smaller packets, and sending the smaller packets to target nodes 110 to thus distribute the active connection information among the nodes 110.

Connection Publishing Triggers

In at least some embodiments, a connection publishing may be triggered on a load balancer module 132 by one or more different events. As previously noted, in some embodiments, a connection publishing packet may be generated and sent to a randomly selected load balancer node 110 according to a connection publishing interval, for example at 100 ms or one second intervals, to renew the leases for the TCP connections on the load balancer nodes 110. In some embodiments, a change in membership of the load balancer nodes 110 may trigger an immediate connection publishing event. In at least some embodiments, the load balancer module 132 may learn about the change from the list of healthy load balancer nodes 110 sent from one of the load balancer nodes 110 that health checks the respective server node 130. Upon detecting the change according to the list (either a deletion or an addition), the load balancer module 132 may generate a connection publishing packet and send to a load balancer node 110 so that TCP connections affected by the change may be more quickly recovered by the load balancer nodes 110.

Preventing Packet Loops

Connection publishing packet loops may occur if the load balancer layer membership changes while processing a connection publishing packet. A first node 110 may receive a connection publishing packet from a load balancer module 132 and send a smaller packet to a second node 110. However, if the membership has changed, the second node 110 may determine that the packet should go to the first node 110, and may thus forward the packet to the first node 110.

In at least some embodiments, to prevent this loop from happening, different port numbers may be used for connection publishing packets received from load balancer modules 132 and those received from load balancer nodes 110, and the load balancer nodes 110 do not redistribute connection publishing packets received from other load balancer nodes 110.

Connection Publishing Packet Distribution Alternatives

In the connection publishing methods described above, the load balancer module 132 randomly selects a load balancer node 110 to which a connection publishing packet is sent. However, in some embodiments, other methods may be used to select a load balancer node 110. For example, in some embodiments, the load balancer node 132 may construct one or more connection publishing packets that are each targeted to a particular ingress node 110 that handles one or more of the active TCP flows, and sent the packet(s) to the target ingress node(s) 110. The ingress node(s) 110 would then redistribute the active connection information to the primary and secondary flow trackers for the connections. As another example, in some embodiments, instead of sending the connection publishing packet to a single, randomly selected node 110, each connection publishing packet may be sent by the load balancer module 132 to two or more of the healthy nodes 110, or to all of the healthy nodes 110.

Load Balancer Node Architecture

FIG. 23 illustrates example software stack architecture for a load balancer node 110 according to at least some embodiments, and is not intended to be limiting. In this example software stack architecture, the load balancer node 110 runs within a single Java™ technology process 1102 that uses Java Native Interface (JNI™) 1104 technology to manage a layer of native code that may include load balancer server native code 1106 and core packet processing code 1108, for example Intel™ Dataplane Development Kit (DPDK) technology code. The native code may interface to two network interface controllers (NICs 1114A and 1114B). A first NIC (NIC 1114A) may face "north"; that is, towards the edge router 104. A second NIC (NIC 1114B) may face "south"; that is, towards the server nodes 130. In at least some embodiment, NICs 1114A and 1114B may not maintain TCP stacks. Thus, at least some embodiments may include a third NIC 1114C that does support TCP connections so that the load balancer node 110 can communicate with processes via a control plane, and vice versa. Alternatively, in some embodiments, only the first, north-facing NIC 1114A and the second, south-facing NIC 111B may be implemented in the load balancer node 110, and the second, south-facing NIC 1114B may implement a TCP stack via which the load balancer node 110 may communicate with processes via the control plane. Load balancer node 110 also includes operating system (OS) technology software 1112, e.g. a Linux™ kernel, and a Java Virtual Machine (JVM™) technology software 1110 layer on top of OS technology software 1112 and JNI 1104 technology.

Figure 24:
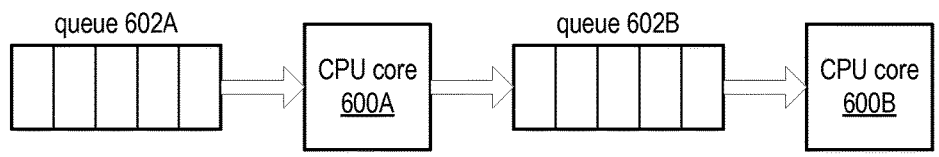
FIG. 24 illustrates aspects of core packet processing technology that may be used in embodiments.

In at least some embodiments, the load balancer nodes 110 in the distributed load balancing system may each need to concurrently process many data flows at high packet rates. In at least some embodiments, to achieve the required level of throughput, the load balancer nodes 110 may leverage Intel™ Dataplane Development Kit (DPDK) technology for high performance packet processing. DPDK technology permits a userspace program to read/write packets directly to and from a network interface controller (NIC) and bypasses the many layers of the Linux kernel networking stack (except for the Linus ixgbe base NIC driver). The DPDK approach to packet processing rejects interrupt handler-based input in favor of dedicated CPU cores that directly poll the NIC hardware in a busy loop. This approach may allow for much higher packet rates, at the expense of increasing thermal output by continuously running dedicated CPU cores in a busy loop. DPDK technology may also provide tools for packet processing including CPU core management, lock-free queues, memory pools, and synchronization primitives. As shown in FIG. 24, in DPDK technology, a dedicated CPU core 600 may be used for each particular task, and work is passed from one CPU core 600A to another CPU core 600B using non-blocking queues 602.

The DPDK queues 602 may be implemented using fast power-of-two ring buffers, and may support single and multiple producer/consumer variants. The multiple producer/consumer variants are not truly lock-free, since they do contain a compare-and-swap (CAS) loop to synchronize access. All packet buffer memory may be pre-allocated in memory pools, so that only pointers to the buffers are read and written to the queues 602. The memory pools may be implemented as queues, may be optimized to distribute memory across memory channel and rank, and may support non-uniform memory access (NUMA) optimized allocation. In at least some embodiments, the packet buffers may use a method such as an Mbuf paradigm that over-allocates enough headroom and tailroom in each packet buffer to support encapsulate/decapsulate operations that may add/remove outer network layer headers without requiring buffer copies.

Figure 25:
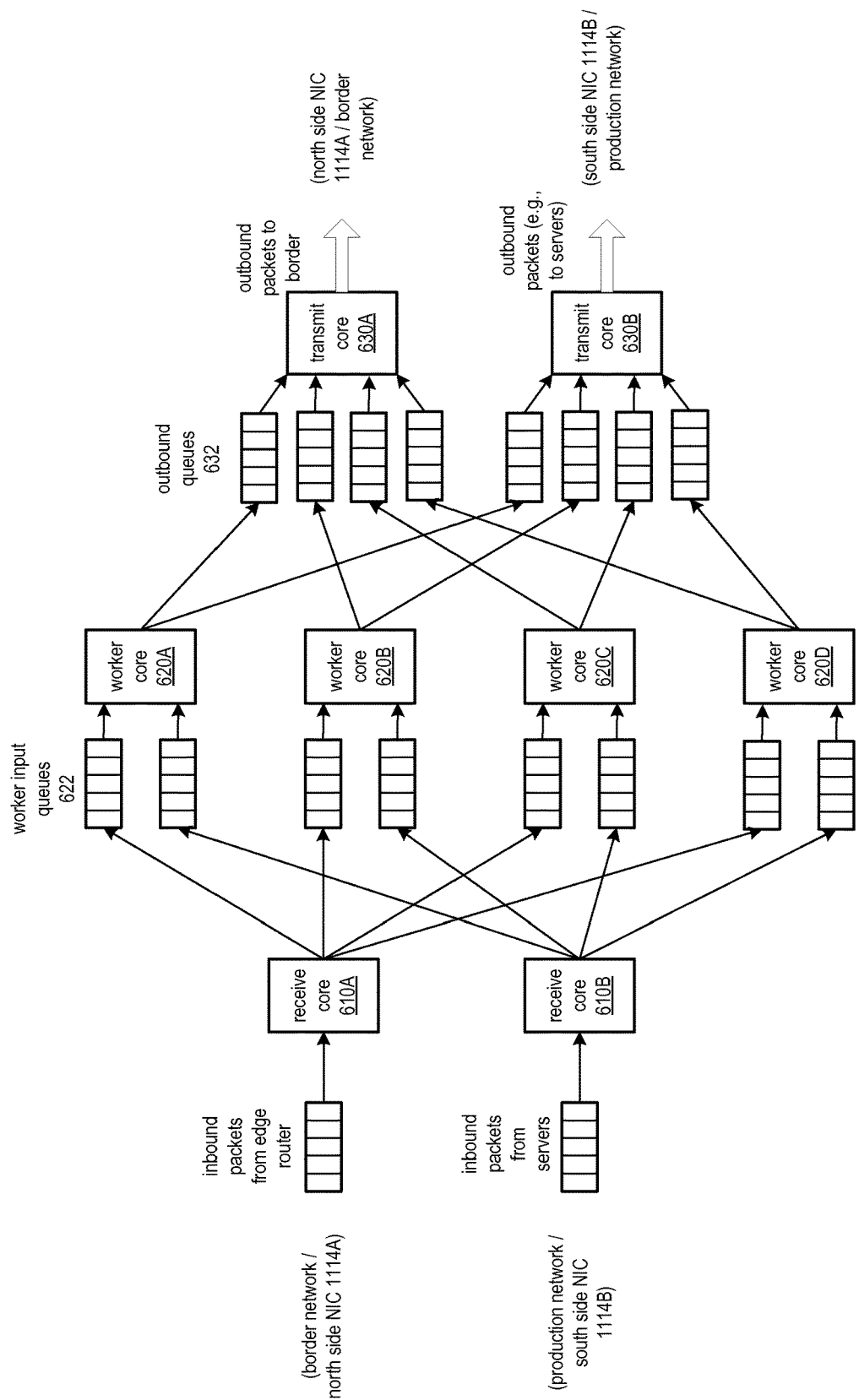
FIG. 25 illustrates an example multicore packet processor for processing data flows on the load balancer nodes, according to at least some embodiments.
Figure 26:
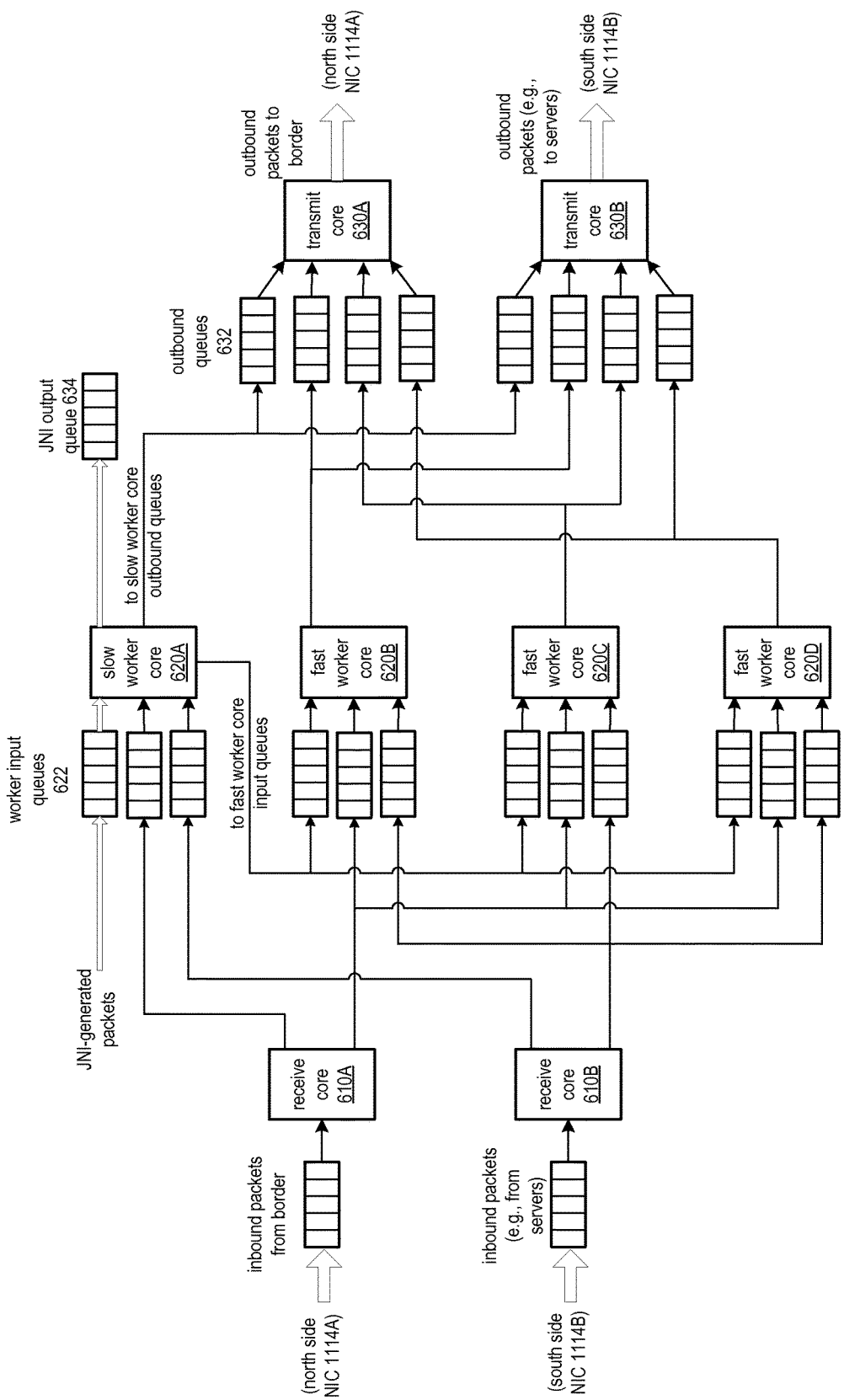
FIG. 26 illustrates another example multicore packet processor for processing data flows on the load balancer nodes, according to at least some embodiments.

In at least some embodiments of the load balancer nodes 110, a core packet processing architecture may be implemented that leverages DPDK technology. Each load balancer node 110 may include at least one multicore packet processor implemented according to the core packet processing architecture. The core packet processing architecture may use a single producer/single consumer paradigm for packet flow through the queues and cores of the multicore packet processor. In this paradigm, each queue inputs to one and only one core, and each core outputs to one and only one core for each other core that it feeds packets to. In addition, memory used by the cores in the multicore packet processor is not shared; each core has its own, separate memory region. Thus, there is no memory or queue sharing between cores, no memory or queue contention, and no need for memory or queue sharing mechanisms such as request for ownership (RFO) or compare-and-swap (CAS). FIGS. 25 and 26 illustrate example multicore packet processors implemented according to the core packet processing architecture.

FIG. 25 illustrates an example multicore packet processor implemented according to the core packet processing architecture that leverages DPDK technology for processing data flows, according to at least some embodiments. The core packet processing architecture may be implemented as a multicore packet processor according to a single producer/single consumer paradigm. In at least some embodiments, as illustrated in FIG. 23, the load balancer nodes 110 each have two network interface controllers (NICs)—a north-facing NIC 1114A that faces the border network/edge router 104 and a south-facing NIC 1114B that faces the production network/server nodes 130. In at least some embodiments, the NICs 1114 may be 10 Gpbs NICs. The majority of packets flowing through a load balancer node 110 are received on one of these two NICs (either NIC 1114A or 1114B), processed (e.g., encapsulated or decapsulated), and transmitted out the other NIC (either NIC 1114B or 1114A).

Referring to FIG. 25, in at least some embodiments a load balancer node 110 spins up two CPU cores, a receive (RX) core 610 and a transmit (TX) core 630, for each NIC 1114.

The load balancer node 110 also spins up a number of worker cores 620 that process packets for both NICs 1114 in both directions; in this example four worker cores 620A through 620D are used. The receive cores 610 read batches of incoming packets from their input queues as they arrive on the NIC 1114 and distribute the packets to the worker cores 620 that perform the bulk of the work for each packet, with each receive core 610 feeding packets into a respective worker input queue 612 for each worker core 620. In at least some embodiment, a receive core 610 may perform a layer 4 "flow-hash" technique on each incoming packet (similar to the per-flow hashed multipath routing technique that may be used by the edge router 104 as previously described) to distribute the packets to the worker cores 620 while ensuring that any particular client connection (distinguished by its IP address and port) will be processed by the same worker core 620. This means that each worker core 620 may always see the same subset of the packets, and eliminates contention on state data managed by the worker core 620 so that no locks are required. The pointers to the received packets may be distributed across the worker queues 622 that the worker cores 620 continuously monitor for new input. The worker cores 620 are responsible for managing the state (e.g. the assigned server node 130) for each connection, and may perform UDP encapsulation or decapsulation on the packet before forwarding the packet to one of their outbound queues 632. The transmit cores 630 cycle through the worker core 620 outbound queues 632 and write the output packets to their corresponding NIC 1114 as they appear on the queues 632.

FIG. 26 illustrates another example multicore packet processor implemented according to the core packet processing architecture that leverages DPDK technology for processing data flows, according to at least some embodiments. The core packet processing architecture may be implemented as a multicore packet processor according to a single producer/single consumer paradigm. In at least some embodiments, in addition to processing the high-throughput client TCP flows, the DPDK core architecture on a load balancer node 110 may also be used to send and receive packets on the north- and south-facing NICs 1114 for other protocols such as ARP, DHCP, and BGP. In the embodiment shown in FIG. 26, a worker core 620A is dedicated to handling the packets for these other protocols. This worker core 620A may be referred to as a "slow" worker core, since the processing of these packets generally happens at a slower rate than the client TCP flows, while the other worker cores 620B-620D that process only the client TCP flows may be referred to as fast worker cores. The receive cores 610A and 610B handling incoming packets on the north-facing and south-facing NICs 1114, respectively, may identify packets that are to be handled by the slow worker core 620A and direct the packets to input queues 622 for the slow worker core 620A. The slow worker core 620A may also monitor an input queue 622 for packets generated by Java/JNI, and an output queue 634 for output packets to Java/JNI. The slow worker core 620A also outputs to an input queue 622 for each of the fast worker cores 620B through 620D so that the slow worker core 620A can send packets to each of the fast worker cores 620B through 620D, for example connection publishing packets. The slow worker core 620A also has an outbound queue 632 feeding into each of transmit cores 630A and 630B.

In at least some embodiments, the third input queue 622 of each fast worker core 620B through 620D is an output queue from the slow worker core 620A. In at least some embodiments, this third input queue 622 may, for example, be used for receiving and processing connection publishing packets, each containing connection state information, by the fast worker queues 620B through 620D. For at least some of these connection publishing packets, there may be no output to the transmit cores 630. Instead, the connection state information in the packets may be consumed by the fast worker core 620, for example by updating the stored state for one or more packet flows that the respective fast worker core 620 maintains. Thus, the output queues from the slow worker core 620A that input to the fast worker cores 620B through 620D may provide a path other than an input queue 622 directly from a receive core 610 for updating the fast worker cores' stored states.

In at least some embodiments, the multicore packet processors of FIGS. 25 and 26 may filter incoming packets and only process and output packets that are valid. For example, in at least some embodiments, the receive cores 610 may filter out packets that are of a protocol not supported by any of the worker cores 620 and thus not send the packets to the worker cores 620. In at least some embodiments, the worker cores 620, when processing packets, may each first analyze the packets read from their respective worker input queues 622 to determine if the packets are to be accepted for further processing and output to the transmit cores 630, and may only complete the processing and output of packets to the transmit cores 630 that are accepted; the non-accepted packets may be discarded. For example, the worker cores 620 may look at the address information for each packet and only accept packets that are targeted at valid addresses that are being load-balanced, discarding any other packets.

Handling Border Gateway Protocol (BGP) Data

In at least some embodiments, packet flows associated with a BGP client in and out of the core architecture may be handled as follows. Since the NICs 1114A and 1114B are not bound to the Linux kernel, the TCP connection to the edge router 104 is intercepted by core architecture as illustrated in FIG. 26 and processed by the slow worker core 622A, which passes the BGP packets up into Java space via output queue 634. These TCP packets are further processed by one or more modules on the load balancer node 110 before being delivered to the BGP client, including processing by the Linux kernel to manage the TCP connection and effectively translate the packets into a TCP stream. This design allows the BGP client to be written using standard Java TCP socket libraries.

Figure 27:
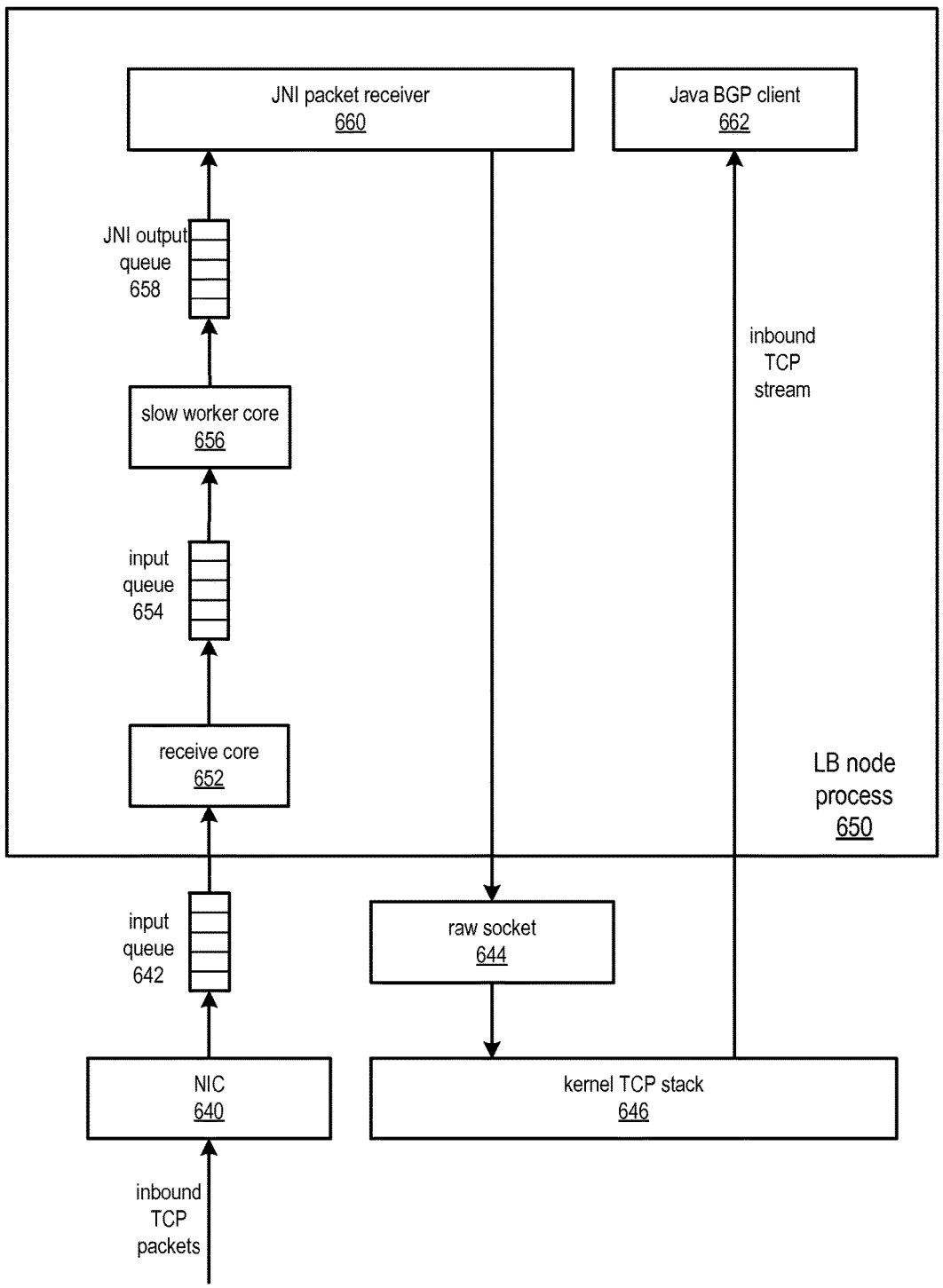
FIG. 27 illustrates processing of incoming packets by a load balancer node process, according to at least some embodiments.

FIG. 27 illustrates processing of incoming BGP TCP packets by a load balancer (LB) node process 650, according to at least some embodiments. A packet from the edge router 104 arrives at the north-facing NIC 640 and goes into input queue 640 for the receive core 652. The receive core 652 reads the packet from the queue 640, identified the packet as a BGP packet, and places the packet on an input queue 654 for the slow worker core 656. The slow worker core 656 validates the packet and places it on the JNI output queue 658. JNI packet receiver 660 reads the packet from the queue 658 via JNI, mangles the source/destination addresses, and writes the packet to a raw socket 644. The Linux kernel 646 receives the raw packet, handles it according to the TCP protocol, and appends the payload data to the TCP socket InputStream. The data from the packet is then delivered to the Java TCP socket in the BGP client 662.

Figure 28:
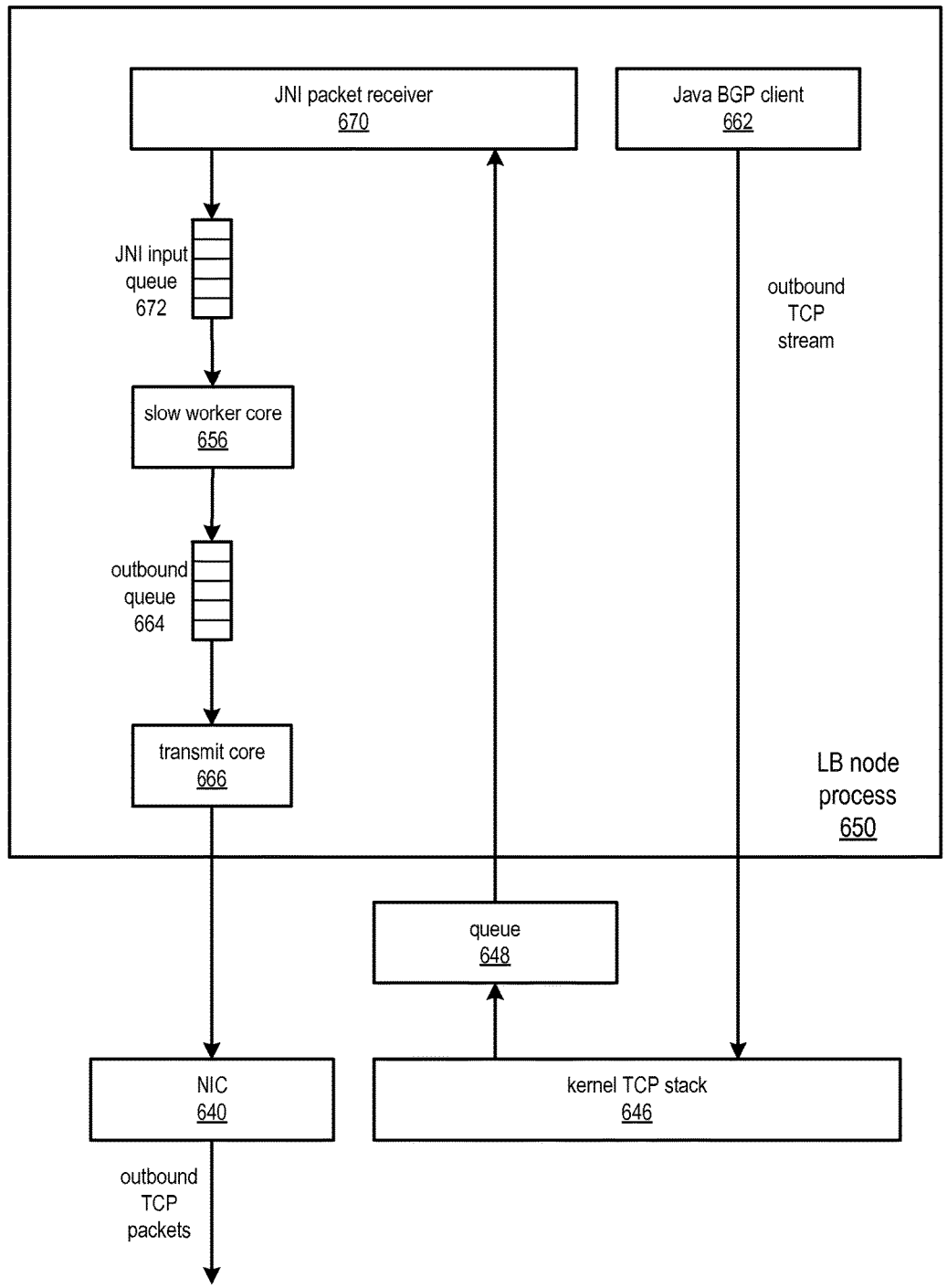
FIG. 28 illustrates processing of outgoing packets by a load balancer node process, according to at least some embodiments.

FIG. 28 illustrates processing of outgoing BGP TCP packets by a load balancer (LB) node process 650, according to at least some embodiments. The BGP client 662 writes data to a Java TCP socket of Linux kernel 646. The Linux kernel 646 handles the data according to the TCP protocol and converts the data into TCP packet(s). In at least some embodiments, the TCP packet(s) match a 127.x.x.x iptables rule. The TCP packet(s) are placed on an output queue 648, for example a Netfilter LOCAL_OUT queue. A Java thread of JNI packet receiver 670 monitoring the queue 648 via JNI receives the TCP packet(s) and marks each NF_STOLEN to make the kernel 646 forget about them. The Java thread mangles the source/destination addresses and adds the packets(s) to a JNI input queue 672 for slow worker core 656 via JNI. The slow worker core 656 receives the TCP packet(s) from its JNI input queue 672 and places the packets on the outbound queue 664 for the north-facing NIC 640 transmit core 666. Transmit core 666 reads the TCP packets(s) from its input queue 664 and writes them to the north-facing NIC 640. The TCP packets are sent by NIC 640 to the edge router 104.

Distributed Load Balancer Simulation and Testing

The load balancer described herein is a distributed system that requires the interaction of many independent components (e.g., routers, load balancer nodes, load balancer modules, etc.). To perform testing of the distributed components, logic, and protocols, as well as to simulate scenarios such as node failures, message drops, and delays, embodiments of a test system are described that enable the distributed load balancer to be run in a single process where the interactions can be tested without requiring the code to be deployed to multiple hosts in a complex network topology (e.g., a production network). To accomplish this, a software mechanism referred to as a message bus is described that enables multiple load balancer components to be configured and executed in or as a single process; the single process may be executed on a single host system. The message bus mechanism allows the distributed load balancer system to be tested as a single process, for example on a single host system, while to the load balancer components (e.g., the load balancer nodes and load balancer modules) it appears that they are running on an actual production network.

The message bus provides a framework that allows the distributed load balancer to run as a single process. Each of one or more message bus layers in the process simulates a network (e.g., Ethernet) segment between components of the distributed load balancer. The software components of the distributed load balancer system do not have to be written in a special fashion to allow the components to operate within the message bus environment. Instead, the message bus framework provides a component (which may be referred to as a message bus NIC or packet adapter) that intercepts the packets the components of the distributed load balancer system produce, directs the packets into the simulated network provided by a message bus layer instead of into a real physical network, and delivers the packets to the target components. The message bus layers do not implement TCP/IP stack(s) for communications between the components. Instead, the message bus layers interface with the host system's operating system (OS) and use the host system's TCP/IP stack. The message bus layers leverage the TCP/IP stack provided by the OS to convert the TCP streams that the clients and servers expect to and from the individual packets that the message bus intercepts and delivers.

In at least some embodiments, to interface with the message bus, load balancer components may be provided with at least one message bus network interface controller (NIC), each with a valid media access control (MAC) address, which sends packets to and receives packets from the message bus simulated network environment instead of to and from a physical network. A message bus NIC is a virtual network interface controller that attaches to the message bus instead of to a physical network. Each load balancer component that needs to communicate through the message bus requires a least one message bus NIC. A message bus NIC serves as a pipeline exit to the message bus and as a pipeline entrance to the component. Components can instantiate multiple message bus network interfaces to each message bus NIC.

A message bus network interface is a mechanism for components to attach to a message bus via a message bus NIC. A message bus network interface may be synonymous to an interface configuration (ifconfig) interface in Linux technology, with a difference being that the message bus network interface attaches to the message bus instead of to a physical network. A message bus network interface has an IP address, and sits on top of a message bus NIC. The message bus network interface exposes a packet source interface, which can be used by the component to receive packets from the message bus, and a packet sink interface that can be used by the component to send packets into the message bus.

Figure 29:
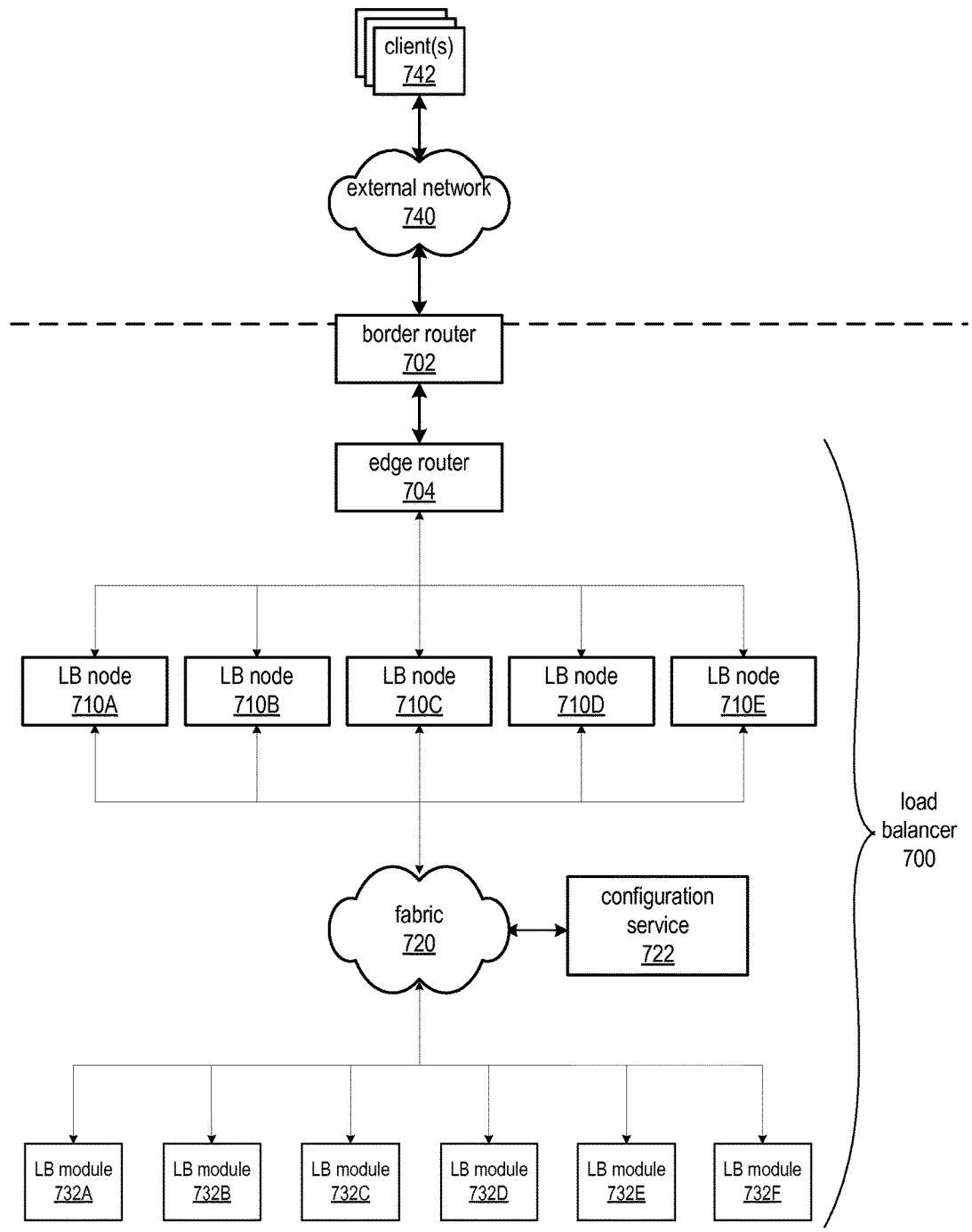
FIG. 29 illustrates a load balancing system that includes a distributed load balancer in a production environment, according to at least some embodiments.

Each load balancer node processes individual network packets that are delivered and sent through an implementation of the packet source and packet sink interfaces. When running in the message bus environment, these interfaces are implemented by the message bus network interface that adds or removes the layer 2 Ethernet headers (for the load balancer nodes that expect this to be performed by the kernel network stack). In a production environment as shown in FIG. 29, the implementation of the packet source and packet sink interfaces receive and transmit packets on an actual network interface. In a message bus environment as shown in FIG. 30, the implementation of the packet source and packet sink interfaces receive packets from and transmit packets onto a message bus layer or layers.

For the sake of simplicity, a message bus NIC and message bus interface may collectively be referred to as a message bus packet adapter, or simply packet adapter. See, e.g., FIGS. 31 and 32.

FIG. 29 illustrates a load balancing system that includes a distributed load balancer 700 in a production environment, according to at least some embodiments. The load balancer 700 has been simplified for this description. The load balancer 700 may connect to clients 742 on an external network 740 via a border router 702 of a network installation such as a data center that implements the load balancer 700. The load balancer 700 includes several types of components—at least one edge router 704, two or more load balancer (LB) nodes 710, two or more load balancer (LB) modules 732 each implemented on a separate server node (not shown), one or more networking components that form fabric 720 such as routers or switches, and in at least some embodiments a configuration service 722. In at least some embodiments, each component of the load balancer 700 may be implemented as or on a separate computing device, such as a commodity rack-mounted computing device.

Figure 30:
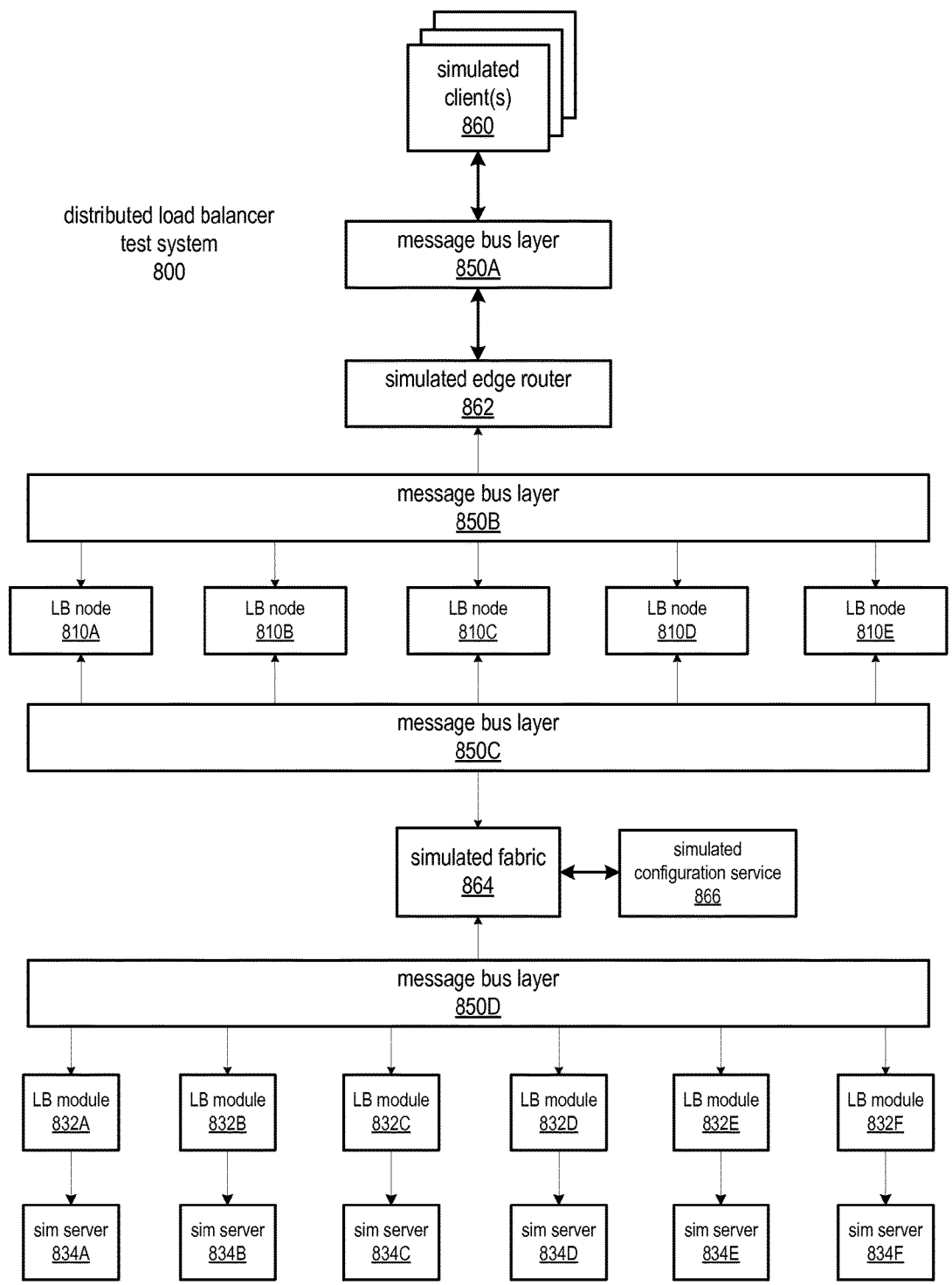
FIG. 30 illustrates a distributed load balancer test system that incorporates a message bus mechanism that enables multiple distributed load balancing system components to be configured and executed in or as a single process, according to at least some embodiments.

FIG. 30 illustrates a distributed load balancer test system 800 that incorporates a message bus mechanism that enables multiple distributed load balancing system components to be configured and executed in or as a single process, according to at least some embodiments. In the load balancer 700 shown in FIG. 29, each load balancer software component is installed and executed on a separate computing device (e.g., the load balancer software on the load balancer nodes 710, and the load balancer modules 732 on the server nodes). To enable these load balancer software components to execute in a single process, each load balancer software component (shown as load balancer (LB) nodes 810 and load balancer (LB) modules 832 in FIG. 30) may include code that abstracts the network connectivity of the components so that the packets in and out of the load balancer software component can also be intercepted and routed through the message bus mechanism instead of being sent and received on a physical network.

In at least some embodiments, in the distributed load balancer test system 800, the message bus mechanism does not implement TCP stack(s) for communications between the components. Instead, the message bus mechanism interfaces with the host system's operating system (OS) and uses the host system's TCP stack. In at least some embodiments, the message bus functionality ties in to the kernel (e.g., the Linux kernel) of the host system's OS below the user layer via IP tables, a functionality of the kernel. The message bus functionality hooks into the IP tables at the kernel level, intercepts packets, and sends the packets up into the message bus process for routing.

As shown by simulated edge router 862 and simulated fabric 864 in FIG. 30, the functionality of the physical network components (e.g., the edge router 704 and fabric 720 in FIG. 29) may be simulated in software, as can clients 860, servers 834, and configuration service 866. Note, however, that in at least some embodiments actual rather than simulated servers 834 may be used in the distributed load balancer test systems 800. The message bus layers 850 in FIG. 30 replace the physical network infrastructure. Thus, the load balancer software components (load balancer nodes 810 and load balancer modules 832) may be run in the load balancer test system 800 while unaware that they are not executing in a production network environment as shown in FIG. 29.

Some components (for example, simulated routers) may be connected to more than one message bus layer 850 in order to pass packets to and receive packets from different message bus layers 850 that simulate network segments.

The message bus mechanism implemented in the message bus layers 850 of the distributed load balancing test system 800 simulates the "wire" of a network segment. In at least some embodiments, the message bus mechanism delivers packets to destination components in the distributed load balancing test system 800 based on the components' MAC addresses. Thus, each load balancer software component (load balancer nodes 810 and load balancer modules 832) provides a MAC address to the message bus layer(s) 850 to which it is connected so that the load balancer software component can receive packets that are sent to it from other components in the distributed load balancing test system 800.

Message Bus Packet Adapters

Figure 31:
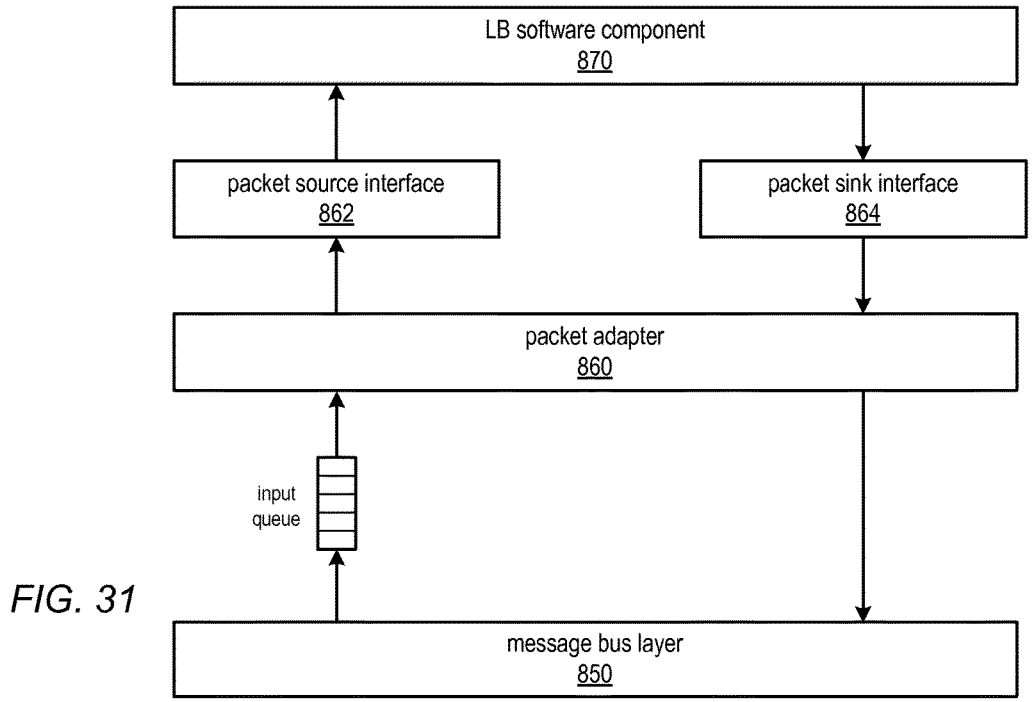
FIGS. 31 and 32 illustrate message bus packet adapters and packet pipelines, according to at least some embodiments.
Figure 32:
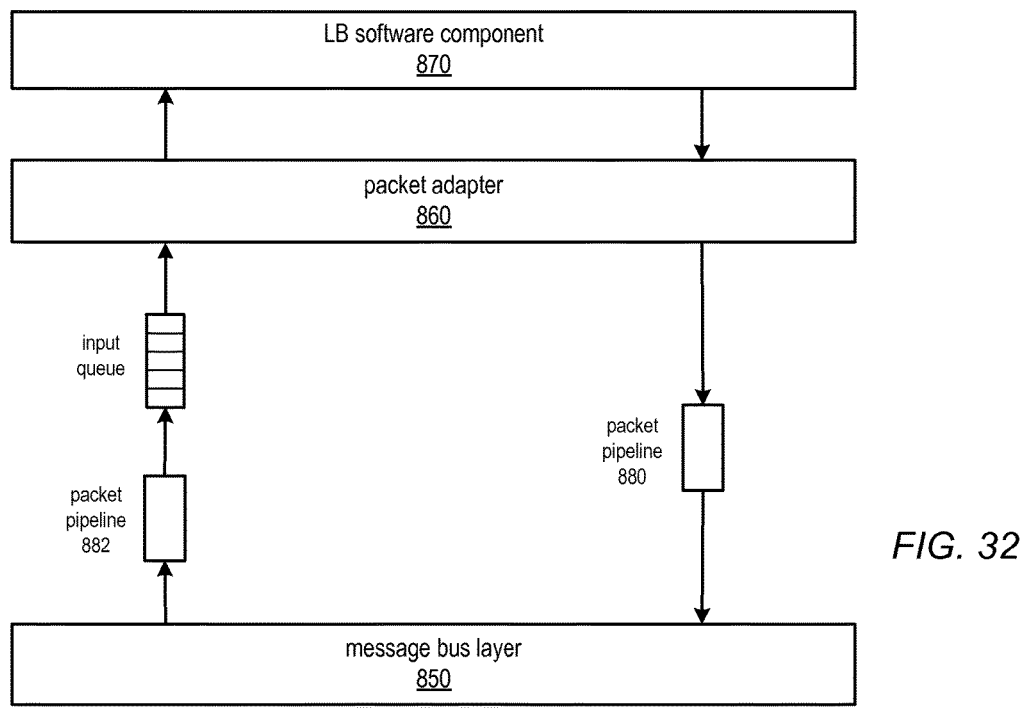

FIGS. 31 and 32 illustrate message bus packet adapters, according to at least some embodiments. In at least some embodiments, each load balancer (LB) software component processes individual network packets that are delivered and sent through an implementation of the PacketSource and PacketSink interfaces. Referring to FIG. 31, when running in the distributed load balancing test system 800, these interfaces (shown as packet source interface 862 and packet sink interface 864) may be implemented by a packet adapter 860 between the message bus layer 850 and the load balancer software component 870 that adds or removes the layer 2 Ethernet headers for the load balancer software components 870 that expect this to be performed by the kernel network stack. In the production environment as illustrated in FIG. 29, the implementation of PacketSource and PacketSink for the load balancer software components receives and transmits the packets on actual network interfaces of the physical devices on which the components are implemented.

Referring to FIG. 31, in at least some embodiments, when a load balancer software component 870 transmits a packet, the thread of execution that calls a send packet method of packet sink interface 864 traverses a chain of functions within the packet adapter 860 and also within the message bus layer 850 to eventually deliver the packet to the destination component by adding the packet to that component's input queue. In at least some embodiments, when a load balancer software component 870 receives a packet, the load balancer software component 870 calls a receive packet method of the packet source interface 862 and reads packets from its input queue. In at least some embodiments, the message bus mechanism does not require any additional threads of its own to deliver packets.

Message Bus Packet Pipelines

Referring to FIG. 32, in at least some embodiments, the message bus 850 side of the packet source interface 862 and packet sink interface 864 provides a packet pipeline feature. When a load balancer software component 870 sends a packet via packet sink interface 864, the packet data may traverse a series of stages (packet pipeline 880) before reaching the message bus layer 850. These stages may modify the packet, drop the packet, duplicate the packet, delay the packet, etc. Once a packet traverses packet pipeline 880 and the message bus layer 850 selects a destination component 870, a second series of pipeline stages (packet pipeline 882) associated with the destination component 870 may also be traversed before the packet is added to the destination component 870's input queue.

Example Provider Network Environments

This section describes example provider network environments in which embodiments of the distributed load balancing methods and apparatus may be implemented. However, these example provider network environments are not intended to be limiting.

FIG. 33A illustrates an example provider network environment, according to at least some embodiments. A provider network 1900 may provide resource virtualization to clients via one or more virtualization services 1910 that allow clients to access, purchase, rent, or otherwise obtain instances 1912 of virtualized resources, including but not limited to computation and storage resources, implemented on devices within the provider network or networks in one or more data centers. Private IP addresses 1916 may be associated with the resource instances 1912; the private IP addresses are the internal network addresses of the resource instances 1912 on the provider network 1900. In some embodiments, the provider network 1900 may also provide public IP addresses 1914 and/or public IP address ranges (e.g., Internet Protocol version 4 (IPv4) or Internet Protocol version 6 (IPv6) addresses) that clients may obtain from the provider 1900.

Conventionally, the provider network 1900, via the virtualization services 1910, may allow a client of the service provider (e.g., a client that operates client network 1950A) to dynamically associate at least some public IP addresses 1914 assigned or allocated to the client with particular resource instances 1912 assigned to the client. The provider network 1900 may also allow the client to remap a public IP address 1914, previously mapped to one virtualized computing resource instance 1912 allocated to the client, to another virtualized computing resource instance 1912 that is also allocated to the client. Using the virtualized computing resource instances 1912 and public IP addresses 1914 provided by the service provider, a client of the service provider such as the operator of client network 1950A may, for example, implement client-specific applications and present the client's applications on an intermediate network 1940, such as the Internet. Other network entities 1920 on the intermediate network 1940 may then generate traffic to a destination public IP address 1914 published by the client network 1950A; the traffic is routed to the service provider data center, and at the data center is routed, via a network substrate, to the private IP address 1916 of the virtualized computing resource instance 1912 currently mapped to the destination public IP address 1914. Similarly, response traffic from the virtualized computing resource instance 1912 may be routed via the network substrate back onto the intermediate network 1940 to the source entity 1920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 1900; a client may then assign their allocated public IP addresses to particular resource instances allocated to the client. These public IP addresses may be referred to as client public IP addresses, or simply client IP addresses. Instead of being assigned by the provider network 1900 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 33B illustrates a distributed load balancer implementation in an example provider network environment as shown in FIG. 33A, according to at least some embodiments. A provider network 1900 may provide a service 1910 to clients 1960, for example a virtualized storage service. The clients 1960 may access the service 1910, for example via one or more APIs to the service 1910, to obtain usage of resources (e.g., storage resources or computation resources) implemented on multiple server nodes 1990 in a production network portion of the provider network 1900. Server nodes 1990 may each implement a server (not shown), for example a web server or application server, as well as a local load balancer (LB) module 1992. One or more distributed load balancers 1980 may be implemented in a load balancer layer between the border network and the production network. Border router(s) 1970 may receive packets (e.g., TCP packets) in packet flows from clients 1960 via an intermediate network 1940 such as the Internet, and forward the packets to the edge router(s) of the distributed load balancer(s) 1980 via the border network. The packets may be targeted at the public IP address(es) published by the edge router(s) of the distributed load balancer(s) 1980. The edge router of each distributed load balancer 1980 may distribute the packet flows among load balancer nodes of the respective distributed load balancer 1980. In at least some embodiments, each load balancer node that serves as an ingress node advertises the same public IP address to the edge router, and the edge router distributes the packet flows from the clients 1960 among the ingress servers according to a per-flow hashed multipath routing technique, for example an equal-cost multipath (ECMP) hashing technique. The load balancer nodes may use the connection protocol described herein to determine target server nodes 1990 for the packet flows and to facilitate connections between the servers and the clients 1960. Once a connection is established, the ingress nodes encapsulate and send packets received for the flows to the target server nodes 1990 on the production network, while the flow tracker nodes maintain state for the connections. The load balancer modules 1992 on the server nodes 1990 may make the decisions as to whether the respective servers on the server nodes 1960 accept connections. The load balancer modules receive and decapsulate the packets from the ingress nodes, and send the decapsulated packets (e.g., TCP packets) to the respective servers on the server nodes 1990. The load balancer modules 1992 may also select load balancer nodes as egress nodes for the packet flows, and encapsulate and send outgoing packets for the flows to the selected egress nodes via the production network. The egress nodes in turn decapsulate the packets and send the decapsulated packets onto the border network for delivery to the respective clients 1960.

Figure 34A:
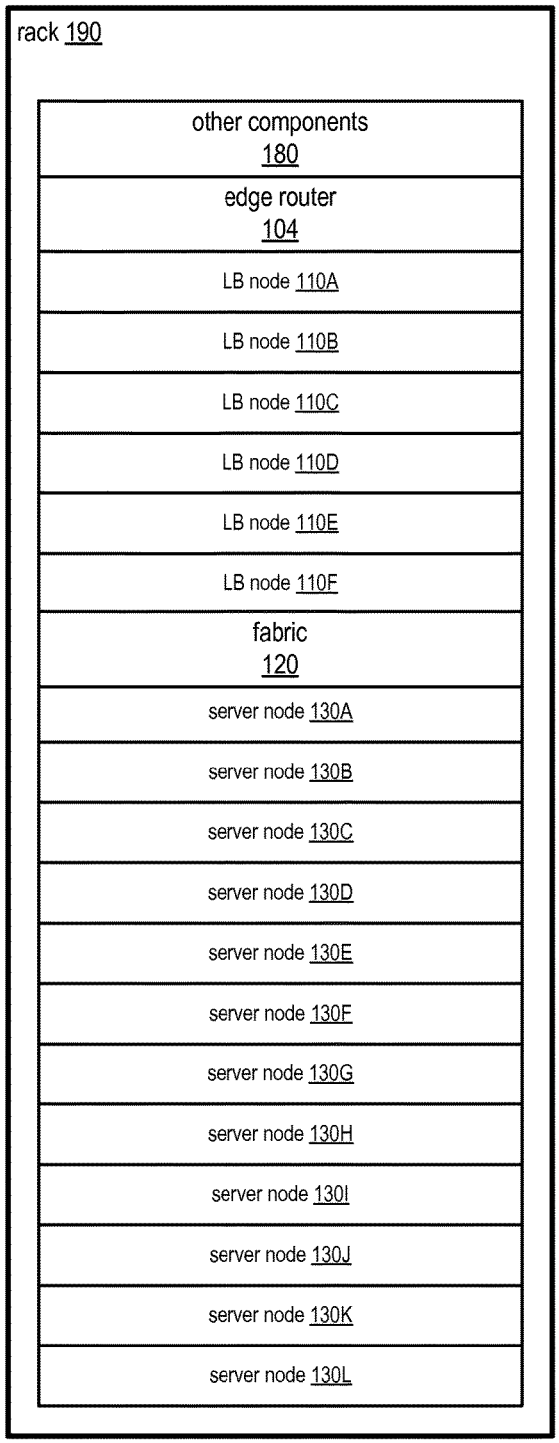
FIG. 34A illustrates an example physical rack implementation of the distributed load balancer and server nodes according to at least some embodiments.

FIG. 34A illustrates an example physical rack implementation of the distributed load balancer and server nodes according to at least some embodiments, and is not intended to be limiting. In at least some embodiments, various components of the distributed load balancer may be implemented on or as commodity rack-mounted computing devices. Rack 190 may include multiple computing devices each serving as a load balancer node (LB nodes 110A-110F), and multiple computing devices each serving as a server node (server nodes 130A-130L). Rack 190 may also include at least one edge router 104, one or more rack-mounted networking devices (routers, switches, etc.) that form fabric 120, and one or more other components 180 (other networking devices, patch panels, power supplies, cooling systems, busses, etc.). A network 100 installation such as a data center or centers that implement provider network 1900 of FIGS. 33A and 33B may include one or more racks 190.

Figure 34B:
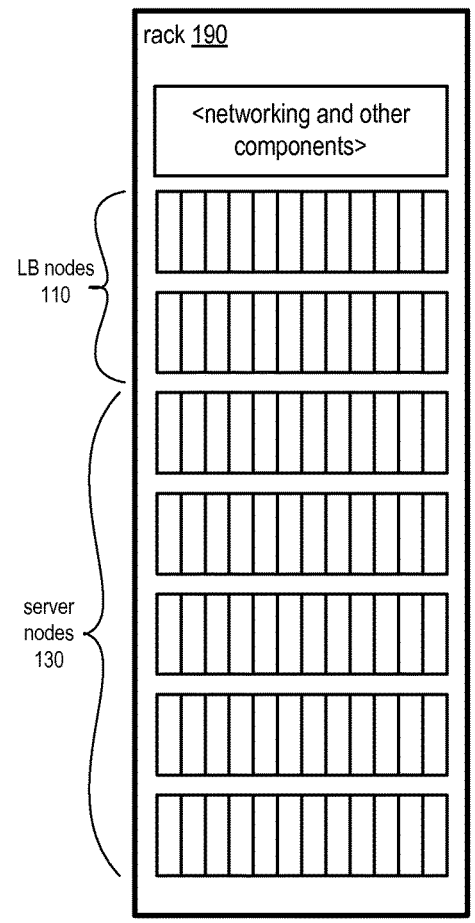
FIG. 34B illustrates another example physical rack implementation of the distributed load balancer and server nodes according to at least some embodiments.

FIG. 34B illustrates another example physical rack implementation of the distributed load balancer and server nodes according to at least some embodiments, and is not intended to be limiting. FIG. 34B shows the LB nodes 110 and server nodes 130 implemented as slot-mounted computing devices, for example blade servers, in rack 190.

Figure 35:
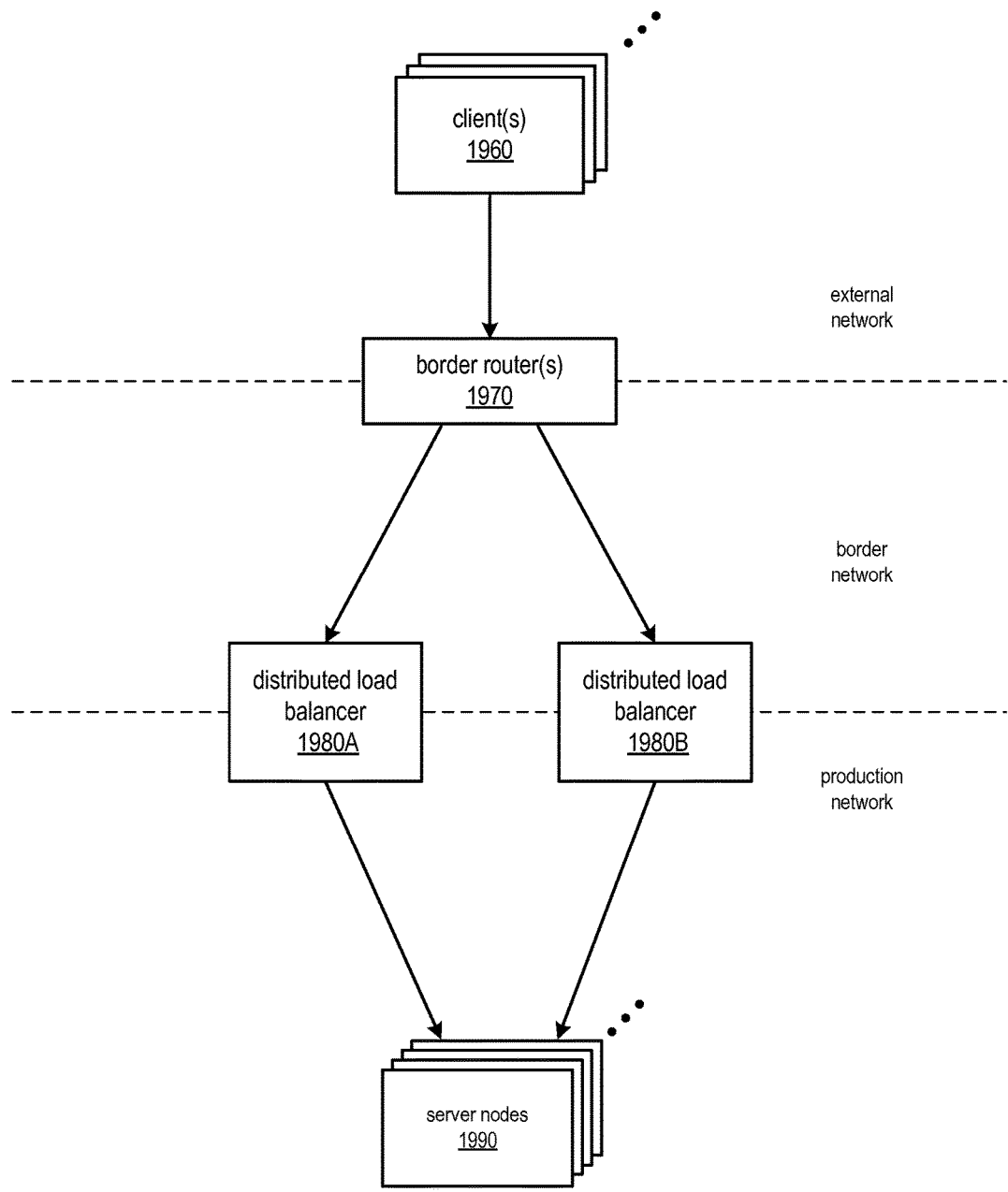
FIG. 35 illustrates an example networking environment in which one, two or more distributed load balancers are implemented in a network, according to at least some embodiments.

FIG. 35 illustrates an example networking environment in which one, two or more distributed load balancers may be implemented in a network, with the server nodes separately implemented, according to at least some embodiments. In this example, two distributed load balancers 1980A and 1980B are shown. The distributed load balancers 1980 each may receive packet flows from clients 1960 via the border network and perform the load balancing methods described herein to distribute the packet flows across multiple server nodes 1990. In some implementations, each distributed load balancer 1980 may be a rack implementation similar to the racks 190 shown in FIGS. 34A and 34B, but without the server nodes installed in the load balancer racks. The server nodes 1990 may be rack-mounted computing devices such as Blade servers installed in one or more separate racks within the data center. In some implementations, the server nodes 1990 may implement two or more different services provided by the provider network, with each service fronted by a different one or more of the load balancers 1980.

Illustrative System

Figure 36:
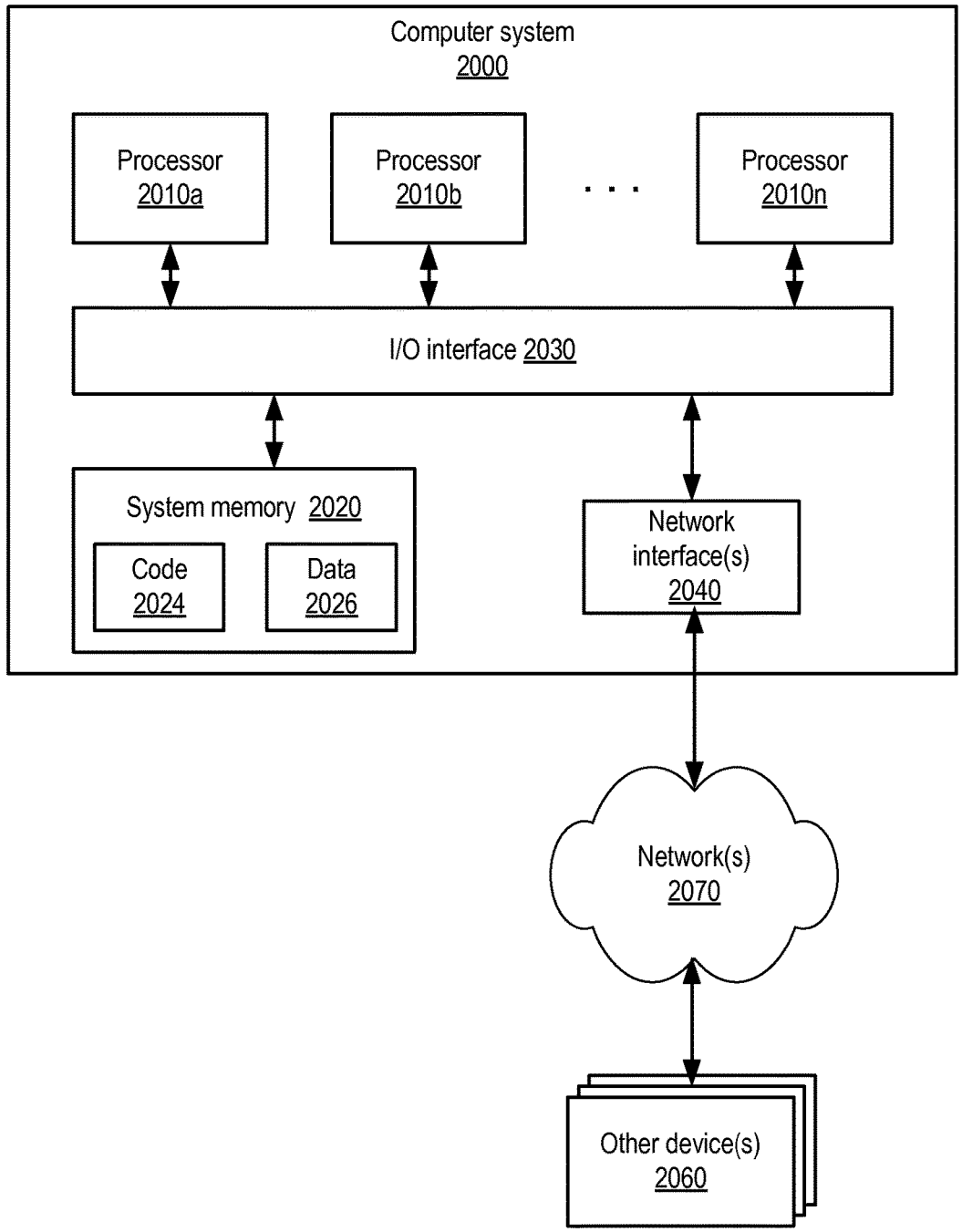
FIG. 36 is a block diagram illustrating an example computer system that may be used in some embodiments.

In at least some embodiments, a server that implements a portion or all of the distributed load balancing methods and apparatus as described herein may include a general-purpose computer system that includes or is configured to access one or more computer-accessible media, such as computer system 2000 illustrated in FIG. 36. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the distributed load balancing methods and apparatus, are shown stored within system memory 2020 as code 2024 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 35, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 35 for implementing embodiments of a distributed load balancing system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed load balancer system, comprising:
   a plurality of load balancer nodes in a provider network; and
   a plurality of server nodes in the provider network, each comprising a server and a load balancer module;
   wherein the plurality of load balancer nodes is configured to distribute packet flows from one or more clients among the plurality of server nodes, wherein, to distribute the packet flows among the plurality of server nodes, the plurality of load balancer nodes is configured to:
      select server nodes from among the plurality of server nodes to receive connection requests for the packet flows from the one or more clients; and
      send the connection requests to the selected server nodes;
   wherein the load balancer module on each server node is configured to:
      receive a connection request of a client for a packet flow from one of the plurality of load balancer nodes;
      determine if a data communications protocol connection for the packet flow is to be accepted by the server on the server node;
      if the server cannot accept the data communications protocol connection, reject the connection request; and
      if the server can accept the data communications protocol connection, cooperate with the plurality of load balancer nodes to establish the data communications protocol connection for the packet flow between the client and the server;
   wherein, after establishing the data communications protocol connection for the packet flow between the client and the server, the load balancer module on each server node is further configured to:
      receive incoming data communications protocol packets for the data communications protocol connection from one of the load balancer nodes;
      send the received incoming data communications protocol packets to the server on the server node;
      select one of the plurality of load balancer nodes to act as an egress server for the data communications protocol connection, wherein the selection is based at least in part on an identifier for the packet flow between the client and the server;
      intercept outgoing data communications protocol packets for the data communications protocol connection; and
      send the intercepted outgoing data communications protocol packets to the selected egress server for delivery to the client.

2. The distributed load balancer system as recited in claim 1, further comprising a router configured to distribute the packet flows from the one or more clients among the plurality of load balancer nodes according to a hashed multipath routing technique.

3. The distributed load balancer system as recited in claim 1, wherein the plurality of load balancer nodes is further configured to select the server nodes from among the plurality of server nodes to receive the connection requests according to a random selection technique.

4. The distributed load balancer system as recited in claim 1, wherein the plurality of load balancer nodes is further configured to select another server node from among the plurality of server nodes to receive a rejected connection requests and send the connection request to the other server node.

5. The distributed load balancer system as recited in claim 1, wherein each packet flow is a Transmission Control Protocol (TCP) packet flow, and wherein each data communications protocol connection established between a client and a server is a TCP connection.

6. The distributed load balancer system as recited in claim 1, wherein each data communications protocol connection established between a client and a server is a direct data communications protocol connection that originates at the client, passes through one or more of the plurality of load balancer nodes, and is terminated by the server, wherein the one or more load balancer nodes do not act as proxies for the data communications protocol connection and do not terminate the data communications protocol connection.

7. The distributed load balancer system as recited in claim 1, wherein, to determine if the data communications protocol connection is to be accepted by the server on the server node, the load balancer module is configured to analyze one or more current resource usage metrics of the server on the server node to determine if the server can accept the data communications protocol connection, wherein the one or more current resource usage metrics include one or more of CPU utilization, bandwidth consumption, server latency, and number of established data communications protocol connections.

8. A method, comprising:
   performing, by one or more of a plurality of load balancer nodes:
      receiving a data communications protocol packet in a packet flow for a client; and
      sending a connection request for the packet flow to a server node selected from among a plurality of server nodes;
   performing, by the selected server node:
      determining if a server on the server node can or cannot accept a data communications protocol connection for the packet flow;
      rejecting the connection request upon determining that the server cannot accept the data communications protocol connection; and
      accepting the connection request upon determining that the server can accept the data communications protocol connection, wherein said accepting the connection request comprises:
         cooperating with the one or more load balancer nodes to establish the data communications protocol connection between the client and the server for the packet flow; and
         selecting one of the plurality of load balancer nodes to act as an egress server for the data communications protocol connection based at least in part on an identifier for the packet flow, wherein outgoing data communications protocol packets on the data communications protocol connection are sent to the client via the selected egress server.

9. The method as recited in claim 8, wherein said determining, said rejecting, and said accepting are performed by a load balancer module on the selected server node, the method further comprising performing, by the load balancer module after accepting the connection request:

receiving incoming data communications protocol packets for the data communications protocol connection from one of the load balancer nodes and sending the incoming data communications protocol packets to the server on the server node; and intercepting the outgoing data communications protocol packets for the data communications protocol connection and sending the outgoing data communications protocol packets to the selected egress server for delivery to the client.

10. The method as recited in claim 9, wherein the packet flow is a Transmission Control Protocol (TCP) packet flow, and wherein the data communications protocol connection established between the client and the server is a TCP connection.

11. The method as recited in claim 9, wherein the established data communications protocol connection is a direct data communications protocol connection that originates at the client, passes through one or more of the plurality of load balancer nodes, and is terminated by the server, wherein the one or more load balancer nodes do not act as proxies for the data communications protocol connection and do not terminate the data communications protocol connection.

12. The method as recited in claim 8, wherein the packet is received from a router that distributes packet flows from one or more clients among the plurality of load balancer nodes according to a hashed multipath routing technique.

13. The method as recited in claim 8, further comprising the one or more load balancer nodes selecting the server node from among the plurality of server nodes according to a random selection technique.

14. The method as recited in claim 8, further comprising, if the selected server node rejects the connection request, the one or more load balancer nodes sending the connection request to another server node selected from among the plurality of server nodes.

15. The method as recited in claim 8, wherein said determining if a server on the server node can or cannot accept the data communications protocol connection comprises analyzing one or more current resource usage metrics of the server to determine if the server can accept the data communications protocol connection.

16. A non-transitory computer-accessible storage medium storing program instructions computer-executable to implement a load balancer module on each of a plurality of server nodes, wherein each load balancer module is configured to:
  receive, from one of a plurality of load balancer nodes, a connection request for a packet flow from a client;
  determine if a server on the server node can or cannot accept a data communications protocol connection for the packet flow;
  reject the connection request upon determining that the server cannot accept the data communications protocol connection; and
  upon determining that the server can accept the data communications protocol connection:
    communicate with the load balancer node and with the server to establish the data communications protocol connection between the client and the server for the packet flow; and
    select one of the plurality of load balancer nodes to act as an egress server for the data communications protocol connection based at least in part on an identifier for the packet flow, wherein outgoing data communications protocol packets on the data communications protocol connection are sent to the client via the selected egress server.

17. The non-transitory computer-accessible storage medium as recited in claim 16, wherein the program instructions are further computer-executable to implement the load balancer node randomly selecting the server node from among the plurality of server nodes to receive the connection request.

18. The non-transitory computer-accessible storage medium as recited in claim 16, wherein, to reject the connection request, the load balancer module is configured to decrement a time to live (TTL) counter in the connection request and return the connection request to the load balancer node, wherein the program instructions are further computer-executable to implement the load balancer node:
  checking the TTL counter in the returned connection request;
  if the TTL counter is above a threshold, selecting another server node from among the plurality of server nodes to receive the connection request; and
  if the TTL counter is at or below the threshold, dropping the connection request.

19. The non-transitory computer-accessible storage medium as recited in claim 16, wherein, to determine if a server on the server node can or cannot accept the data communications protocol connection, the load balancer module is configured to analyze one or more current resource usage metrics of the server to determine if the server can accept the data communications protocol connection.

20. The non-transitory computer-accessible storage medium as recited in claim 19, wherein the one or more current resource usage metrics include one or more of CPU utilization, bandwidth consumption, server latency, and number of established data communications protocol connections.

* * * * *